United States Patent [19]

Wagner et al.

[11] 4,341,650

[45] Jul. 27, 1982

[54] CHEMICALLY STABILIZED AZULMIC ACIDS, PROCESSES FOR THEIR PREPARATION AND THEIR USE

[75] Inventors: Kuno Wagner, Leverkusen; Kurt Findeisen, Odenthal, both of Fed. Rep. of Germany

[73] Assignee: Bayer Aktiengesellschaft, Leverkusen, Fed. Rep. of Germany

[21] Appl. No.: 210,943

[22] Filed: Nov. 28, 1980

Related U.S. Application Data

[62] Division of Ser. No. 64,350, Aug. 3, 1979, Pat. No. 4,263,781.

[30] Foreign Application Priority Data

Aug. 18, 1978 [DE] Fed. Rep. of Germany ....... 2836154

[51] Int. Cl.³ .................... C08F 4/00; C08G 18/72; C08L 61/20; C08L 61/32
[52] U.S. Cl. .................................... 252/182; 252/430; 536/1
[58] Field of Search ...................... 252/182, 430; 536/1

[56] References Cited

U.S. PATENT DOCUMENTS 1,464,802 8/1923 Bohart .................................... 8/636
1,464,803 8/1923 Bohart .................................... 8/623
2,855,365 10/1958 Burleson ........................ 252/8.5 R

FOREIGN PATENT DOCUMENTS 662338 5/1935 Fed. Rep. of Germany .
949060 8/1956 Fed. Rep. of Germany .
845363 8/1960 United Kingdom .

OTHER PUBLICATIONS

Lotz et al., Die Makromoleckulare Chemie, vol. 175 (1975), pp. 403–412.
Volker, Angew Chem. 72, No. 11, 1960, pp. 379–384.
Hackh's Chemical Dictionary, McGraw-Hill, N.Y., 1944, pp. 92 & 264.
Encyclopedia of Polymer Science & Technology, vol. 7, John Wiley & Sons, N.Y. 1967, pp. 568–573.

*Primary Examiner*—Irwin Gluck
*Attorney, Agent, or Firm*—Gene Harsh; Joseph C. Gil; Lyndanne M. Whalen

[57] ABSTRACT

The present invention relates to certain new azulmic acids stabilized by reaction with aminoplast-forming agents and carbonyl compounds or condensation products thereof, to a process for their preparation and to their use for various purposes.

1 Claim, No Drawings

CHEMICALLY STABILIZED AZULMIC ACIDS, PROCESSES FOR THEIR PREPARATION AND THEIR USE

This application is a division of application Ser. No. 64,350 filed Aug. 3, 1979 now U.S. Pat. No. 4,263,781.

BACKGROUND OF THE INVENTION

The present invention relates to certain new azulmic acids stabilized by reaction with aminoplast-forming agents and carbonyl compounds or condensation products thereof, to a process for their preparation and to their use for various purposes.

Polymeric hydrocyanic acids, so-called azulmic acids, and several processes for their preparation are known and have already been described (see Houben-Weyl, Volume 8 (1952), page 261; German Pat. No. 662,338 and German Pat. No. 949,600). Thus, polymeric hydrocyanic acid is obtained, for example, by heating monomeric hydrocyanic acid to the reaction temperature in dilute aqueous solution in the presence of a basic catalyst, such as ammonia, sodium cyanate, potassium cyanate or an alkaline earth, and, after the reaction has started, taking care that a reaction temperature of, preferably, 120° C. is not exceeded by cooling the mixture (see German Pat. No. 662,338). In a particular variant of this process, further hydrocyanic acid is added to the mixture of solvent, hydrocyanic acid and catalyst in which the reaction has already started (see German Pat. No. 949,600).

These known hydrocyanic acid polymers are brown-black to black pulverulent products which are insoluble in all inert solvents, but which dissolve in 1 N aqueous sodium hydroxide solution, with decomposition, even in the cold. A serious disadvantage of hydrocyanic acid polymers of this type is that when stored, whether under dry conditions or under moist conditions, small amounts of hydrogen cyanide are continuously split off even at room temperature. As the temperature increases, the rate at which hydrogen cyanide is split off also increases. Amounts of hydrogen cyanide which are far above the legally imposed maximum workplace concentration value of hydrocyanic acid of 11 ppm therefore even occur in containers holding azulmic acids no matter how mild the storage conditions are. Use in practice of these known hydrocyanic acid polymers for most purposes thus presents an exceptional danger to the environment and is therefore almost impossible.

According to a proposal by Th. Voelker, the brown-black polymeric hydrocyanic acid (azulmic acid) prepared in water has essentially the following formula (see Angew. Chem. 72, (1960) pages 379-384):

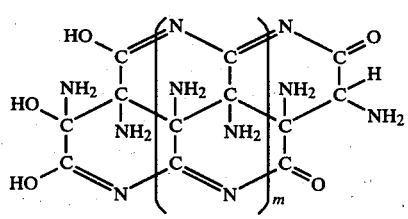

A degree of polymerization (HCN) of X=15−24 has been calculated from the oxygen content of known azulmic acids, so that values of 1 to 4 result for m in formula (I). The maximum molecular weights achieved for the polymers are slightly above 700.

DESCRIPTION OF THE INVENTION

This invention now provides azulmic acids, stabilized by reaction with aminoplast-forming agents and carbonyl compounds or chemically modified condensation products thereof, containing from 0.5 to 55 percent by weight of ionic groups of the general formula

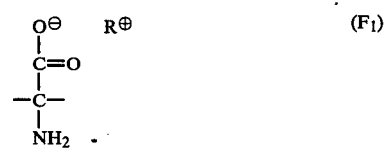

in which
R represents hydrogen, ammonium, one equivalent of a protonated or quaternized organic nitrogen base or of a sulfonium cation or one equivalent of a metal cation,
and containing from 0.5 to 15 percent by weight of groups formed by decarboxylation reactions, of the formula

The invention is also directed to acid addition salts and complex compounds thereof, the mixed products thereof with additives, and products of the abovementioned substances which are chemically surface modified.

The present invention also provides processes for the preparation of the above-mentioned azulmic acids stabilized by reaction with an aminoplast-forming agent and a carbonyl compound or a condensation product thereof, an acid addition salt or complex compound thereof or a mixed product thereof with an additive, or a product of any of the above-mentioned substances which is chemically surface modified. There are essentially eleven different processes which may be used:

(1) a modified azulmic acid (optionally containing an additive) and containing from 0.5 to 55 percent by weight of ionic groups of the general formula

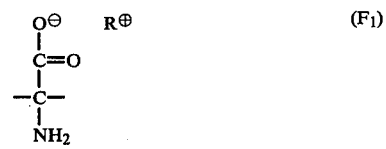

in which
R has the meaning stated above, and containing from 0.5 to 15 percent by weight of groups of the formula

is reacted, in an aqueous medium, optionally in the presence of an additive and if desired and/or necessary in the presence of a catalyst, and if desired and/or necessary in the presence of a chain stopper, with an aminoplast-forming agent and a carbonyl compound or a freshly prepared, (optionally chemically modified) condensation product of the aminoplast-forming agent and the carbonyl compound;

(2) an acid addition salt or complex compound, (optionally containing an additive), of a modified azulmic acid containing from 0.5 to 55 percent by weight of ionic groups of the general formula

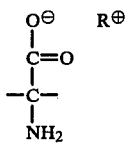

in which
R has the meaning stated above, and containing from 0.5 to 15 percent by weight of groups of the formula

is reacted, in an aqueous medium, optionally in the presence of an additive and if desired and/or necessary in the presence of a catalyst, and if desired and/or necessary in the presence of a chain stopper, with an aminoplast-forming agent and a carbonyl compound or a freshly prepared, (optionally chemically modified) condensation product of the aminoplast-forming agent and the carbonyl compound;

(3) an azulmic acid which is almost free from structural defects is reacted, in an aqueous medium, optionally in the presence of an additive and if desired and/or necessary in the presence of a catalyst, and if desired and/or necessary in the presence of a chain stopper, with an aminoplast-forming agent and a carbonyl compound or a freshly prepared (optionally chemically modified) condensation product of the aminoplast-forming agent and the carbonyl compound;

(4) hydrocyanic acid is polymerized under hydrolyzing conditions in an aqueous medium with the aid of a basic catalyst, optionally in the presence of an additive, and the reaction product is then reacted, in an aqueous medium and without prior isolation, optionally in the presence of an additive and if desired and/or necessary in the presence of a catalyst, and if desired and/or necessary in the presence of a chain stopper, with an aminoplast-forming agent and a carbonyl compound or a freshly prepared (optionally chemically modified) condensation product of the aminoplast forming agent and the carbonyl compound;

(5) hydrocyanic acid is polymerized under hydrolyzing conditions in an aqueous medium with the aid of a basic catalyst and in the presence of an aminoplast-forming agent, optionally in the presence of an additive, and the reaction product is then reacted, in an aqueous medium and without prior isolation, optionally in the presence of an additive and if desired and/or necessary in the presence of a catalyst, and if desired and/or necessary in the presence of a chain stopper, with a carbonyl compound;

(6) a modified azulmic acid optionally containing an additive and containing from 0.5 to 55 percent by weight of ionic groups of the general formula

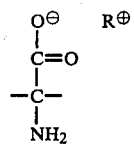

in which
R has the meaning stated above, and containing from 0.5 to 15 percent by weight of groups of the formula

is reacted with a base in an aqueous medium (the cation is optionally replaced by treatment with a metal salt) and the product is then reacted, in an aqueous medium, optionally in the presence of an additive and if desired and/or necessary in the presence of a catalyst, and if desired and/or necessary in the presence of a chain stopper, with an aminoplast-forming agent and a carbonyl compound or a freshly prepared (optionally chemically modified) condensation product of the aminoplast-forming agent and the carbonyl compound;

(7) a modified azulmic acid (optionally containing an additive) is treated with an organic or inorganic acid in an aqueous medium and the product is then reacted, in an aqueous medium, optionally in the presence of an additive and if desired and/or necessary in the presence of a catalyst, and if desired and/or necessary in the presence of a chain stopper, with an aminoplast-forming agent and a carbonyl compound or a freshly prepared (optionally chemically modified) condensation product of the aminoplast-forming agent and the carbonyl compound;

(8) an azulmic acid which is almost free from structural defects is reacted, in the presence of a hydrolytically degradable naturally occurring substance and in the presence of an acid, in an aqueous medium, if desired and/or necessary in the presence of a catalyst and if desired and/or necessary in the presence of a chain stopper, with an aminoplast-forming agent and a carbonyl compound or a freshly prepared (optionally chemically modified) condensation product of the aminoplast-forming agent and the carbonyl compound;

(9) an azulmic acid partially or completely stabilized with a carbonyl compound (and, optionally containing an additive) is reacted, in an aqueous medium, optionally in the presence of an additive and if desired and/or necessary in the presence of a catalyst, and if desired and/or necessary in the presence of a chain stopper, with an aminoplast-forming agent and a carbonyl compound or a freshly prepared (optionally chemically modified) condensation product of the aminoplast-forming agent and the carbonyl compound;

(10) a hydrocyanic acid polymer which has been subjected to pre-treatment with heat is reacted, in an aqueous medium, optionally in the presence of an additive and if desired and/or necessary in the presence of a catalyst, and if desired and/or necessary in the presence of a chain stopper, with an aminoplast-forming agent and a carbonyl compound or a freshly prepared (optionally chemically modified) condensation product of the aminoplast-forming agent and the carbonyl compound;

(11) an azulmic acid chemically surface modified and optionally containing an additive is reacted, in an aqueous medium, optionally in the presence of an additive and if desired and/or necessary in the presence of a catalyst, and/or a chain stopper, with an aminoplast-forming agent and a carbonyl compound of a freshly prepared (optionally chemically modified) condensation product of the aminoplast-forming agent and the carbonyl compound.

The products prepared by any of the process variants mentioned above may then optionally be modified with an acid or base or other after-treatment reagent.

The invention also relates to the use of the stabilized azulmic acids of the invention for various purposes. Thus, the products are suitable, for example, for complexing metal salts as catalyst supports or as catalysts in isocyanate chemistry. Products according to the invention can also be employed for the preparation of dispersions in polyhydroxy compounds which can be foamed with isocyanates. Products according to the invention can furthermore be used as reactive fillers in diverse plastics. It is possible, for example, to prepare, from substances according to the invention and polycarbodiimide powders, products in which the stabilized azulmic acids are coated, micro-encapsulated and essentially enclosed by polycarbodiimides. Those substances according to the invention which have a high ionic constituent and thus have a polyelectrolyte character can function as ion exchangers. The substances according to the invention which have a particularly high specific surface area can likewise be used as ion exchangers.

Substances according to the invention which contain phosphoric acid, phosphorous acid, polymethyleneureas and/or polymethylenemelamines and other suitable additives, such as alumina, hydrated aluminum oxide or calcium carbonate, can be used as flameproofing agents, anti-aging agents and reactive fillers for polyurethane plastics, polyamide plastics, rubbers and epoxide resins. Substances according to the invention are additionally suitable as supports for catalysts, interesting mixed catalysts being formed which can be employed in many ways. The use of mixed catalysts of this type for the synthesis of formose may be mentioned as an example. Moreover, products according to the invention can be used as agrochemicals.

In the present case, the phrase "modified azulmic acids" means those hydrocyanic acid polymers which contain ionic groups of the general formula

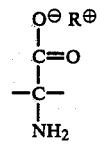

in which
R has the meaning stated above, and nonionic groups of the formula

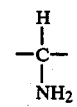

Groups of this type originate from nitrile groups, which are present in azulmic acid and can be regarded as terminal points for the cyclizing nitrile polymerization.

In the ideal case, the transition of a nitrile group of azulmic acid into a corresponding carboxyl group can be illustrated by means of formulae as follows:

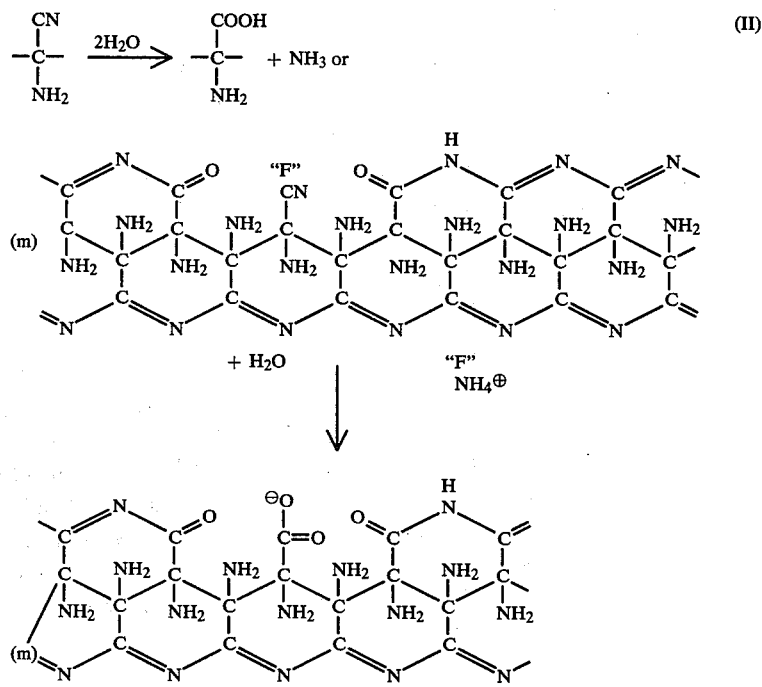

It is, of course, also possible to form amide, imide, amidine or lactam groups from nitrile groups. Thus, for example, the formation of amide groups can be represented by the equation which follows:

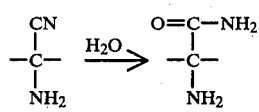

Ionic or nonionic groups of the above formulae are produced not only at the nitrile groups which are already present in the polymer employed, but also at those nitrile groups which are formed by catalytic decyclization reactions. Furthermore, various other hydrolysis reactions are responsible for the formation of structural defects. For example, a

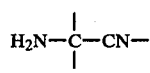

group, which is to be regarded as an α-aminonitrile in the azulmic acid molecular structure, can be converted into a carbonyl group by splitting off hydrogen cyanide and a subsequent topochemical hydrolysis reaction according to the equation which follows:

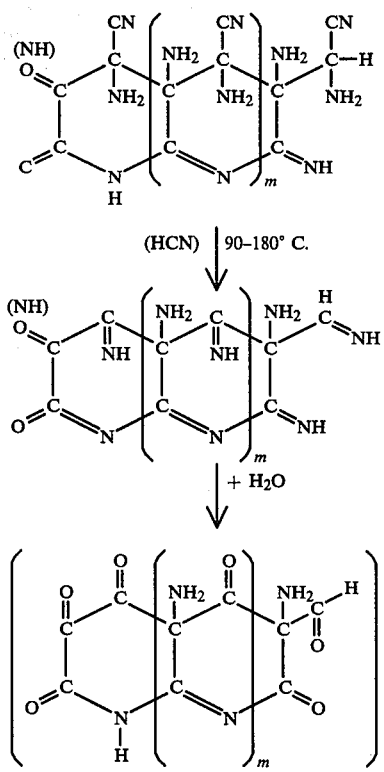

In the following text, the ionic groups of the general formula

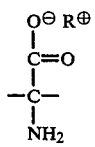

are designated $F_1$ structural defects and the nonionic groups of the formula

are designated $F_2$ structural defects.

The $F_2$ structural defects are formed from the $F_1$ structural defects, in which R represents hydrogen or another suitable ion, according to the equation which follows:

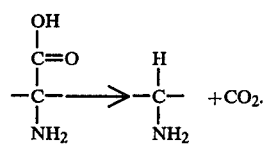

In the azulmic acid molecular structure, formation of the $F_2$ structural defects by a decarboxylation reaction

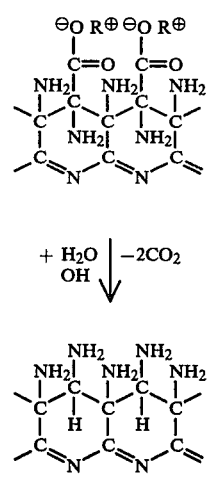

results in increase in the concentration of $NH_2$ groups, loss in acidity, and an increase in basicity.

As can be seen from the formula (II) above, each $F_1$ structural defect produced is directly adjacent to an amino group in the α-position and to an amino group in the β-position. Thus, at $F_1$ structural defects of the formula

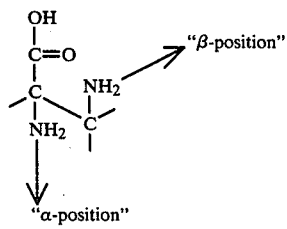

either intramolecular zwitterionic salts of the formula

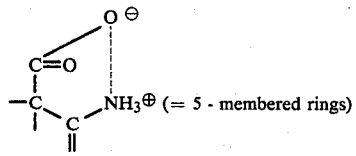

are formed, or intermolecularly cross-linked salts, represented ideally as follows:

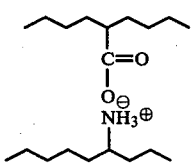

are formed between several azulmic acid molecules. The formation of intramolecular salts, that is to say 5-membered rings, is preferred.

Since the formation of the $F_1$ structural defects is coupled with the liberation of ammonia and the formation of the $F_2$ structural defects is coupled with the liberation of carbon dioxide, the amount of ammonia and carbon dioxide evolved is a quantitative measure of the number of structural defects produced. The quotient of the molar amount of ammonia evolved and the molar amount of carbon dioxide evolved provides information on the ratio of $F_1$ structural defects to $F_2$ structural defects.

In the following text, the content of structural defects, in percent by weight, in the modified azulmic acids is in each case determined by relating the equivalent weight of the structural defect concerned (=ionic or non-ionic grouping $F_1$ or $F_2$) to the corresponding weight (100 g) not converted into an ionic or nonionic grouping. Thus, for example, the concentration of structural defects for an $F_1$ structural defect in which R represents hydrogen is calculated from the particular molar amount of ammonia formed and the fact that the associated ionic grouping of the formula

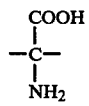

has an equivalent weight of 73.

In an analogous manner, the content of $F_2$ structural defects is calculated from the particular molar amount of carbon dioxide evolved and the fact that the relevant grouping of the formula

has an equivalent weight of 29.

It is exceptionally surprising that, in contrast to the azulmic acids hitherto known, the azulmic acids according to the invention, which have been stabilized by reaction with aminoplast-forming agents and carbonyl compounds or optionally chemically modified condensation products thereof, and acid addition salts and complex compounds thereof and mixed products thereof with additives, and products of the above-mentioned substances which are chemically surface modified are extremely resistant towards splitting off of hydrogen cyanide. Thus, at temperatures of up to 130° C., in some cases at temperatures of up to 180° C. and in extreme cases even at temperatures of up to 200° C., virtually no hydrogen cyanide is split off from the products according to the invention. The amount of hydrogen cyanide split off which can be detected analytically is essentially zero. Even under unfavorable conditions, these amounts are below the legally imposed maximum workplace concentration values. At temperatures of up to 180° C., hydrocyanic acid is split off from the substances according to the invention to a far lesser extent than even from polyacrylonitrile. Furthermore, the products according to the invention are also very stable towards hydrolytic splitting off of hydrogen cyanide. Thus, even after treating azulmic acids, stabilized according to the invention, in an aqueous medium at 100° C. for three hours, substantially no cyanide ions, or less than $0.2 \times 10^{-6}$ g of cyanide ions per gram of water, can be detected.

It is also surprising that the substances according to the invention are obtainable from the known azulmic acids by a topochemical reaction, although the polymers employed as starting materials are completely insoluble and, because of the low porosity, have only a relatively small surface area. Moreover, the ease of preparation of the products according to the invention could not be expected, in particular because the known azulmic acids, which are almost free from structural defects, remain completely unchanged even after boiling with anhydrous acetone, cyclohexanone, methyl isobutyl ketone or ethyl acetoacetate for hours. Moreover, in the case of known azulmic acids, it is not possible to achieve significant stabilization towards the splitting off of hydrogen cyanide, even applying relatively high temperatures and using highly reactive reagents, such as acylating agents, alkylating agents, highly reactive monoisocyanates and polyisocyanates, phosgene, sulfur chlorides and phosphorous chlorides, or by ring-opening addition reactions of ε-caprolactam, ε-caprolactone or glycol carbonate, by a urea melt, by hydroxy-alkylation reactions with ethylene oxide, propylene oxide or styrene oxide, by the action of carbonyl diisocyanate, chlorosulfonyl isocyanate, acyl isocyanates or alkoxyacyl isocyanates, or by Michael additions of acrylonitrile, acrylic acid esters or methacrylic acid esters, or by Pinner reactions or esterification reactions. Only a slight reaction on the surface of the known azulmic acids takes place. In contrast, the substances stabilized according to the present invention can, surprisingly, be chemically modified by after-treatment reactions, for example by using the above-mentioned reagents.

The azulmic acids according to the invention, stabilized by reaction with aminoplast-forming agents and carbonyl compounds or condensation products (which may be chemically modified) thereof, and acid addition salts and complex compounds thereof and mixed products thereof with additives, and products of the above-mentioned substances which are chemically surface modified have a substantially higher swellability than the previously known azulmic acids which are almost free from structural defects. Therefore, in contrast to the previously known azulmic acids, they can be employed for the most diverse chemical reactions. As already mentioned, in contrast to the azulmic acids hitherto known, which are almost free from structural defects, they are also distinguished by a very high resistance towards splitting off of hydrogen cyanide under the influence of heat and under hydrolysis conditions, and may be used for many purposes.

The substances according to the invention thus represent a valuable advance in the art.

The compounds according to the invention cannot be unequivocally defined by means of formulae. However, they are characterized in that they contain molecular segments which are formed by condensation of aminoplast-forming agents and carbonyl compounds with reactive groups of the azulmic acids.

By "aminoplast-forming agents" in this connection is meant any and all those nitrogen compounds which are capable of forming N-oligocondensation products and N-polycondensation products with reactive carbonyl compounds.

These aminoplast-forming agents include nitrogen compounds, such as ureas, for example urea itself, acetylene-urea, dimethylacetyleneurea and N-methylurea; thioureas, such as unsubstituted thiourea; diureas, such as hexamethylenediurea, tetramethylenediurea and ethylenediurea; polyureas, such as are obtained by reacting aliphatic, cycloaliphatic or araliphatic diisocyanates or triisocyanates, or also biuret polyisocyanates, with ammonia or primary amines; polycarboxylic acid amides, such as oxalic acid diamide, succinic acid diamide and adipic acid diamide; monourethanes, diurethanes and polyurethanes, for example the reaction products of aliphatic, cycloaliphatic, araliphatic and aromatic mono- or bis-chloroformic acid esters with ammonia or primary amines; biurets; melamines, such as melamine itself; amidines, such as dicyanodiamidine; guanidines, such as aminoguanidine; guanazoles, guanamines, cyanamide, dicyandiamide, primary monoamines, secondary monoamines, arylamines, ammonia, diamines, triamines, hydrazines and carboxylic acid hydrazides, such as hydrazodicarboxamide, carbazic acid esters and hydrazodicarboxylic acid esters; and similar nitrogen compounds capable of aminoplast formation, preferably the derivatives which correspond to the abovementioned nitrogen compounds and contain N-alkylol groups, preferably N-methylol groups, and preferably the corresponding $C_1$-$C_4$-alkyl ethers of these N-alkylol derivatives. Aminoplast-forming agents in the sense of the invention also include higher-molecular $\alpha,\omega$-diureas, N-methylol compounds and N-methylolalkyl ethers thereof, and furthermore $\alpha,\omega$-bis-alkoxymethylurethanes which contain polyether, polythioether, polyacetal, polyester, polyester-amide or polycarbonate radicals of average molecular weight 400 to 10,000 and optionally additional urethane groups or substituted urea groups between the functional groups in the $\alpha$-position and $\omega$-position. Particularly preferred compounds in this context are higher-molecular nitrogen compounds which are capable of aminoplast formation and are water-soluble or water-dispersible compounds, for example compounds which contain polyethylene oxide radicals or radicals of copolymers of ethylene oxide and propylene oxide or tetrahydrofuran or of water-soluble polyacetals, prepared from diethylene glycol, triethylene glycol or tetraethylene glycol and formaldehyde, between the functional urethane groups or urea groups in the $\alpha$-position and $\omega$-position.

Aminoplast-forming agents which can be used according to the invention also include modified aminoplast-forming agents, that is to say aminoplast-forming agents which contain additional substances. Examples which may be mentioned are compounds which are capable of being incorporated rapidly and easily by co-condensation. These compounds include, as preferences, polyurethanes and polyureas with $NH_2$ end groups, polyamides of poly-($\beta$-alanine) with molecular weights of up to 2,000, N-methylol methyl ethers of polycaprolactam, polythiolactams, polypeptides of N-carboxy-$\alpha$-aminocarboxylic acids, low-molecular polyamides of aliphatic dicarboxylic acids and diamines, polyamides of cycloaliphatic components and aromatic components, polyamides containing O, S or N as heteroatoms, polyester-amides, co-condensates which also contain, in addition to amide groups, ester groups, urethane groups or urea groups, ethoxylated and propoxylated monoamides and polyamides, polyhydrazides and polyaminotriazoles, polysulfonamides, formaldehyde co-condensates with urea, melamine and dicyandiamide, low-molecular aniline/formaldehyde condensates, sulfonic acid amides, mononitriles and dinitriles, acrylonitrile, urotropine, hexahydrotriazines of primary amines and formaldehyde, Schiff's bases and ketimines or polyketimines, for example those of one mol of hexamethylenediamine and 2 mols of cyclohexanone, polyaddition products and polycondensation products of melamine and other aminoheterocyclic compounds with aldehydes and alcohols, polyaddition products and polycondensation products of nitriles with aldehydes, and reaction products of phosphorous acid and dialkylphosphites with carbonyl compounds and amines or polyamines. Furthermore, possible compounds in this connection capable of aminoplast formation are also those compounds which are described in German Offenlegungsschrift No. 2,324,134 on pages 7 to 12.

The modified aminoplast-forming agents which can be present in the condensed form in the compounds according to the invention also include N-alkylol compounds, and in particular N-methylol compounds, which are partly etherified with compounds such as: polyfunctional hydroxy compounds, for example polyalcohols, examples which may be mentioned being ethylene glycol, glycerol, formose sugar mixtures, glucose, oligosaccharides and polysaccharides and starch; polyethers of greater or lesser OH functionality, such as are used in polyurethane chemistry, for example polyethers of propylene oxide, which contain a proportion of ethylene oxide segments, either in co-condensed blocks, in statistical distribution or, preferably, as terminal segments, and which contain primary hydroxyl groups as end groups, it being possible for these polyethers to contain up to 70% by weight and more of polyethylene oxide segments and preferably to contain 13–30% by weight, relative to incorporated propylene oxide segments, of polyethylene oxide segments; higher-melting, pure polyethylene oxides of average molecular weight, 500–60,000, possible compounds being, in particular, addition products of propylene oxide and trimethylolpropane or glycerol which are reacted with ethylene oxide in a second stage in a manner such that 17–13 parts by weight of ethylene oxide are present for 83–87 parts by weight of bonded propylene oxide; polyhydroxy compounds with an average molecular weight of 250–14,000, preferably 400–6,000, which are optionally present as a mixture with low-molecular polyhydroxy compounds in the molecular weight range of 62–250; higher-molecular polyhydroxy compounds, for example polyethers which contain at least two terminal hydroxyl groups and in which preferably at least 10% of the hydroxyl groups are primary hydroxyl groups; and polyhydroxy polyesters, such as are employed in a wide range of variations in the diisocyanate polyaddition process.

Preferred carbonyl compounds which are present in the condensed form in the products according to the invention are aldehydes, ketones and keto esters with reactive carbonyl groups.

By aldehydes in this context there are to be understood optionally substituted saturated or unsaturated, aliphatic, cycloaliphatic, araliphatic and aromatic aldehydes. Examples include formaldehyde, acetaldehyde, butyraldehyde, isobutyraldehyde, chloral, hydroxy ethyl-aldehyde, hydroxyacetaldehyde, hydroxypivalaldehyde, acrolein, crotonaldehyde, glyoxal, methylglyoxal, cyclohexanealdehyde, furfurol, hydroxymethylfurfurol, glucose, glyceraldehyde, salicylaldehyde, benzaldehyde, 4-methyl-benzaldehyde, terephthaldialdehyde and other aldehydes which are formed from formaldehyde and other low-molecular aldehydes, if desired in situ, under aldol condensation conditions, formose synthesis conditions or acyloin condensation conditions. In this context there may be mentioned specifically those hydroxyaldehydes, the formation of which is represented schematically by the equations below.

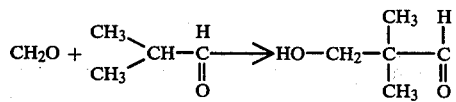 (a)

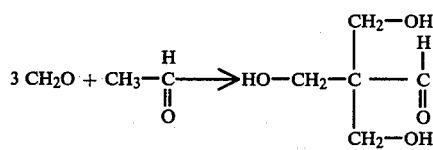 (b)

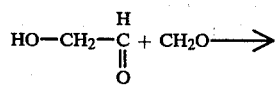 (c)

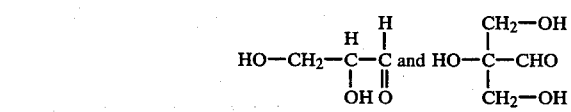

 (d)

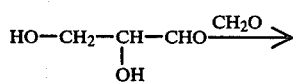

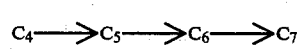

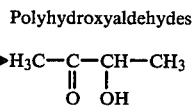 (e)

Polyhydroxyaldehydes

The reaction according to equation (d) corresponds to the Butlerow-Loew formose reaction.

Examples which may be mentioned of ketones which can be present in the condensed form in the products according to the invention are methyl ethyl ketone, methyl isobutyl ketone, hydroxyacetone, dihydroxyacetone, cyclohexanone, acetophenone and quinones, such as benzoquinone, the quinones being present, in particular, as condensation products with ammonia or polyamines.

An example of a suitable keto ester is ethyl acetoacetate.

As already indicated above, the products according to the invention are characterized in that they contain molecular segments which are formed by condensation of aminoplast-forming agents and carbonyl compounds with reactive groups of the azulmic acids. In the ideal case, the bonding of such a molecular segment "A" to amino groups or other groups formed by saponification of nitrile groups or by decyclization reactions can be represented by the formulae which follow:

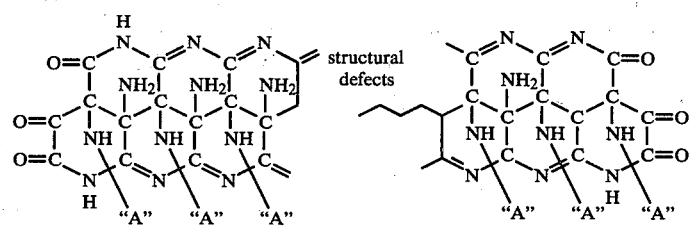

The radical "A" in this case represents the molecular segments which are formed by condensation of aminoplast-forming agents with carbonyl compounds. "A" preferably represents: arylidene-polyurea radicals and polyalkylidene-polyurea radicals, especially polymethylene-polyurea radicals, which can be illustrated by the following ideal formula

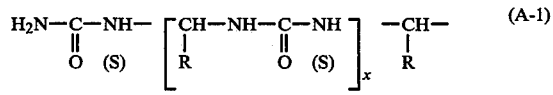 (A-1)

in which

X represents O or an integer from 1 to 18 and

R preferably represents hydrogen, methyl, ethyl, propyl, isopropyl or a radical of the formula

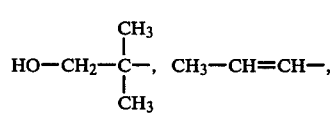

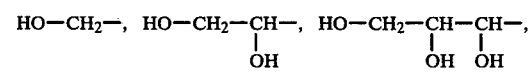

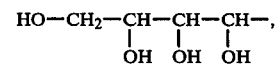

-continued $$HO-CH_2-CH-CH-CH-CH-$$
$$\phantom{HO-CH_2-}|\phantom{-CH}|\phantom{-CH}|\phantom{-CH}|$$
$$\phantom{HO-CH_2-}OH\phantom{-}OH\phantom{-}OH\phantom{-}OH$$

or an isomeric hydroxyaldehyde radical, such as is present in formose sugar mixtures, or an oligosaccharide, or the radical of the formula

[furan structure] or $HO-CH_2-$[furan structure].

Also preferred are biuret sulfones having the structure $$H_2N-\underset{\underset{O}{\|}}{C}-NH-SO_2-NH-\underset{\underset{R}{|}}{C}H-\quad\text{or}$$

$$-\underset{\underset{R}{|}}{C}H-NH-\underset{\underset{O}{\|}}{C}-NH-SO_2-NH-\underset{\underset{R}{|}}{C}H-$$

wherein

R has the meaning stated above for formula (A-1).

Also useful are hydrouracil radicals which are formed from 1 mol of unsaturated carboxylic acid, for example crotonic acid, 1 mol of urea and formaldehyde, the radical having the structure

[hydrouracil ring structure with $H_3C-OH$, $CH_2$, $C=O$, $-H_2C-N$, $N-CH_2-$, $C=O$]

being mentioned as an example.

"A" can also represent radicals of reaction products of maleic acid ureides with aldehydes, preferably formaldehyde, the radical having the structure $$HO-\underset{\underset{O}{\|}}{C}-CH=CH-\underset{\underset{O}{\|}}{C}-NH-\underset{\underset{O}{\|}}{C}-NH-CH_2-$$

being mentioned as an example;

lactam radicals and azalactam radicals containing methylene groups, the radicals having the structure

[lactam ring with $(CH_2)_5$, $N-CH_2-$, $C=O$] or [azalactam ring with $CH_3-N$, $CH_2-C=O$, $(CH_2)_3$, $N-CH_2-$]

being mentioned as examples;

radicals, containing methylene groups, of cyclic compounds, having the structure

[cyclic structure with $CH_2$, $R^2$, $CH_2-$, $R^1-HC$, $CH-N-C-N-R^3$, $R^2-N$, $NR^3$, $X$, $C=X$]

wherein

X represents oxygen or sulfur and $R^1$, $R^2$ and $R^3$ are selected independently and each represent hydrogen, methyl, ethyl or a methylene group;

radicals, containing methylene groups, of acetylenediurein, for example those having the structure

[bicyclic structure with $-CH_2$, $CH_2-$, $N-CH-N$, $O=C$, $C=O$, $N-CH-N$, $-CH_2$, $CH_2-$]

radicals, containing methylene groups, of ethyleneurea and vinylideneurea, such as radicals of the formulae

[ethyleneurea: $CH_2-CH_2$, $HN$, $N-CH_2-$, $C=O$], [$CH_2-CH_2$, $-CH_2N$, $N-CH_2-$, $C=O$]

[vinylideneurea: $CH=CH$, $HN$, $N-CH_2$, $C=O$] and [$CH=CH$, $-CH_2N$, $N-CH_2-$, $C=O$];

radicals, containing methylene groups, of urea, for example radicals having the structure $$H_2N-\underset{\underset{O}{\|}}{C}-NH-CH_2-\quad\text{or}\quad -CH_2-NH-\underset{\underset{O}{\|}}{C}-NH-CH_2-;$$

methylene radicals or alkylidene radicals of 2-oxo-4-methyl-6-ureido-hexahydropyrimidine, having the structure

[pyrimidine ring structure with $H$, $C-N$, $C=O$, $N-CH-O$, $R$, $H_3C-C$, $HC-N-C-NH-CH-$, $H$, $CH_2$, $RCH$, $R$]

wherein

R has the meaning mentioned above for formula (A-1);

methylene radicals or alkylidene radicals having melamine structures, such as

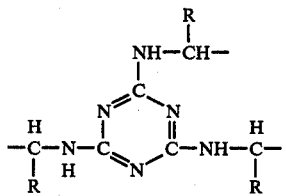

wherein

R has the meaning mentioned above for formula (A-1); radicals of the general formula

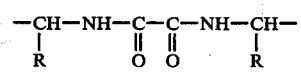

wherein

R has the meaning stated above for formula (A-1);
methylene radicals or alkylidene radicals having sulfonamide structures, for example

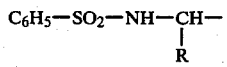

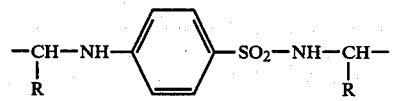

wherein

R has the meaning stated above for formula (A-1);
methylene radicals or alkylidene radicals having dicyandiamide or guanidine structures; and aromatic and aliphatic amines, polyamines and hydrazines substituted by methylene radicals or alkylidene radicals.

The structural defects contained in the substances according to the invention are defined by the formulae (F$_1$) and (F$_2$). In the formula (F$_1$), R preferably represents hydrogen, ammonium or one equivalent of a cation of a metal from main groups I to V or from the sub-groups I to VIII. Examples include the cations of lithium, sodium, potassium, beryllium, magnesium, calcium, strontium, barium, aluminum, thallium, tin, lead, bismuth, copper, silver, gold, zinc, cadmium, mercury, titanium, zirconium, chromium, manganese, iron, cobalt, nickel, platinum, palladium, rhodium and ruthenium. R furthermore preferably represents one equivalent of a protonated alkylamine with 1 to 6 carbon atoms, a protonated dialkylamine with 1 to 6 carbon atoms per alkyl group, a protonated trialkylamine with 1 to 6 carbon atoms per alkyl group, a protonated hydroxyalkylamine with 1 to 6 carbon atoms, a protonated di-(hydroxy-alkyl)-amine with 1 to 6 carbon atoms per hydroxy-alkyl group, a protonated tri-(hydroxyalkyl)-amine with 1 to 6 carbon atoms per hydroxyalkyl group, a protonated cycloalkylamine with 3 to 8 carbon atoms, a protonated alkylenediamine with 2 to 6 carbon atoms, a protonated guanidine, melamine or dicyandiamide, or of a protonated, saturated or unsaturated heterocyclic nitrogen base with 5 to 7 ring members and 1 to 3 nitrogen atoms in the heterocyclic ring. R can also represent those cations which are formed by quaternization, for example permethylation, of the above-mentioned basic nitrogen compounds. Particularly preferred nitrogen bases in this context include methylamine, dimethylamine, trimethylamine, ethylamine, diethylamine, triethylamine, tert.-butylamine, ethanolamine, diethanolamine, triethanolamine, N-methylethanolamine, propanolamine, dipropanolamine, tripropanolamine, cyclopropylamine, cyclopentylamine, cyclohexylamine, ethylenediamine, diethylenetriamine, triethylenetetramine, tetramethylenediamine, isophorone-diamine, oleylamine, fatty amines, pyrrolidine, piperidine, morpholine, imidazole, pyrazole, 1,2,4-triazole, 1,2,3-triazole, 2-ethylimidazole and aminotriazole. R also preferably represents trialkylsulfonium cations, the triethylsulfonium cation.

By acid addition salts of azulmic acid which are stabilized by reaction with aminoplast-forming agents and carbonyl compounds or optionally chemically modified condensation products thereof there are to be included those salts which are formed by addition of a proton of an inorganic or organic acid onto an amino group or another suitable group in an azulmic acid stabilized according to the invention. Preferred inorganic acids here include hydrogen halide acids, such as hydrofluoric acid, hydrochloric acid and hydrobromic acid; phosphorous acids, such as phosphoric acid and phosphorous acid; dialkylphosphoric acids such as dibutylphosphoric acid; polyphosphoric acids with molecular weights from 6,000 to 40,000; phospholine oxide-phosphonic acids, such as those of the formulae

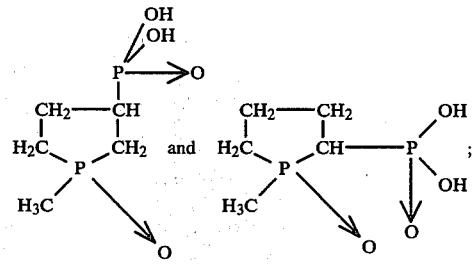

nitric acid; and, acids derived from sulfur, such as sulfuric acid and sulfonic acids, such as ethylsulfonic acid, p-toluenesulfonic acid and naphthalene-1,5-disulfonic acid. Preferred organic acids are saturated or unsaturated carboxylic acids, such as formic acid, acetic acid, propionic acid, 2-ethyl-caproic acid, acrylic acid, methacrylic acid, oleic acid and ricinoleic acid; halogenocarboxylic acids, such as chloroacetic acid, dichloroacetic acid and trichloroacetic acid; and dicarboxylic acids, such as maleic acid, fumaric acid and succinic acid, and half-esters derived therefrom; and hydroxycarboxylic acids, such as hydroxyacetic acid, tartaric acid, citric acid and salicylic acid.

By azulmic acid complex compounds stabilized by reaction with aminoplast-forming agents and carbonyl compounds or optionally chemically modified condensation products thereof, there are to be included, preferably, complexes of azulmic acids stabilized according to the invention and metal compounds or ammonium salts. Possible metal compounds here are, in particular, salts, acids, hydroxides and oxides of metals of main groups II to V or of sub-groups I to VIII. Examples include calcium chloride, acetate, nitrate, hydroxide and oxide; strontium nitrate; barium chloride and acetate; borates; aluminum acetate and formate; thallium sulfate; thallium nitrate; silicon tetrachloride; sodium and potassium silicate; tin (II) chloride; lead (II) chloride, acetate and hydroxide; bismuth (III) hydroxide and bismuth (III)

nitrate; copper sulfate, nitrate and acetate; silver nitrate; aurichlorohydric acid; zinc chloride and acetate; cadmium chloride; mercury (II) chloride; titanium tetrachloride and tetrabutylate; zirconium sulfate; vanadates; chromium (III) chloride; molybdates; tungstates, and heteropolyacids thereof; manganese (II) sulfate and acetate; iron (II) sulfate and acetate; iron (III) chloride; cobalt chloride; nickel chloride; hexachloroplatinic acid; and palladium (II) chloride. Possible ammonium salts include ammonium nitrate and ammonium acetate.

Additives which the products according to the invention can contain include naturally occurring organic substances and products obtained therefrom, naturally occurring inorganic substances and products obtained therefrom, synthetic organic products, synthetic inorganic products and/or mixed products consisting of organic and inorganic products.

Preferred naturally occurring organic substances and products obtained therefrom include, in this case, wood flour, lignin powder, lignin-sulfonic acids, ammonified ligninsulfonic acids, humus, humic acids, ammonified humic acids, peat, proteins and degradation products (for example hydrolysis products) of yeasts, algal material (alginates), polypeptides, such as wool and gelatine, fish-meal and bone-meal, and furthermore aminoacids, oligopolypeptides, pectins, monosaccharides, such as glucose and fructose, disaccharides, such as sucrose, oligosaccharides, polysaccharides, such as starch and cellulose, and also hemi-celluloses, homogenized materials of vegetable and animal origin, active charcoals and ashes which are obtainable by partial oxidation, complete oxidation or combustion of organic substances formed by photosynthesis or of customary fuels, fir ash, broom ash, ash of Serbian spruce, oak ash, birch ash, beech ash, willow ash and tobacco leaf ash.

Preferred naturally occurring inorganic substances and products obtained therefrom include silicates, such as aluminum silicates, calcium silicates, magnesium silicates and alkali metal silicates, sea sand and other naturally occurring silicon dioxides, silicic acids, (in particular disperse silicic acids), silica gels, clay minerals, mica, carbonates, such as calcium carbonate, phosphorite and phosphates, such as calcium phosphate and ammonium magnesium phosphate, sulfates, such as calcium sulfate and barium sulfate, and oxides, such as zirconium dioxide, nickel oxide, palladium oxide, barium oxide, and disperse antimony oxides and aluminum oxides, such as bauxite and hydrated aluminum oxide, and fly ashes and diverse types of carbon black.

Preferred synthetic organic products include aminoplast condensates, in particular those of urea, dicyandiamide, melamine or oxamide and aldehydes, such as formaldehyde, acetaldehyde, isobutyraldehyde, hydroxypivalaldehyde, crotonaldehyde, hydroxyacetaldehyde, furfurol, hydroxymethylfurfurol, glyoxal and glucose. Particular products include for example, condensation products of urea and formaldehyde, urea and glyoxal, urea and acetaldehyde, urea and isobutyraldehyde, urea and crotonaldehyde, urea and hydroxypivalaldehyde and 2-oxo-4-methyl-6-ureidohexahydropyrimidine, which is a known condensation product of 1 mol of crotonaldehyde and 2 mols of urea and is formed from the intermediate product crotonylidenediurea by saturation of the double bond and has the formula

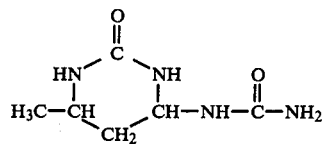

There may also be mentioned polyalkylideneureas, such as polymethyleneureas, and polymethylenethioureas, highly cross-linked aminoplast condensates, urea/hydrazodicarboxamide/formaldehyde condensates, dicyandiamide condensates, oxamide condensates and high-molecular polyammonium polyphosphates having the structure

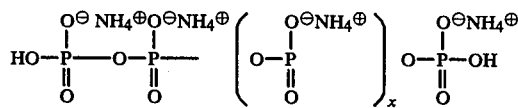

in which
x = 10–200.

Further preferred synthetic organic products are plastics, such as polyamide powders, polyurethane powders and polycarbodiimides; polymeric quinones; addition products and condensation products of quinones, especially benzoquinone, with amines or ammonia, and also with aldehydes, especially formaldehyde; cross-linked gelatine; synthetic agents for improving soil, for example the product known as Hygromull (=urea/formaldehyde resin flakes); synthetic sugars, for example formose sugar mixtures prepared from formaldehyde; and sparingly soluble cane sugar complexes, such as the sucrose-calcium oxide complex having the composition 1 mol of sucrose: 3 mols of calcium oxide; organic ammonium salts, such as ammonium carbaminate; and other organic nitrogen compounds, such as hexamethylenetetramine and hexahydrotriazines.

Preferred synthetic inorganic products which may be mentioned include fertilizers, such as superphosphate, basic slag, Rhenania phosphate, phosphorite, calcium cyanamide, calcium ammonium nitrate, Leuna saltpeter, potassium phosphates, potassium nitrate and ammonium nitrate; pigments, such as iron oxides and titanium dioxides; metal oxides and metal hydroxides, such as calcium oxide, calcium hydroxide, lead hydroxide, bismuth hydroxide, manganese hydroxide and magnesium hydroxide, hydroxides which are prepared in situ being particularly preferred; sulfur; sparingly soluble metal sulfates; carbonates, phosphates and silicates and hetero-polyacids of tungsten, vanadium and molybdenum; synthetic silicic acids, in particular silicic acid prepared in situ, and salts thereof; waterglass; salts such as cobalt molybdate, ammonium carbonate and calcium carbonate; and catalysts, in particular heavy metal catalysts, of the most diverse nature.

Preferred possible mixed products consisting of inorganic and organic products include neutral, basic or acid soils, naturally occurring agents for improving soil, and biologically active garden mold.

The additives can be physically and/or chemically bonded to the products according to the invention in an amount of from 1 to 95 percent by weight, preferably from 5 to 90 percent by weight. In some cases the stabilized azulmic acids are coated by the additives. Stabilized azulmic acids coated or micro-encapsulated, by polycarbodiimides may be mentioned as an example of products of this type.

The surface of the products according to the invention can be modified chemically with the most diverse components. Preferred products in this case are those, the surface of which is modified by one of the following treatments:

(a) by treatment with urea melts (that is, an agent which supplies isocyanic acid), monoisocyanates or polyisocyanates, treatment with the substances last mentioned leading to cross-linked, insoluble macropolyisocyanates containing urea groups and with isocyanate values between 0.5 and 3% by weight of NCO;

(b) by treatment with acylating agents, such as formic acid, acetic anhydride, butyric anhydride or mixed acid anhydrides of acetic acid and oleic acid, preferably in the presence of sodium acetate or potassium acetate;

(c) by treatment with cyclic acid anhydrides, such as maleic anhydride, phthalic anhydride or hexahydrophthalic anhydride;

(d) by treatment with melts of dicarboxylic acids, such as adipic acid, phthalic acid, hexahydrophthalic acid or trimellitic acid;

(e) by treatment with inorganic acid chlorides, such as cyanogen chloride, phosgene, thionyl chloride, sulfur chlorides, phosphorous oxychloride, phosphorous pentachloride, silicon tetrachloride, antimony trichloride or titanium tetrachloride;

(f) by treatment with organic acid chlorides, such as acetyl chloride, benzoyl chloride, chloroformic acid esters of the general formula

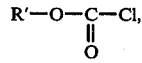

in which

R' represents alkyl with 1 to 8 carbon atoms, bifunctional chloroformic acid esters of the general formula

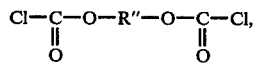

in which

R" represents alkylene with 2 to 8 carbon atoms, benzenesulfonic acid chlorides, phosphoric acid ester chlorides, chloromethanesulfonyl chloride or cyanuric acid chloride;

(g) by treatment with alkylating agents, such as dimethyl sulfate, methyl iodide or methyl bromide;

(h) by treatment with dichloroethane, glycol chlorohydrin, chloroacetic acid ethyl ester, dichloroacetic acid ethyl ester, chloroacetaldehyde diethyl acetal, allyl chloride, benzyl chloride, trichloromethyl isocyanide dichloride or other isocyanide chlorides or alkylating reagents;

(i) by treatment with ε-caprolactam, ε-caprolactone, hydroxy-pivalic acid lactone, cyclic 6-membered or 8-membered siloxanes, azalactams (such as are known from German Offenlegungsschrift 2,035,800), glycol carbonate, ethylene oxide, propylene oxide, butylene oxide, styrene oxide, epichlorohydrin, butyrolactone, valerolactone, oxazolidines, oxazolines, imidazolidines, isatoic acid anhydride or cyclic anhydrides of aminoacids and phosgene;

(j) by treatment with acrylonitrile or other vinyl monomers, such as acrylic acid or methyacrylic acid or the methyl, ethyl, β-hydroxyethyl or propyl esters thereof;

(k) by treatment with alcohols or bifunctional alcohols, such as ethylene glycol, hexanediol or octanediol, under Pinner reaction conditions (preferably in anhydrous HCl and an alcohol);

(l) by treatment with carbodiimides, isocyanatocarbodiimides or polyisocyanatocarbodiimides (such as are known from German Offenlegungsschriften Nos. 2,504,334 and 2,504,400) or with masked carbodiimides, the so-called uretoneimine polyisocyanates, and furthermore with monocyanates or biscyanates or monocyanamides or biscyanamides;

(m) by treatment with hydroxy-alkane-phosphonic acid esters or the acids from which they are derived, especially with hydroxymethyl-phosphonic acid esters or the free hydroxymethyl-phosphonic acid;

(n) by treatment with chloromethylalkoxysilanes, for example those of the formulae

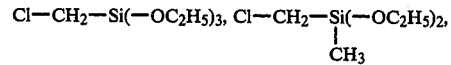

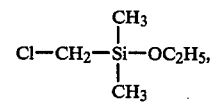

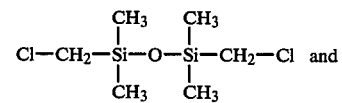

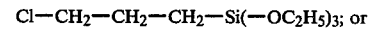

(o) by treatment with the most diverse mononitriles or polynitriles, preferably hydroxymethylnitrile, under Thorpe reaction conditions, catalyzed by hydroxyl anions.

The products according to the invention which are chemically surface modified can contain up to 0.06 mol, preferably 0.01 to 0.05 mol, of the group introduced by treatment of the surface per mol of azulmic acid.

The products according to the invention can also contain catalysts and chain stoppers which are employed in carrying out the process according to the invention.

The common characteristic of process variants (1) to (11) according to the invention is the condensation of amino, amide, amidine or lactam groups, present in the azulmic acids employed, with aminoplast-forming agents and carbonyl compounds or condensation products thereof (which may be chemically modified). If, for example, urea is used as the aminoplast-forming agent and, for example, formaldehyde is used as the carbonyl component, condensation thereof with an amino group of an azulmic acid can be illustrated, for example, by the ideal equation which follows:

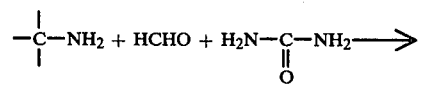

-continued

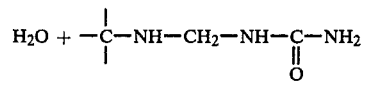

In addition to the reaction shown by means of the equation, numerous other reactions can proceed; thus, for example, those which lead to methylol compounds, N,N-methylene compounds or compounds with methylene ether linkages (>N—CH$_2$—O—CH$_2$—N<).

In process variant (1) according to the invention, modified azulmic acids optionally containing additives and containing from 0.5 to 55 percent by weight of ionic groups of the formula (F$_1$) above and containing from 0.5 to 15 percent by weight of groups of the formula (F$_2$) above, are reacted in an aqueous medium, optionally in the presence of additives and if desired and/or necessary in the presence of catalysts, and/or chain stoppers, with aminoplast-forming agents and carbonyl compounds or freshly prepared (optionally chemically modified) condensation products thereof.

In the formula (F$_1$), R preferably represents those substituents which have already been mentioned as preferred for R in connection with the description of the substances according to the invention.

The modified azulmic acids to be used as starting materials in process variant (1) according to the invention (=azulmic acids containing structural defects) can contain 1 to 95 percent by weight, preferably 5 to 90 percent by weight, of additives. Possible additives here include naturally occurring organic substances and products obtained therefrom, naturally occurring inorganic substances and products obtained therefrom, synthetic organic products, synthetic inorganic products and/or mixed products consisting of organic and inorganic products. These include, as preferences, those materials which have already been mentioned as preferred in connection with the description of the additives optionally present in the substances according to the invention.

The modified azulmic acids, optionally containing additives, required as starting materials have not hitherto been described in the literature. However, they can be prepared in a simple manner by various processes. Thus, the products concerned, which are the subject of U.S. application Ser. No. 11,554, filed on Feb. 12, 1979, are obtained by a process in which (A) azulmic acid, which is known and almost free from structural defects, in an aqueous medium, (a) is treated with an organic or inorganic acid, optionally in the presence of an additive, or (b) is treated with a base or basic salt, optionally in the presence of an additive, or (c) is treated with water in the neutral range, or (d) is treated with a vegetable ash and/or a catalytically active naturally occurring substance and/or a fertilizer, or (e) is treated with a metal salt, optionally in the presence of an oxidizing agent and optionally in the presence of an organic acid, or (f) is treated with a metal salt complex of a stabilized azulmic acid, or (g) is treated with an oxidizing agent, or in which (B) hydrocyanic acid is polymerized under hydrolyzing conditions in an aqueous medium with the aid of a basic catalyst, optionally in the presence of an additive. The product prepared by any of the processes or processes variants mentioned is then optionally treated with an acid or base.

Hydrocyanic acid polymers which are almost free from structural defects, so-called azulmic acids, are used as starting materials in the preparation of the modified azulmic acids, optionally containing additives, by process (A), variants (a) to (g). Azulmic acids of this type which are almost free from structural defects are already known (see Houben-Weyl, Volume 8 (1952), page 261; German Pat. No. 662,338 and German Offenlegungsschrift No. 949,600).

According to variant (a) of process (A) the azulmic acids which are almost free from structural defects are treated with inorganic or organic acids, optionally in the presence of additives. Preferred inorganic or organic acids for this treatment are preferably all those which have already been listed as preferred in connection with the description of the stabilized acid addition products, according to the invention, of azulmic acid.

Additives which can be used include naturally occurring organic substances and products obtained therefrom, naturally occurring inorganic substances and products obtained therefrom, synthetic organic products, synthetic inorganic products and/or mixed products consisting of organic and inorganic products. These include, as preferences, all those materials which have already been mentioned as preferred in connection with the description of the additives optionally present in the substances according to the invention.

Variant (a) of process (A) is carried out in an aqueous medium, preferably in water. However, it is also possible to replace some of the water by other diluents, such as hydrogen sulfide, liquified sulfur dioxide, liquified ammonia or an alcohol, methanol and ethanol being mentioned in particular.

In the case of variant (a) of process (A), the reaction temperatures can be varied within a substantial range. In general, the reaction is carried out between 0° C. and 200° C., preferably between 20° C. and 120° C.

In general, the reaction according to variant (a) of process (A) is carried out under normal pressure. However, it is also possible to carry out the reaction under increased pressure.

In carrying out variant (a) of process (A), a catalytic amount or 1 to 4 mols of an inorganic or organic acid and optionally an amount of additives such that the proportion thereof in the end product is between 1 and 95 percent by weight, preferably between 5 and 90 percent by weight, are employed per mol (relative to the molecular unit

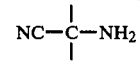

with the equivalent weight 54) of azulmic acid which is almost free from structural defects. The mixture is worked up by customary methods. In general, a procedure is followed in which, after the reaction has ended, the reaction mixture is filtered and the solid product obtained is appropriately washed and dried.

If nitric acid is used for producing structural defects in carrying out variant (a) of process (A), and the reaction temperature is thereby kept relatively low, preferably between 20° C. and 30° C., traces of hydrocyanic acid split off are oxidized, while at the same time addition reactions of nitric acid with the amino groups of the modified azulmic acids take place extremely readily, and types of modified azulmic acids which contain ionic groups of the formula

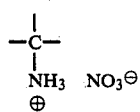

on their amino groups are obtained by a simple topochemical reaction.

In this manner, about 0.5 mol of nitric acid is bonded per 100 parts by weight of modified azulmic acid. Depending on the type of process and the reaction time of the dilute nitric acid on the modified azulmic acids, about 30 to 50% of the amino groups present are available for salt formation. Traces of free nitric acid can advantageously be converted into ammonium nitrate by gassing the products with gaseous ammonia, the reaction advantageously being carried out in the solid phase in a fluidized bed.

If phosphoric acid or phosphorous acid is used for producing structural defects in carrying out variant (a) of process (A), and the reaction temperatures are kept relatively low, preferably between 20° C. and 55° C., decarboxylation reactions and the production, associated therewith, of $F_2$ structural defects are largely suppressed. At the same time, the acids are bonded extremely readily by the amino groups of the modified azulmic acids in a heterogeneous reaction. In this manner, about 0.2 mol of phosphoric acid, or about 0.5 mol of phosphorous acid, are bonded by about 100 parts by weight of modified azulmic acid within five minutes. The salts formed are almost water-insoluble. Small amounts of free phosphoric acid or phosphorous acid contained in the products can advantageously be converted into the corresponding ammonium salts by treating the products with gaseous ammonia, the reaction advantageously being carried out in the solid phase in a fluidized bed.

In a particular embodiment of variant (a) of process (A), the azulmic acid is reacted with 0.2 to 80% strength phosphoric acid or phosphorous acid in the presence of one or more naturally occurring hydrolytically degradable substances, for example cellulose, hemicelluloses, sugars, lignin, polymeric quinones, wood flour, vegetable material, polypeptides, such as gelatine and wool, and furthermore yeast proteins, algal compositions and peat compositions. In this embodiment, the structural defects are produced with simultaneous hydrolytic degradation of the particular naturally occurring substances employed. If polypeptides are used, these are split into aminoacid mixtures. Because of its numerous amino groups, the azulmic acid bonds about 0.3 to 0.4 mol of phosphoric acid or phosphorous acid, while the phosphoric acid salts of the aminoacids or those of the oligopolypeptides, or the other low-molecular degradation products of the naturally occurring substances employed are frequently fixed by the azulmic acid matrix in a large amount, even when they are water-soluble. Excess acid, for example phosphoric acid, can be precipitated as calcium phosphate on the azulmic acid matrix by adding calcium hydroxide. If hydrolyzed sugars and oligosaccharides are present in this case, they are absorbed on the azulmic acid in the form of their calcium complexes, which are usually sparingly soluble. The process products obtained by this variant of process (A) can be stored for a relatively long period without unpleasant odors being emitted, as is otherwise the case when naturally occurring substances such as oligopeptides, peptide/sugar mixtures and the like are degraded by biological processes.

A further particular embodiment of variant (a) or process (A) consists of a procedure in which, in order to produce the structural defects, 1 to 4 mols of 1 molar phosphoric acid solution are employed and the excess phosphoric acid is then precipitated as calcium phosphate by adding calcium chloride, as magnesium phosphate by adding magnesium chloride or as ammonium magnesium phosphate by adding ammonium and magnesium salts. Additives of the most diverse nature can also be used at the same time during this procedure. Particularly preferred additives in this case are vegetable ashes, insoluble polyquinones, addition products or condensation products of benzoquinone and amines, in particular ammonia, and furthermore lignin, lignin-sulfonic acids, humic acids, diverse fly ashes, bauxite, aluminum oxide, cobalt molybdate, silicon dioxide, active charcoal, zirconium dioxide, nickel oxide, palladium oxide and barium oxide. Further preferred additives are also sugars, such as cane sugar and other sugars containing no free aldehyde groups, or formose sugar mixtures prepared from formaldehyde. These very diverse types of sugars can be fixed in the channels and pores of the solid azulmic acid matrices. Furthermore, the various sugars can also be absorbed onto the azulmic acids in the form of their calcium complexes, which are usually sparingly soluble.

According to variant (b) of process (A) the azulmic acids which are almost free from structural defects are treated with bases or basic salts, optionally in the presence of additives. Both organic and inorganic bases can be used as the bases here. Organic bases which are preferably used are ammonia, alkylamines with 1 to 6 carbon atoms, dialkylamines with 1 to 6 carbon atoms per alkyl group, trialkylamines with 1 to 6 carbon atoms per alkyl group, hydroxyalkylamines with 1 to 6 carbon atoms, di-(hydroxyalkyl)-amines with 1 to 6 carbon atoms per hydroxyalkyl group, tri-(hydroxyalkyl)-amines with 1 to 6 carbon atoms per hydroxyalkyl group and alkylhydroxyalkyl-amines with 1 to 6 carbon atoms in the alkyl group and in the hydroxyalkyl group, cycloalkylamines with 3 to 8 carbon atoms, alkylenediamines with 2 to 6 carbon atoms, guanidine, melamine, dicyandiamide, saturated or unsaturated heterocyclic nitrogen bases with 5 to 7 ring members with 1 to 3 nitrogen atoms in the heterocyclic ring, and those bases which are derived from the compounds formed by quaternization, for example permethylation, of the above-mentioned nitrogen compounds, and furthermore those bases which are derived from trialkylsulfonium compounds. Particularly preferred nitrogen bases in this context are ammonia, methylamine, methylethanolamine, dimethylamine, trimethylamine, ethylamine, diethylamine, triethylamine, tert.-butylamine, ethanolamine, diethanolamine, triethanolamine, cyclopropylamine, cyclopentylamine, cyclohexylamine, ethylenediamine, pyrrolidine, piperidine, morpholine, imidazole, pyrazole, 1,2,4-triazole, 1,2,3-triazole, 2-ethylimidazole and aminotriazole. Also preferred is triethylsulfonium hydroxide.

Inorganic bases which are preferably used are alkali metal hydroxides and alkaline earth metal hydroxides. Lithium hydroxide, sodium hydroxide, potassium hydroxide, magnesium hydroxide, calcium hydroxide, strontium hydroxide and barium hydroxide may be mentioned in particular.

Preferred basic salts for carrying out variant (b) of process (A) are alkali metal sulfides, such as sodium sulfide, sodium bisulfide and potassium bisulfide, and further sodium thiosulfate, ammonium thiosulfate, ammonium polysulfides, calcium bisulfide, calcium thiosulfate and calcium cyanamide, and also potassium carbonate, potassium bicarbonate, potassium cyanate and waterglass (sodium waterglass or potassium waterglass). Mixtures of ammonia and sodium thiosulfate, ammonium thiosulfate, sodium bisulfide, sodium sulfide and/or ammonium polysulfides are also particularly suitable for producing structural defects by this method.

Additives which can be used in carrying out variant (b) of process (A) are naturally occurring organic substances and products obtained therefrom, naturally occurring inorganic substances and products obtained therefrom, synthetic organic products, synthetic inorganic products and/or mixed products consisting of organic and inorganic products. These additives include, as preferences, all those materials which have already been mentioned as preferred in connection with the description of the additives optionally present in the substances according to the invention.

Variant (b) of process (A) is carried out in an aqueous medium or in an aqueous-alcoholic medium. A preferred reaction medium is water, or a mixture of water and an alcohol, such as methanol or ethanol. However, it is also possible to replace some of the water by hydrogen sulfide, sulfur dioxide or ammonia. If the reaction is carried out in the presence of hydrogen sulfide or in the presence of reagents which release hydrogen sulfide under the reaction conditions and the reaction temperature is kept between 70° C. and 100° C., small amounts of hydrocyanic acid split off are converted into carbon oxysulfide and ammonia, structural defects simultaneously being produced.

The reaction temperatures can be varied within a substantial range in the case of variant (b) of process (A). In general, the reaction is carried out at temperatures between 0° C. and 200° C., preferably between 20° C. and 150° C.

In general, the reaction according to variant (b) of process (A) is carried out under normal pressure. However, it is also possible to carry out the reaction under increased pressure. The latter is particularly advisable if gaseous ammonia, hydrogen sulfide or sulfur dioxide is used for producing structural defects.

In carrying out variant (b) of process (A), a catalytic amount, or 1 to 4 mols, preferably 1 to 2 mols, of base or basic salt and optionally an amount of additives such that their proportion in the end product is between 1 and 95 percent by weight, preferably between 5 and 90 percent by weight, are employed per mol (relative to the molecular unit

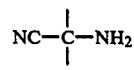

with the equivalent weight 54) of azulmic acid which is almost free from structural defects. The mixture is worked up by customary methods. In general, a procedure is followed in which, after the reaction has ended, the reaction mixture is filtered and the solid product obtained is appropriately washed and dried. The base still contained in the end product can also advantageously be neutralized by adding a corresponding amount of acid, for example phosphoric acid, so that the products formed then also contain the particular salts.

If an excess of acid is used in this neutralization, acid addition salts of the particular modified azulmic acids are formed.

If strong bases are used for producing structural defects in carrying out variant (b) of process (A), azulmic acids with particularly high contents of structural defects can be prepared after relatively long reaction times. The products formed have a polyelectrolyte character. In the case where potassium hydroxide is employed as the base, the course of a reaction of this type can be illustrated ideally by the equation which follows:

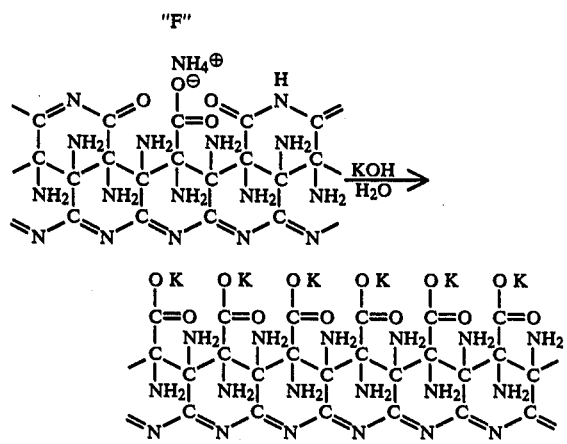

If an excess of concentrated (25% strength) ammonia solution is used in this variant (b) of process (A), and the reaction is carried out at room temperature, after a reaction time of about 6 to 20 hours, modified azulmic acids which contain a high proportion of structural defects and in which some of the carboxyl groups are present in the form of ammonium carboxylate groups are obtained. However, it is also possible to convert modified azulmic acids in which free carboxyl groups are present into the corresponding products containing the ammonium salt by gassing with ammonia in a fluidized bed.

In a particular embodiment of variant (b) of process (A), the azulmic acid is reacted with gaseous ammonia under pressure in an aqueous-alcoholic medium at temperatures between 120° C. and 140° C. Modified azulmic acids which have a high content of ammonium carboxylate groups are formed in this procedure. The free amino groups contained in these products are capable of additionally also bonding acids, for example phosphoric acid, so that the end products contain ammonium ions and acid radicals side by side.

In a further particular embodiment of variant (b) of process (A), the azulmic acid is reacted with catalytic amounts, or even with larger amounts, of waterglass—about 1 to 4 mols of waterglass per 100 g of azulmic acid—in a topochemical reaction. In this procedure, modified azulmic acids charged with potassium ions or sodium ions are formed, the saponifiable nitrile groups of which act as latent acids and precipitate silicic acids. The latter are absorbed, in fine distribution, onto the reaction products. Any excess sodium silicate or potassium silicate present can be precipitated by simple gassing of the particular dispersions with carbon dioxide, or can be precipitated in a particularly advantageous manner by adding phosphoric acid or calcium chloride mixed with potassium phosphates or sodium phosphates or calcium silicates.

According to variant (c) of process (A), the azulmic acids which are almost free from structural defects are treated with distilled water in the neutral range, preferably at pH values between 6 and 6.5, for 4 to 60 hours. The reaction temperatures can be varied within a substantial range in this procedure. In general, the reaction is carried out at temperatures between 60° C. and 150° C., preferably between 80° C. and 120° C. In general, the reaction is carried out under normal pressure; however, it is also possible to carry it out under increased pressure. Isolation of the reaction products is also carried out by customary methods in this variant of process (A). In general, a procedure is followed in which, after the reaction has ended, the reaction mixture is filtered and the solid product obtained is dried.

According to variant (d) of process (A), the azulmic acids which are almost free from structural defects are treated with vegetable ashes and/or catalytically active naturally occurring substances and/or fertilizers.

Possible vegetable ashes in this procedure are the combustion products of the most diverse substances formed by photosynthesis. Preferred ashes which may be mentioned are the ashes of fir, broom, Serbian spruce, oak, straw, birch, beech, willow, tobacco leaves and tobacco stalks, and furthermore of cereals, such as rye or barley, and also of fungi, for example edible mushrooms, and of apples, carrots, potato tubers and leaves of white cabbage. It is particularly advantageous to use potassium-rich varieties of ash. By ashes there are also to be understood here mixtures of various vegetable ashes.

Preferred catalytically active naturally occurring substances are biologically active garden mold and basic or acid soils of the most diverse nature.

All the commercially available fertilizers can be used as fertilizers in the production of structural defects according to variant (d) of process (A). Preferred fertilizers which may be mentioned are varieties of peat charged with plant nutrients, superphosphate, basic slag, Rhenania phosphate, phosphorite, calcium cyanamide, calcium ammonium nitrate, Leuna saltpeter, potassium phosphates, potassium nitrate and ammonium nitrate.

Variant (d) of process (A) is carried out in an aqueous medium, preferably in water. However, it is also possible to replace some of the water by other diluents, such as hydrogen sulfide or an alcohol, methanol and ethanol being mentioned in particular.

The reaction temperatures can be varied within a substantial range in the case of variant (d) of process (A). In general, the reaction is carried out between 50° C. and 150° C., preferably between 80° C. and 120° C.

In general, the reactions according to variant (d) of process (A) are carried out under normal pressure; however, it is also possible to carry out the reactions under increased pressure.

In carrying out variant (d) of process (A), the azulmic acid is reacted with catalytic, or even with larger amounts, of vegetable ashes and/or catalytically active naturally occurring substances and/or fertilizers. If the vegetable ashes, catalytically active naturally occurring substances and/or fertilizers are used in a relatively large amount, these substances are not only used for producing structural defects, but they are also simultaneously contained, as additives, in the products formed. The mixture is worked up by customary methods. In general, a procedure is followed in which, after the reaction has ended, the reaction mixture is filtered and the solid product obtained is appropriately washed and dried.

According to variant (e) of process (A), the azulmic acids which are almost free from structural defects are treated with metal compounds, optionally in the presence of oxidizing agents and optionally in the presence of organic acids.

Preferred metal compounds here are salts of metals of main groups II to V or of sub-groups I to VIII. Examples which may be mentioned are calcium chloride, acetate and nitrate, strontium nitrate, barium chloride and acetate, aluminum acetate and formate, thallium sulfate and nitrate, silicon tetrachloride, sodium silicate and potassium silicate, tin (II) chloride, lead (II) chloride, acetate and nitrate, bismuth (III) nitrate, copper sulfate, nitrate and acetate, silver nitrate, aurichlorohydric acid, zinc chloride and acetate, cadmium chloride, mercury (II) chloride, titanium tetrachloride and tetrabutylate, zirconium sulfate, chromium (III) chloride, manganese (II) sulfate and acetate, iron (II) sulfate and acetate and iron (III) chloride, cobalt chloride, nickel chloride, hexachloro-platinic acid and palladium (II) chloride. Further preferred metal compounds which can be used are the acids of vanadium, molybdenum and tungsten, and hetero-polyacids thereof.

Possible oxidizing agents which can be present when carrying out variant (e) of process (A) are any of the customary agents which release oxygen. Air and nitric acid, hypochlorous acid, perchloric acid, calcium hypochlorite and hydrogen peroxide can preferably be used.

Preferred organic acids which can be present when carrying out variant (e) of process (A) are saturated and unsaturated optionally substituted carboxylic acids. Formic acid, acetic acid, propionic acid, 2-ethylcaproic acid, acrylic acid, methacrylic acid, oleic acid, ricinoleic acid, chloroacetic acid, dichloroacetic acid, trichloroacetic acid and hydroxyacetic acid may be mentioned in particular.

In general, variant (e) of process (A) is carried out in an aqueous medium, preferably in water. However, it is also possible to replace some of the water by other diluents, such as acids or organic hydrocarbons, formic acid and xylene being mentioned in particular.

The reaction temperatures can be varied within a substantial range in the case of variant (e) of process (A). In general, the reaction is carried out between 0° C. and 150° C., preferably between 20° C. and 120° C.

In general, the reaction according to variant (e) of process (A) is carried out under normal pressure. However, it is also possible to carry out the reaction under increased pressure.

In carrying out variant (e) of process (A), a catalytic amount, or even a larger amount—say 1 to 2 mols—of metal compound and optionally a catalytic amount, or even a larger amount, of oxidizing agent and optionally a catalytic amount, or even a larger amount, of organic acid are employed per mol (relative to the molecular unit

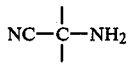

with the equivalent weight 54) of azulmic acid. The mixture is worked up by customary methods. In general, a procedure is followed in which, after the reaction has ended, the reaction mixture is filtered and the solid product thereby obtained is appropriately washed and dried.

Any excess metal compounds present in the products obtained can be precipitated in the form of finely divided precipitates, which are frequently sparingly soluble, by adding bases, such as ammonia, sodium hyroxide or potassium hydroxide, or by adding acids, such as phosphoric acid, depending on the metal compound.

According to variant (f) of process (A), the azulmic acids which are almost free from structural defects are treated with metal salt complexes of azulmic acids stabilized with carbonyl compounds.

The preparation of the metal salt complexes, required as starting materials, of azulmic acids stabilized with carbonyl compounds is illustrated in connection with the description of process variant (9) given later in this text.

Preferred metal salt complexes which can be used in this procedure are those which are derived from those metal compounds which have already been mentioned as preferred in connection with variant (e) of process (A).

Variant (f) of process (A) is carried out in an aqueous medium, preferably in water. However, it is also possible to replace some of the water by other diluents, such as alcohols.

The reaction temperatures can be varied within a substantial range in the case of variant (f) of process (A). In general, the reaction is carried out between 0° C. and 150° C., preferably between 20° C. and 120° C.

In general, the reaction according to variant (f) of process (A) is carried out under normal pressure; however, it is also possible to carry out the reaction under increased pressure.

In carrying out variant (f) of process (A), 0.5 to 1 mol of metal salt complex of stabilized azulmic acid is preferably employed per mol (relative to the molecular unit

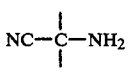

with the equivalent weight 54) of azulmic acid which is almost free from structural defects. The mixture is worked up by customary methods. In general, a procedure is followed in which, after the reaction has ended, the reaction mixture is filtered and the solid product thus obtained is appropriately washed and dried.

Any excess metal compounds present in the products which can be prepared according to variant (f) of process (A) can be precipitated in the form of finely divided precipitates, which are frequently sparingly soluble, by adding bases, such as ammonia, sodium hydroxide or potassium hydroxide, or by adding acids, such as phosphoric acid, depending on the metal compound.

According to variant (g) of process (A), the azulmic acids which are almost free from structural defects are treated with oxidizing agents. Possible oxidizing agents here are all the customary reagents having an oxidizing action. Air, oxygen, potassium permanganate, hydrogen peroxide, chromic acid and bleaching powder are preferably used.

Variant (g) of process (A) is carried out in an aqueous medium, preferably in water. However, it is also possible to replace some of the water by other diluents, such as organic carboxylic acids, formic acid and acetic acid being mentioned in particular.

The reaction temperatures can be varied within a substantial range in the case of variant (g) of process (A). In general, the reaction is carried out between 0° C. and 150° C., preferably between 20° C. and 120° C.

In general, the reaction according to variant (g) of process (A) is carried out under normal pressure. However, it is also possible to carry out the reaction under increased pressure.

In carrying out variant (g) of process (A), a catalytic amount, or even a larger, optionally equimolar, amount, of oxidizing agent is employed per mol (relative to the molecular unit

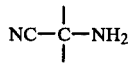

with the equivalent weight 54) of azulmic acid which is almost free from structural defects. The mixture is worked up by customary methods. In general, a procedure is followed in which, after the reaction has ended, the reaction mixture is filtered and the solid product obtained is appropriately washed and dried.

According to process (B), monomeric aqueous hydrocyanic acid is polymerized under hydrolyzing conditions with the aid of basic catalysts, optionally in the presence of additives. Dilute aqueous hydrocyanic acid solutions are used as starting materials in this procedure. In general, solutions with a hydrocyanic acid concentration of between 10 and 30%, preferably between 15 and 25%, by weight are used.

Possible basic catalysts for process (B) are organic and inorganic bases and basic salts of the most diverse nature. Alkali metal cyanides and alkali metal cyanates, such as sodium cyanide, potassium cyanide, sodium cyanate and potassium cyanate, and furthermore amines and ammonia, are preferably used. Mixtures of the most diverse bases or basic salts can also advantageously be employed; a mixture of sodium cyanate and aqueous ammonia solution may be mentioned as an example.

Naturally occurring organic substances and products obtained therefrom, naturally occurring inorganic substances and products obtained therefrom, synthetic organic products, synthetic inorganic products and/or mixed products consisting of organic and inorganic products can be used as additives in carrying out process (B). These include, as preferences, all those materials which have already been mentioned as preferred in connection with the description of the additives optionally present in the substances according to the invention.

Process (B) is carried out in an aqueous medium, preferably in water. However, it is also possible to replace some of the water by other diluents, such as hydrogen sulfide or alcohols, methanol and ethanol being mentioned in particular.

The reaction temperatures can be varied within a fairly wide range in the case of process (B), it being necessary, however, for the temperature setting to be adjusted according to the particular reaction phase. In general, the procedure is first to carry out the polymerization at temperatures between 30° and 70° C., preferably between 40° and 60° C., for 1 to 4 hours so that an approximately 60% conversion of the monomeric hydrocyanic acid is achieved. Thereafter, the polymerization is carried out at temperatures between 70° and 95° C., preferably between 80° and 90° C., for a further 4 to 10 hours, whereupon a conversion of about 90 to 95% is achieved. The mixture can then be heated to temperatures of about 100° C. for several hours in order to bring the reaction to completion and to remove hydrocyanic acid still present and any volatile amines or ammonia present.

In general, the reaction according to process (B) is carried out under normal pressure. However, it is also possible to carry out the reaction under increased pressure at temperatures between 120° and 150° C. In this procedure, relatively large amounts of structural defects can be produced in the process products in a controlled manner.

In carrying out process (B), the basic catalyst is employed in an amount such that its proportion is 1 to 15%, preferably 2 to 10%, by weight of the monomeric hydrocyanic acid employed.

The additives are optionally added to the reaction mixture in an amount such that their proportion in the end product is between 1 and 95 percent by weight, preferably between 5 and 90 percent by weight. The mixture is worked up by customary methods. In general, a procedure is followed in which, after removing excess hydrocyanic acid and any volatile amines or ammonia present, the reaction mixture is filtered and the solid product thereby obtained is appropriately washed and dried.

The aminoplast-forming agents required as starting compounds have previously been described and are known, or they can be prepared by methods which are known in principle (see Houben-Weyl "Methoden der organischen Chemie" ("Methods of Organic Chemistry"), Volume XIV, part 2 (1963), pages 319–402, Georg Thieme-Verlag, Stuttgart).

Carbonyl compounds are also employed as starting compounds in process variant (1) according to the invention. Possible carbonyl compounds here are all compounds with reactive carbonyl groups. These include, as preferences, aldehydes, ketones and keto esters as has been previously described. Examples are formaldehyde (in aqueous solution or also in the gaseous form), acetaldehyde, butyraldehyde, isobutyraldehyde, chloral, hydroxyethylaldehyde, hydroxyacetaldehyde, hydroxypivalaldehyde, acrolein, crotonaldehyde, glyoxal, methylglyoxal, cyclohexanealdehyde, furfurol, hydroxymethylfurfurol, glucose, glyceraldehyde, salicylaldehyde, benzaldehyde, 4-methylbenzaldehyde, terephthaldialdehyde and other aldehydes which are formed from formaldehyde and other low-molecular aldehydes, if appropriate in situ, under aldol condensation conditions, formose synthesis conditions or acyloin condensation conditions. There may be mentioned specifically in this context those hydroxyaldehydes, the formation of which is represented schematically by the equations given earlier in this text. Those aldehydes or aldehyde derivatives which are produced from formaldehyde, in situ, under the conditions for the synthesis of formose sugar mixtures can particularly preferably be used here. The procedure followed in this case is to allow modified azulmic acids which are charged with calcium hydroxide, calcium hydroxide/calcium carbonate, lead hydroxide or any other suitable catalyst, such as thallium hydroxide, or which contain the catalytically acting substance bonded as a complex, to act on formaldehyde. In this reaction, formaldehyde is converted, in a rapid reaction, into $C_2-$, $C_3-$, $C_4-$, $C_5-$ and $C_6-$aldehydes, such as hydroxyacetaldehyde, glyceraldehyde and aldehydes of a higher functionality which contain hydroxyl groups, or polyhydroxyketones, which undergo stabilizing condensation reactions in situ with aminoplast-forming agents and suitable groups on the azulmic acids.

Furthermore, it is also possible to use, in particular, those compounds which release aldehydes, for example formaldehyde, under the reaction conditions. These include, as preferences, paraformaldehyde, trioxane, trithiane, chloral hydrate and hemi-acetals of formaldehyde, for example those which are derived from ethylene glycol, diethylene glycol, glycerol, methanol, ethanol, propanol and butanol.

Examples of ketones which can be employed as starting substances in process variant (1) include methyl ethyl ketone, methyl isobutyl ketone, hydroxyacetone, dihydroxyacetone, cyclohexanone, acetophenone and quinones, such as benzoquinone, the quinones being present, in particular, as a condensation product with ammonia or polyamines. Further ketones which may be mentioned are hexachloroacetone and hexafluoroacetone.

An example which may be mentioned of a keto ester which can be employed as a starting substance in process variant (1) is ethyl acetoacetate.

Low-molecular condensation products of aminoplast-forming agents and carbonyl compounds can also be employed as starting compounds in process variant (1). Possible condensation products here are, in principle, all N-oligocondensation products and low-molecular N-polycondensation products of the above-mentioned aminoplast-forming agents and carbonyl compounds, expecially aldehydes. Alkylol compounds, in particular methylol compounds, such as are described, for example, in Houben-Weyl, "Methoden der organischen Chemie" ("Methods of Organic Chemistry"), Volume XIV, part 2 (1963), pages 319–402, Georg Thieme-Verlag, Stuttgart, are preferred. The derivatives corresponding to the above-mentioned nitrogen compounds and containing N-alkylol groups, preferably N-methylol groups, and the corresponding $C_1-C_4$-alkyl ethers of these N-alkylol derivatives are particularly preferred. Examples which may be mentioned in this connection are N-methylolurea and dimethylolurea.

Chemically modified low-molecular condensation products of aminoplast-forming agents and carbonyl compounds can furthermore be employed as starting substances in process variant (1). By these condensation products there are to be understood condensation products of the above-mentioned aminoplast-forming agents and carbonyl compounds which contain additional substances which are capable of being incorporated rapidly and easily by co-condensation. Preferred condensation products include polyurethanes and polyureas with $NH_2$ end-groups; polyamides of poly-($\beta$-alanine) with molecular weights of up to 2,000; N-methylol methyl ethers of polycaprolactam; polythiolactams; polypeptides of N-carboxy-α-aminocarboxylic acids; low-molecular polyamides of aliphatic dicarboxylic acids and diamines; polyamides of cycloaliphatic components and aromatic components; polyamides containing O, S or N as hetero-atoms; polyester-amides; co-condensates which also contain, in addition to amide groups, ester groups, urethane groups or urea groups; ethoxylated and propoxylated monoamides and polyamides; polyhydrazides and polyaminotriazoles; polysulfonamides; formaldehyde co-condensates with urea, melamine and dicyandiamide; low-molecular aniline/formaldehyde condensates; sulfonic acid amines; mononitriles and dinitriles; acrylonitrile; urotropine; hexahydrotriazines of primary amines and formaldehyde; Schiff's bases and ketimines or polyketimines, for example those of one mol of hexamethylenediamine and 2 mols of cyclohexanone; polyaddition products and polycondensation products of melamine and other aminoheterocyclic compounds with aldehydes and alcohols; polyaddition products and polycondensation products of nitriles with aldehydes; and reaction products of phosphorous acid and dialkyl-phosphites with carbonyl compounds and amines or polyamines.

Those aminoplast precondensates such as are listed in German Offenlegungsschrift No. 2,324,134, on pages 7 to 12, can also be employed as starting substances.

Moreover, possible starting substances are those N-alkylol compounds, and in particular N-methylol compounds, which are partially etherified with compounds such as those materials described on page 18, line 30 page 19, line 27 herein.

The proportion of alcohols or polyalcohols in these products can be up to 60% by weight, relative to the sum of the percentages of nitrogen compounds and alcohols, depending on the component.

It is not necessary to prepare the chemically modified aminoplast precondensates separately. Rather, the appropriate procedure is to carry out the modification in the course of the reaction of the aminoplast-forming agents and carbonyl compounds or low-molecular condensation products thereof with azulmic acids by simultaneously using modifying components.

Catalysts which can be used in process variant (1) include any and all the condensation catalysts generally known and used in the art. These include acids, such as hydrochloric acid, sulfuric acid, nitric acid, phosphoric acid, phosphorous acid, other acids derived from phosphorous, formic acid, acetic acid, thioacetic acid, maleic acid and oxalic acid; bases, such as sodium hydroxide, potassium hydroxide, calcium hydroxide, barium hydroxide, lead hydroxide, zinc oxide, magnesium oxide and other metal oxides and hydrates thereof; salts, such as phosphates, for example primary or secondary potassium hydrogen phosphate, ammonium sulfate, copper (II) salts, zinc (II) salts, tin (II) salts, cadmium salts and magnesium salts of the most diverse organic acids; numerous organic acid anhydrides as well as compounds which split off acid, such as ammonium chloride, trimethylammonium formate and chloral hydrate; amine salts of formic acid and of other organic carboxylic acids; maleic acid half-esters; tertiary amine salts and tertiary amines; and dibenzoyl peroxide, carbonic acid, N-carbamic acids, glycol chlorohydrin, glycerol chlorohydrin and epichlorohydrin.

Preferred catalysts which can be used include acids, such as phosphoric acid, phosphorous acid, nitric acid, hydrochloric acid, sulfuric acid, formic acid, oxalic acid and maleic acid, and bases, such as sodium hydroxide, potassium hydroxide, calcium hydroxide, barium hydroxide, lead hydroxide, benzyldimethylamine and triethylamine.

Chain stoppers which can be employed in process variant (1) include all the monofunctional compounds suitable for chain-stopping reactions generally known in the art. Preferred possible monofunctional chain stoppers include lactams, such as ε-caprolactam, valerolactam, butyrolactam and the corresponding thiolactams; formamide and acetamide; alcohols, such as methanol, ethanol, propanol, butanol, allyl alcohol, isopropanol, oleyl alcohol and benzyl alcohol, which stop the growing aminoplast segments by etherification reactions. Chain stoppers which can preferably be used are also those compounds such as are described in German Offenlegungsschrift No. 2,324,134 on pages 13 and 14. In a preferred embodiment of process variant (1), N-methylolcaprolactam, N-methylolvalerolactam, N-methylolbutyrolactam and N-methylolazalactams, i.e., basic methylol compounds of azalactams having the structure

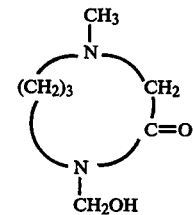

can also function as chain stoppers. The substances mentioned last have not hitherto been described in the literature. However, they can be prepared from the corresponding azalactams by methylation with formaldehyde by customary methods. The azalactams required are known (see German Offenlegungsschrift 2,035,800).

Naturally occurring organic substances and products obtained therefrom, naturally occurring inorganic substances and products obtained therefrom, synthetic organic products, synthetic inorganic products and/or mixed products consisting of organic and inorganic products can be used as additives in carrying out process variant (1). These additives include, as preferences, all those materials which have already been mentioned as preferred in connection with the description of the additives optionally present in the substances according to the invention.

Process variant (1) is carried out in an aqueous medium or in an aqueous-alcoholic medium. Additional inert organic solvents can also be used here; the latter serve to remove the water azeotropically when the reaction has ended. However, the preferred reaction medium is water without additional organic solvents.

The reaction temperatures can be varied within a substantial range in the case of process variant (1). In general, the reaction is carried out at temperatures between 0° C. and 200° C., and preferably between 10° and 150° C. However, it is also possible to bring the co-condensation according to the invention to completion in the course of the drying process at temperatures of up to 250° C.

In general, the reaction in process variant (1) is carried out under normal pressure; however, it is also possible to carry out the reaction under increased or reduced pressure.

In carrying out process variant (1), 0.1 to 5 mols of aminoplast-forming agent and 0.1 to 5 mols of carbonyl compound or 0.1 to 5 mols of an optionally chemically modified condensation product of the aminoplast-forming agent and carbonyl compound, and furthermore, if desired and/or necessary a chain stopper and/or a catalyst, and also optionally an amount of one or more additives such that their proportion in the end-product is between 1 and 95 percent by weight, are employed per mol (relative to the molecular unit

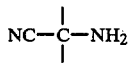

with the equivalent weight 54) of modified azulmic acid optionally containing additives.

Catalysts are in general employed in amounts of 0.05 to 10% by weight, preferably of 0.1 to 5% by weight, relative to the total amount of all the components participating in the polycondensation reaction. However, in some cases considerably higher catalysts concentrations can be used. Thus, for example, 0.2 to 0.6 mol of an acid catalyst, preferably of phosphoric acid or nitric acid, can be employed per mol of azulmic acid. Products in which the catalyst acids are fixed to basic groups of the co-condensates are formed in this case.

Chain stoppers can be employed in amounts of 0.5 to 60% by weight, relative to the total amount of aminoplast-forming agents and carbonyl compounds. If N-methylollactams or N-methylolazalactams are used as chain stoppers, their concentration is in general between 0.5 and 20% by weight, preferably between 2 and 14% by weight, relative to the total amount of aminoplast-forming agents and carbonyl compounds.

In general, process variant (1) is carried out in practice by a procedure in which a freshly prepared aqueous solution of aminoplast-forming agent and carbonyl compound (=solution of partially alkylolated or partially methylolated products) or an aqueous solution of aminoplast condensates which are still soluble (for example polyalkylol compounds or polymethylol compounds) is added to an aqueous azulmic acid dispersion optionally containing additives, then if appropriate additives, modifying reagents, catalysts and chain stoppers are added and the condensation reaction is effected. However, it is also possible initially to introduce aqueous solutions or dispersions of aminoplast-forming agents and carbonyl compounds and then to add the particular azulmic acid and, if appropriate, additives, modifying reagents, catalysts and chain stoppers to these solutions and then to carry out the co-condensation reaction.

The polycondensation according to process variant (1) is preferably carried out by rendering acidic the aqueous solution or dispersion of aminoplast-forming agent and carbonyl compound, by bringing the solution to pH values of between about 1 and 4, and allowing this mixture to act on the azulmic acids. The reactions proceed very rapidly in this case. It is possible for 0.1 to 0.8 equivalent of carbonyl compound to react, relative to one $NH_2$ or NH equivalent of all the reactants.

A procedure is also preferred in which the aminoplast-forming agent and carbonyl compound are dissolved in water or a lower alcohol and this reactive solution, in which an equilibrium is established between the starting compounds and N-alkylolation products or N-methylolation products, is added dropwise to the initially introduced aqueous azulmic acid dispersion at temperatures between 20° C. and 100° C., while stirring intensively. The procedure in this case can also be to add a solution of partially alkylolated, in particular partially methylolated, compounds or polyalkylol compounds (in particular polymethylol compounds) which are already partially pre-condensed and are still soluble, to the dispersed azulmic acid in one operation and to bring the condensation reaction to completion by means of heat, in a basic or acid range under normal pressure or under reduced pressure, the water being removed.

It is frequently also advantageous to add the aminoplast-forming agents to an aqueous azulmic acid dispersion, then to alkylolate or to methylolate the latter in a pH range between 7.5 to 10 by adding the appropriate carbonyl compounds, and to allow the N-alkylol compounds or N-methylol compounds—if appropriate also their ethers—already formed to act on the azulmic acids.

Mixtures of several aminoplast-forming agents and/or mixtures of several carbonyl compounds can, of course, also be used for the condensation reaction in process variant (1). Thus, for example, those aldehyde mixtures which are formed from formaldehyde and numerous other aldehydes or ketones, if appropriate in situ, under aldol condensation conditions, formose synthesis conditions or acyloin condensation conditions (compare the equations given earlier in this text) can be employed. Hydroxyaldehydes of this type readily react, at the rate at which they are formed, and in particular in a weakly to strongly alkaline range, with aminoplast-forming agents, for example urea, to give N-alkylol compounds, by addition reactions, which are then subjected to co-condensation reactions.

A particular modification of process variant (1) is carried out by a procedure in which specific aldehydes, preferably formaldehyde, are allowed to act on other aldehydes in an alkaline medium, and in particular in the presence of the substances employed for the aminoplast formation. Although alkylol compounds or methylol compounds are thereby formed, these are not the derivatives which are most stable to heat. Formation of hydroxyaldehydes, which are more stable to heat, is thereby effected. In the course of the reaction according to the invention, these hydroxyaldehydes lead to aminoplast condensates which contain hydroxyl groups and which impart a friable structure to the products when spray-dried. Above all, the swellability of the products according to the invention can also be influenced by this modification of process variant (1). In addition, this reaction in the presence of calcium hydroxide or lead hydroxide precipitated on azulmic acid can be utilized to synthesize caramellized sugars (Butlerow-Loew formose reaction), which participate in the aminoplast condensation reactions and ensure that the products according to the invention have a friable structure.

In carrying out the co-condensation reaction of process variant (1), potassium ions and cyanide ions, which are always formed in small amounts from the azulmic acids under the reaction conditions can exert their known catalytic activity and effect, for example, acyloin condensation (see equation (e) given earlier in this text). The products thereby formed can participate in the condensation reaction in the course of the aminoplast condensation reactions, especially in the case of reactions carried out under base catalysis. Furthermore, if formaldehyde is available, the products can be converted by aldol condensation reactions into methylolated ketones, which are likewise condensation partners.

Process variant (1) can be carried out largely with exclusion of intrinsic condensation reactions, especially if urea is employed as the aminoplast-forming agent and acetaldehyde, isobutyraldehyde or crotonaldehyde is employed as the carbonyl component. By intrinsic condensation in this context is meant the formation of those condensation products of aminoplast-forming agent and carbonyl component which are not covalently bonded to the azulmic acid matrix. In order to avoid as far as possible the formation of intrinsic condensation products of this type, the procedure followed is, for example, first to carry out the condensation reaction in the presence of phosphoric acid at a pH value of 2 to 4 in the cold (at room temperature) and, after about 3 to 4 hours, to filter the mixture at temperatures between 40° C. and 60° C. Under these conditions, the equilibrium which is established between the condensation products and low-molecular segments thereof lies, in the case of all the condensation products in the aqueous system which are not covalently bonded to the azulmic acid matrix, mainly on the side of the monomers or of the short-chain oligocondensates which are soluble in hot water, since the splitting of segments which are not grafted on, such as

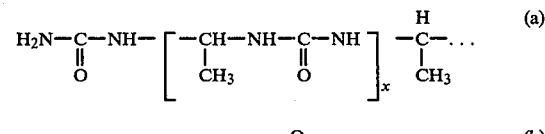
(a)

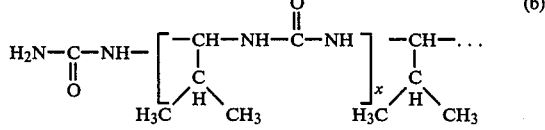
(b)

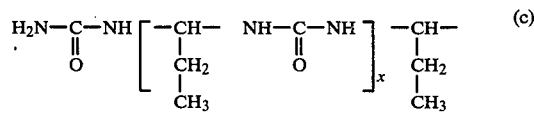
(c)

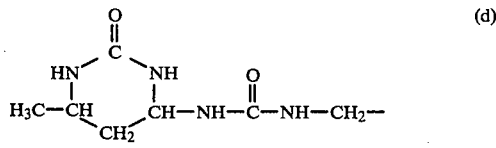
(d)

or (e) segments which are formed by condensation of crotonaldehyde and urea in the molar ratio 1:1 or 2:1, takes place very rapidly.

In contrast, the segments listed under (a) to (e) which are covalently bonded to the azulmic acid matrix are broken down considerably more slowly, since splitting off of these segments is based on severely hindered topochemical hydrolysis. Products according to the invention in which about 35 to 50 percent by weight of condensates of aminoplast-forming agent and carbonyl component are covalently bonded to the matrix per 100 parts by weight of azulmic acid can thus be prepared by this method. By continual renewed use of the mother liquors which have been filtered off hot and feeding of urea or of acetaldehyde, isobutyraldehyde, crotonaldehyde or other appropriate aldehyde, the process can be carried out particularly economically with further use of the mother liquors.

The above-mentioned procedure cannot be carried out in practice in the case of linear or branched polymethyleneurea segments, which are significantly more stable in an acid medium, since polycondensates having the structure

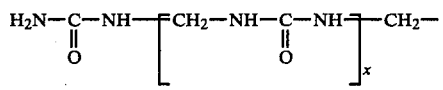

are considerably more stable than segments having the structures listed under (a) to (e), even at temperatures of up to 100° C. and pH values between 2 and 4.

The proportion of condensation products which are not covalently bonded to the azulmic acid matrix and are formed by intrinsic condensation from the aminoplast-forming agent and carbonyl component can be determined as follows. The co-condensate is treated with 30 to 60 percent strength by weight solutions of lithium iodide in methanol at room temperature. The condensates, of urea and carbonyl components, such as formaldehyde, acetaldehyde, isobutyraldehyde or crotonaldehyde, which are not covalently bonded to the azulmic acid matrix thereby dissolve, while covalently bonded constituents are insoluble. The proportion of condensation products contained in the solution is determined analytically, so that the covalently bonded proportion can be calculated.

In process variant (2), acid addition salts or complex compounds, optionally containing additives, of modified azulmic acids containing from 0.5 to 55 percent by weight of ionic groups of the general formula

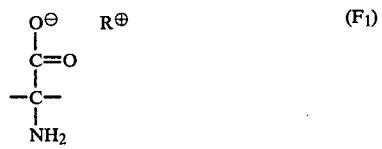
(F₁)

in which
R has the meaning stated above, and containing from 0.5 to 15 percent by weight of groups of the formula

(F₂)

are reacted, in an aqueous medium, optionally in the presence of additives and if desired and/or necessary in the presence of catalysts, and/or chain stoppers, with aminoplast-forming agents and carbonyl compounds or freshly prepared, optionally chemically modified condensation products thereof.

In the formula (F₁), R preferably has those meanings which have already been mentioned as preferred for R in connection with the description of the substances according to the invention.

The acid addition salts or complex compounds of modified azulmic acids (=azulmic acids containing structural defects) to be used as starting materials in process variant (2) can contain 1 to 95 percent by weight, preferably 5 to 90 percent by weight, of additives. Possible additives include naturally occurring organic substances and products obtained therefrom, naturally occurring inorganic substances and products obtained therefrom, synthetic organic products, synthetic inorganic products and/or mixed products consisting of organic and inorganic products. These additives include, as preferences, all those materials which have already been mentioned as preferred in connection with the description of the additives optionally present in the substances according to the invention.

Preferred acids which the acid addition salts of modified azulmic acids (required as starting materials) can contain are all those acids which have already been mentioned in connection with the description of the substances according to the invention. Formic acid, nitric acid, phosphoric acid, phosphorous acid, chloroacetic acid, dichloroacetic acid, trichloroacetic acid and hydrofluoric acid may be mentioned in particular.

Preferred salts which the complex compounds of modified azulmic acids (required as starting materials) can contain bonded as complexes are all those ammonium salts and metal compounds which have already been mentioned as preferred in connection with the description of the substances according to the invention. Iron (II) acetate, iron (II) sulfate, iron (III) sulfate, copper acetate, zinc acetate, manganese (II) acetate, cobalt chloride, zinc chloride and tin (II) chloride may be mentioned in particular. The acid addition salts, which can be used as starting materials, of modified azulmic acids have not hitherto been disclosed in the literature. However, they can be prepared by a process in which the modified azulmic acids, optionally containing additives, accessible by process variants (A) or (B) are stirred with the particular acid in an aqueous medium at room temperature or at elevated temperature. The reaction products are isolated by filtration. The preparation of some acid addition salts of modified azulmic acids has already been disclosed generally in connection with the description of the preparation of modified azulmic acids.

The complex compounds, which can also be used as starting materials in process variant (2), of modified azulmic acids have not hitherto been disclosed in the literature. However, they can be prepared by a process in which the modified azulmic acids, optionally containing additives, accessible by processes (A) and (B) are stirred in an aqueous medium at temperatures between 20° C. and 120° C., preferably at 50° C. to 110° C. with the substances to be complexed. The mixture is worked up by customary methods. In general, the reaction products are isolated by filtration. The preparation of some complex compounds of modified azulmic acids has already been disclosed generally in connection with the description of the preparation of modified azulmic acids.

Aminoplast-forming agents are also employed as starting compounds in process variant (2). These aminoplast-forming agents include all those nitrogen compounds which have already been mentioned in this connection in the case of the description of process variant (1).

Possible carbonyl compounds in carrying out process variant (2) are all those carbonyl components which have already been mentioned in the case of the description of process variant (1).

Furthermore, low-molecular condensation products of aminoplast-forming agents and carbonyl compounds can also be employed as starting compounds in process variant (2). Possible condensation products here are all those substances which have already been mentioned in this connection in the case of the description of process variant (1), including, in particular, the chemically modified products.

Moreover, all those catalysts, chain stoppers and additives which have already been mentioned in the case of the description of process variant (1) can be employed in carrying out process variant (2). The remaining reaction conditions, such as reaction medium, reaction temperatures and pressure to be applied, also correspond to those conditions which have already been mentioned in detail in connection with process variant (1). Process variant (2) can be carried out in the same manner as process variant (1) in other respects, that is to say the amount of reactants and additives, catalysts and chain stoppers to be employed and carrying out of the reaction in practice and working up are analogous. Moreover, all those specific variants which have been mentioned in connection with process variant (1) are possible.

According to process variant (3), azulmic acids which are almost free from structural defects are reacted, in an aqueous medium, optionally in the presence of additives and if desired and/or necessary in the presence of catalysts, and/or chain stoppers, with aminoplast-forming agents and carbonyl compounds or freshly prepared, optionally chemically modified, condensation products thereof.

The azulmic acids which are almost free from structural defects and are required as starting substances are known (see Houben-Weyl, Volume 8 (1952), page 261; German Pat. No. 662,338 and German Pat. No. 949,600).

Furthermore, possible starting compounds in process variant (3) are all those aminoplast-forming agents, carbonyl compounds and low-molecular condensation products of carbonyl compounds and aminoplast-forming agents, and the chemically modified products of these low-molecular condensates, which have already been mentioned as starting substances in the case of the description of process variant (1). In addition, all those catalysts, chain stoppers and additives which have already been mentioned in connection with process variant (1) can be employed in process variant (3). The remaining reaction conditions, such as reaction medium, reaction temperatures and pressure to be applied, also correspond to those of process variant (1). Process variant (3) can also be carried out in the same manner as process variant (1) in other respects, that is to say the amounts of reactants and additives, catalysts and chain stoppers to be employed and the carrying out of the reaction in practice and working up are analogous. Moreover, all those particular variants which have been mentioned in connection with process variant (1) are again possible.

In process variant (4), hydrocyanic acid is polymerized under hydrolyzing conditions in an aqueous medium with the aid of basic catalysts, optionally in the presence of additives. The reaction products are then reacted, without prior isolation and in an aqueous medium, optionally in the presence of additives and if desired and/or necessary in the presence of catalysts, and/or chain stoppers, with aminoplast-forming agents and carbonyl compounds or freshly prepared, optionally chemically modified condensation products thereof.

Dilute aqueous hydrocyanic acid solutions, to which additives are optionally admixed, are used as starting materials in this procedure. In general, solutions with a hydrocyanic acid concentration of between 10 and 30%, preferably between 15 and 25%, are used.

Possible basic catalysts for process variant (4) are organic and inorganic bases and basic salts of the most diverse nature. All those bases or salts which have already been mentioned as preferred in connection with the description of process (B) can preferably be used here. Mixtures of bases or basic salts can also advantageously be employed; a mixture of sodium cyanate and aqueous ammonia solution may be mentioned in particular.

Possible additives which can be added to the reaction mixture before and/or after the hydrocyanic acid polymerization are again naturally occurring organic substances and products obtained therefrom, naturally occurring inorganic substances and products obtained therefrom, synthetic organic products, synthetic inorganic products and/or mixed products consisting of organic and inorganic products. These additives include, as preferences, all those materials which have already been mentioned as preferred in connection with the description of the additives optionally present in the substances according to the invention.

Possible aminoplast-forming agents and carbonyl compounds which are added as reactants to the crude azulmic acid, when the polymerization has been effected, in process variant (4) are all those substances which have already been mentioned generally or as preferences as aminoplast-forming agents or as carbonyl compounds in the case of the description of process variant (1). Furthermore, possible reactants in this process are also freshly prepared, optionally chemically modified low-molecular condensation products of aminoplast-forming agents and carbonyl compounds, such as have already been mentioned in connection with the description of process variant (1). In this case also, it is not necessary to prepare the chemically modified aminoplast precondensates separately. Rather, the appropriate procedure is again to carry out the modification in the course of the reaction of aminoplast-forming agents and carbonyl compounds or low-molecular condensation products thereof with azulmic acids by simultaneously using modifying components.

Possible catalysts in carrying out the second stage of process variant (4) are again all the customary condensation catalysts. These include all those substances which have already been mentioned as catalysts in the case of the description of process variant (1).

Chain stoppers which can be used in carrying out the second stage of process variant (4) are again all the customary monofunctional compounds suitable for chain-stopping reactions. These include, as preferences, all those substances which have already been mentioned in this connection as preferred chain stoppers in the case of the description of process variant (1).

Both the first and the second stage of process variant (4) are carried out in an aqueous medium or in an aqueous-alcoholic medium. It is also possible simultaneously to use, especially in the second stage, additional inert organic solvents; the latter serve to remove the water azeotropically when the reaction has ended. However, the preferred reaction medium is water without additional organic solvents.

The reaction temperatures can be varied within a substantial range in the case of process variant (4), it being necessary, however, for the temperature setting to be adjusted according to the particular reaction phase. In general, the procedure is to carry out the polymerization first at temperatures between 30° C. and 70° C., preferably between 40° C. and 60° C., for 1 to 4 hours, so that an approximately 60% conversion of the monomeric hydrocyanic acid is achieved. Thereafter, polymerization is carried out at temperatures between 70° C. and 95° C., preferably between 80° C. and 90° C., for a further 4 to 10 hours, whereupon a conversion of about 90 to 95% is achieved. The mixture can then be heated to temperatures of about 100° C. for several hours in order to bring the reaction to completion and to remove hydrocyanic acid still present and any volatile amines or ammonia present. Thereafter, the co-condensation reaction with carbonyl compounds and aminoplast-forming agents or freshly prepared, optionally chemically modified condensation products thereof is carried out at the temperatures customary for this reaction. In general, the reaction is carried out at temperatures between 0° C. and 200° C., preferably between 10° C. and 150° C. However, it is also possible to bring the co-condensation reaction to completion in the course of the drying process at temperatures of up to 250° C.

In general, the reaction in process variant (4) is carried out under normal pressure. However, it is also possible to carry out the reaction under increased pressure at temperatures between 120° C. and 150° C. In this procedure, relatively large amounts of structural defects can be produced in the process products in a controlled manner.

In carrying out process variant (4), the basic catalyst required for polymerization of the hydrocyanic acid is employed in an amount such that its proportion is 1 to 15%, preferably 2 to 10%, of the monomeric hydrocyanic acid employed. The amount of aminoplast-forming agents and carbonyl compounds or freshly prepared, optionally chemically modified low-molecular condensation products thereof is chosen so that in each case 0.1 to 5 mols of aminoplast-forming agent and carbonyl compound or optionally chemically modified low-molecular condensation products thereof are present per mol of azulmic acid. The additives are optionally added to the reaction mixture in an amount such that their proportion in the end product is between 1 and 95% by weight, preferably between 5 and 90% by weight. Condensation catalysts and chain stoppers are also added, if appropriate, in the case of the reaction of azulmic acid with the condensation partners. The catalysts are appropriately employed in this case in amounts of 0.05 to 10% by weight, preferably of 0.1 to 5% by weight, relative to the total amount of all the components participating in the polycondensation reaction. Chain stoppers can be used in amounts of 0.5 to 60% by weight, relative to the total amount of aminoplast-forming agents and carbonyl compounds.

In general, carrying out process variant (4) in practice is effected by a procedure in which the polymerization of hydrocyanic acid is first carried out in an aqueous medium, optionally in the presence of additives. After removing excess hydrocyanic acid by distillation and after removing any volatile amines or ammonia present, the aminoplast-forming agent and carbonyl compound or a freshly prepared aqueous solution of aminoplast-forming agent and carbonyl compound (=solution of partially alkylolated and partially methylolated products) or an aqueous solution of aminoplast condensates which are still soluble (for example polyalkylol compounds or polymethylol compounds) are added to the resulting azulmic acid in an aqueous dispersion, without first isolating the azulmic acid. Then additives, modifying reagents, catalysts and chain stoppers are added if appropriate and the condensation reaction is carried out. Mixtures of various carbonyl compounds and/or aminoplast-forming agents can, of course, also function as condensation partners. Working up is effected by customary methods. In general, a procedure is followed in which the reaction mixture is filtered, when the reaction has ended, and the solid product thereby obtained is washed and dried.

A particularly preferred embodiment of process variant (4) which makes it possible to prepare products with a particularly high stability towards splitting back into hydrocyanic acid consists in first polymerizing hydrocyanic acid in the presence of ammonia in an aqueous medium. Excess hydrocyanic acid and the ammonia used for the polymerization is then stripped off. The azulmic acid which remains is then subjected to a partial condensation reaction, without prior isolation, with small amounts of carbonyl compound, in particular formaldehyde, in an aqueous dispersion, while stirring, the consumption of carbonyl compound being continuously monitored. Then the remaining proportion of carbonyl compound and aminoplast-forming agent or freshly prepared, optionally chemically modified low-molecular condensation products thereof, and optionally additives and chain stoppers are added and the condensation reaction is carried out in the acid range at pH values from 3 to 4, appropriately using phosphoric or nitric acid, at room temperature in the course of 0.5 to 8 hours. In general, a procedure is followed in which only 0.4 to 0.5 $NH_2$ equivalent of the 1.2 to 1.5 $NH_2$ equivalents present in 100 parts by weight of crude azulmic acid is first reacted with the carbonyl compound, especially formaldehyde, in the partial condensation reaction, so that the remaining proportion of 0.8 to 1.1 $NH_2$ equivalents in the pre-stabilized azulmic acid are available for the subsequent co-condensation reaction.

In process variant (5), hydrocyanic acid is polymerized under hydrolyzing conditions in an aqueous medium with the aid of basic catalysts, in the presence of aminoplast-forming agents, optionally in the presence of additives, and the reaction products are then reacted, without prior isolation, in an aqueous medium, optionally in the presence of additives and if desired and/or necessary in the presence of catalysts and/or chain stoppers, with carbonyl compounds.

Process variant (5) essentially corresponds to process variant (4) described above. Thus, in this case also, dilute aqueous hydrocyanic acid solutions, the hydrocyanic acid concentration of which is generally between 10 and 30% and preferably between 15 and 25%, are used as starting substances. Possible catalysts for the polymerization of hydrocyanic acid are all those bases and basic salts which have already been mentioned as hydrocyanic acid polymerization catalysts in connection with process variant (4).

Furthermore, all those additives, aminoplast-forming agents, carbonyl compounds, condensation catalysts and chain stoppers which are possible in the case of process variant (4) can also be used in process (5) according to the invention. Aminoplast-forming agents which are preferably used include urea, thiourea, oxamide, melamine, dicyandiamide, monoamines and polyamines and the N-alkylol compounds, in particular N-methylol compounds, of these preferred aminoplast-forming agents. Formaldehyde may be mentioned as a particularly preferred carbonyl compound.

In the case of process variant (5), all the remaining reaction conditions, such as reaction temperatures, pressure, reaction medium and the amounts to be used of substances participating in the reaction are analogous to those of process variant (4).

In general, carrying out of process variant (5) in practice is effected by a procedure in which the polymerization of hydrocyanic acid is first carried out in the presence of one or more soluble aminoplast-forming agents, for example urea, thiourea, oxamide, melamine, dicyandiamide, monoamines or polyamines or N-alkylol compounds, or N-methylol compounds, of the aminoplast-forming agents mentioned and, if appropriate, in the presence of monoalcohols and polyalcohols and optionally in the presence of other additives, in an aqueous medium. After removing excess hydrocyanic acid by distillation and after removing any volatile amines or ammonia present, one or more carbonyl compounds are added to the resulting azulmic acid containing the aminoplast-forming agent, without prior isolation of the azulmic acid, in an aqueous dispersion. Then additives, modifying reagents, catalysts and chain stoppers are added if appropriate and the condensation reaction is carried out in an acid medium, in general in the pH range from 1 to 6, preferably in the pH range from 2 to 4.

In process variant (6), modified azulmic acids optionally containing additives and containing from 0.5 to 55% by weight of the ionic groups of the general formula

in which

R has the meaning stated above, and containing from 0.5 to 15 percent by weight of groups of the formula

are reacted with bases in an aqueous medium (if desired and/or necessary, the cation is replaced by treatment with metal salts), and the reaction product is then reacted, in an aqueous medium, optionally in the presence of additives and if desired and/or necessary in the presence of catalysts and/or chain stoppers, with aminoplast-forming agents and carbonyl compounds or freshly prepared, optionally chemically modified low-molecular condensation products thereof.

Possible modified azulmic acids here are all those azulmic acids which contain structural defects and which can also be employed as starting substances in carrying out process variant (1). The preparation of these hitherto unknown compounds has already been described in detail in connection with process variant (1).

Possible bases or basic salts in carrying out process variant (6) are the most diverse inorganic or organic bases and basic salts. Alkali metal hydroxides, such as lithium hydroxide, sodium hydroxide and potassium hydroxide, alkali metal carbonates, such as sodium carbonate, potassium carbonate and potassium bicarbonate, alkali metal sulfides, such as sodium sulfide, potassium sulfide and potassium bisulfide, alkali metal thiosulfates, such as sodium thiosulfate, alkylamines and furthermore ammonium hydroxide and ammonium salts, such as ammonium polysulfides, are preferred.

Preferred metal salts in carrying out process variant (6) are all those metal salts which have already been mentioned as preferred in connection with the description of variant (e) of process (A). Iron(II) acetate, iron(II) sulfate, iron(III) sulfate, copper acetate, zinc acetate, manganese(II) acetate, cobalt chloride, zinc chloride, tin(II) chloride, silver nitrate and mercury(II) chloride may be mentioned in particular.

Furthermore, all those additives, aminoplast-forming agents, carbonyl compounds, freshly prepared low-molecular, optionally chemically modified condensation products of aminoplast-forming agents and carbonyl compounds, condensation catalysts and chain stoppers which are possible in the case of process variant (1) can also be used in process variant (6).

Process variant (6) is carried out in an aqueous medium, preferably in water. However, it is also possible to replace some of the water by other diluents, such as hydrogen sulfide or an alcohol, methanol and ethanol being mentioned in particular.

The reaction temperatures can be varied within a substantial range in the case of process variant (6). In general, the first stage of the reaction is carried out between 50° C. and 120° C., preferably between 60° C. and 110° C. Thereafter, the co-condensation reaction with aminoplast-forming agents and carbonyl compounds or freshly prepared low-molecular, optionally chemically modified condensation products thereof is carried out at the temperatures customary for this reaction. In general, the reaction is carried out at temperatures between 0° C. and 200° C., preferably between 10° C. and 150° C.

In general, the reaction in process variant (6) is carried out under normal pressure. However, it is also possible to carry out the reaction under increased pressure. The latter is advisable, in particular, if ammonium hydroxide or volatile amines have been employed as the bases.

In carrying out process variant (6), 0.5 to 4 mols of base or basic salt are preferably employed per mol (relative to the molecular unit

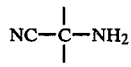

with the equivalent weight 54) of modified azulmic acid. The amount of aminoplast-forming agents, carbonyl compounds or freshly prepared, optionally chemically modified low-molecular condensation products thereof is chosen so that in each case 0.1 to 5 mols of aminoplast-forming agent, carbonyl compound or optionally chemically modified low-molecular condensation products thereof are present per mol of azulmic acid employed. The additives are optionally added to the reaction mixture in an amount such that their proportion in the end product is between 1 and 95% by weight, preferably between 5 and 90% by weight. In addition, condensation catalysts and chain stoppers are added, if appropriate, in the case of the reaction of azulmic acid with condensation partners. Catalysts are appropriately employed in this case in amounts of 0.05 to 10% by weight, preferably of 0.1 to 5% by weight, relative to the total amount of all the components participating in the polycondensation reaction. Chain stoppers can be used in amounts of 0.5 to 60% by weight, relative to the total amount of aminoplast-forming agents and carbonyl compounds.

In general, carrying out of process variant (6) in practice is effected by a procedure in which modified azulmic acids optionally containing additives are first stirred with bases or basic salts in an aqueous medium. The cation may then be optionally replaced by treatment with metal salts by customary methods. The aminoplast-forming agent and carbonyl compound or a freshly prepared aqueous solution of the aminoplast-forming agent and carbonyl compound (=solution of partially alkylolated or partially methylolated products) or an aqueous solution of aminoplast condensates which are still soluble (for example polyalkylol compounds or polymethylol compounds) are added to the reaction mixture, without prior isolation of the resulting salts of modified azulmic acids. Then, if appropriate, additives, modifying reagents, catalysts and chain stoppers are added and the condensation reaction is carried out. Mitures of different carbonyl compounds and/or aminoplast-forming agents can, of course, also function as condensation partners. Working up is effected by customary methods. In general, a procedure is followed in which, after the reaction has ended, the reaction mixture is filtered and the solid product obtained is appropriately washed and dried. However, it is also possible first to concentrate the resulting dispersion, then to add an alcohol, such as methanol, to the residue, to concentrate the mixture again under reduced pressure and, after repeating this operation several times, to filter off, wash and if appropriate dry the solid product thereby obtained.

In process variant (7), modified azulmic acids optionally containing additives are treated with organic or inorganic acids in an aqueous medium and the reaction products are then reacted, in an aqueous medium, optionally in the presence of additives and if desired and/or necessary in the presence of catalysts and/or chain stoppers, with aminoplast-forming agents and carbonyl compounds or freshly prepared, optionally chemically modified condensation products thereof.

Possible modified azulmic acids here are all those azulmic acids which contain structural defects and which can also be employed as starting substances in carrying out process variant (1).

Preferred inorganic or organic acids are all those acids which have already been listed as preferred in connection with the description of the products according to the invention.

Furthermore, additives, aminoplast-forming agents, carbonyl compounds, freshly prepared low-molecular optionally chemically modified condensation products of aminoplast-forming agents and carbonyl compounds, condensation catalysts and chain stoppers which can be used in process variant (7) are all those substances which have already been mentioned in this connection in the case of process variant (1).

Process variant (7) is carried out in an aqueous medium, preferably in water. However, it is also possible to replace some of the water by other diluents, such as an alcohol, methanol and ethanol being mentioned in particular.

The reaction temperatures can be varied within a substantial range in the case of process variant (7). In general, the treatment of the modified azulmic acids with acids is carried out at temperatures between 0° C. and 200° C., preferably between 20° C. and 120° C. Thereafter, the co-condensation reaction with aminoplast-forming agents and carbonyl compounds or freshly prepared low-molecular, optionally chemically modified condensation products thereof, is carried out at the temperatures customary for this reaction. In general, the reaction is carried out at temperatures between 0° C. and 200° C., preferably between 10° C. and 150° C.

In general, the reaction in process variant (7) is carried out under normal pressure. However, it is also possible to carry out the reaction under increased or reduced pressure.

In carrying out process variant (7), a catalytic amount or even a larger amount, preferably 1 to 4 mols, of inorganic or organic acid is employed per mol (relative to the molecular unit

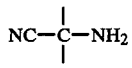

with the equivalent weight 54) of modified azulmic acid. The amount of aminoplast-forming agents, carbonyl compounds or freshly prepared optionally chemically modified low-molecular condensation products thereof is chosen so that in each case 0.1 to 5 mols of aminoplast-forming agent, carbonyl compound or optionally chemically modified low-molecular condensation productts thereof are present per mol of azulmic acid employed. The additives are added to the reaction mixture, if appropriate, in an amount such that their proportion in the end product is between 1 and 95% by weight, preferably between 5 and 90% by weight. In addition, condensation catalysts and chain stoppers are added in the case of the reaction of the azulmic acid with the condensation partners. The catalysts are appropriately employed in this case in amounts of 0.05 to 10% by weight, preferably of 0.1 to 5% by weight, relative to the total amount of all the components participating in the polycondensation reaction. Chain stoppers can be used in amounts of 0.5 to 60% by weight, relative to the total amount of aminoplast-forming agents and carbonyl compounds.

In general, carrying out process variant (7) in practice is effected by a procedure in which modified azulmic acids optionally containing additives are first stirred with organic or inorganic acids in an aqueous medium. The aminoplast-forming agent and carbonyl compound or a freshly prepared aqueous solution of the aminoplast-forming agent and carbonyl compound (=solution of partially alkylolated or partially methylolated products) or an aqueous solution of aminoplast condensates which are still soluble (for example, polyalkylol compounds or polymethylol compounds) are added to the reaction mixture, without prior isolation of the resulting salts of modified azulmic acids. Then, if appropriate, additives, modifying reagents, catalysts and chain stoppers are added and the condensation reaction is carried out. Mixtures of different carbonyl compounds and/or aminoplast-forming agents can, of course, also function as condensation partners. Working up is effected by customary methods. In general, a procedure is followed in which the reaction mixture is filtered, after the reaction has ended, and the solid product obtained is appropriately washed and dried. If appropriate, excess acid still present in the products thus formed can be converted into the corresponding ammonium salt by gassing with ammonia, the reaction advantageously being carried out in the solid phase in a fluidized bed.

In process variant (8), azulmic acids which are almost free from structural defects are reacted, in an aqueous medium in the presence of hydrolytically degradable naturally occurring substances and in the presence of acid, if desired and/or necessary in the presence of catalysts and/or chain stoppers, with aminoplast-forming agents and carbonyl compounds or freshly prepared (optionally chemically modified) low-molecular condensation products thereof.

The azulmic acids which are almost free from structural defects and are required as starting substances in process variant (8) are known (see Houben-Weyl, Volume 8 (1952), page 261; German Pat. No. 662,338 and German Pat. No. 949,600).

Possible hydrolytically degradable naturally occurring substances in the case of process variant (8) according to the invention are all those naturally occurring substances of vegetable or animal origin which are completely or partially degraded under the influence of an acid. These preferably include celluloses, hemicelluloses, sugars lignin, polymeric quinones, wood flour, vegetable material, proteins, polypeptides, such as gelatins and wool, and furthermore yeast proteins, algal compositions and peat compositions.

Possible acids include substantially all the sufficiently strong organic or inorganic acids. Nitric acid, phosphoric acid and phosphorous acid are preferably used.

Furthermore, aminoplast-forming agents, carbonyl compounds, freshly prepared low-molecular (optionally chemically modified) condensation products of aminoplast-forming agents and carbonyl compounds, condensation catalysts and chain stoppers which can be used in process variant (8) are all those substances which have already been mentioned in this connection in the case of process variant (1).

Process variant (8) is carried out in an aqueous medium, preferably in water. However, it is also possible to replace some of the water by other diluents, such as an alcohol, methanol and ethanol being mentioned in particular.

The reaction temperatures can be varied within a substantial range in carrying out process variant (8). In general, the reaction is carried out at temperatures between 0° C. and 200° C., preferably between 10° C. and 150° C.

In general, the reaction in process variant (8) is carried out under normal pressure. However, it is also possible to carry out the reaction under increased or reduced pressure.

In carrying out process variant (8), a catalytic amount, or even a larger amount, and preferably 1 to 4 mols, of inorganic or organic acid is employed per mol (relative to the molecular unit

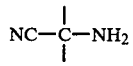

with the equivalent weight 54) of azulmic acid. The amount of aminoplast-forming agents, carbonyl compounds or freshly prepared (optionally chemically modified) low-molecular condensation products thereof is chosen so that in each case 0.1 to 5 mols of aminoplast-forming agent, carbonyl compound or (optionally chemically modified) low-molecular condensation products thereof are present per mol of azulmic acid employed. The hydrolytically degradable naturally occurring substances are added to the reaction mixture in an amount such that their proportion in the end product is between 1 and 95% by weight, preferably between 5 and 90% by weight. Moreover, additional condensation catalysts and chain stoppers can also be added to the reaction mixture. Catalysts are appropriately employed in this case in amounts of from 0.05 to 10% by weight, preferably from 0.1 to 5% by weight, relative to the total amount of all the substances participating in the polycondensation reaction. As a rule, the acid used for the hydrolytic degradation of the naturally occurring substances simultaneously functions as the condensation catalyst. Chain stoppers can be used in amounts of 0.5 to 60% by weight, relative to the total amount of aminoplast-forming agents and carbonyl compounds.

In carrying out process variant (8), structural defects are produced on the azulmic acid, with simultaneous hydrolytic degradation of the particular naturally occurring substances employed and with simultaneous stabilization of the azulmic acids by condensation with carbonyl compounds and aminoplast-forming agents. If 0.2 to 80% strength phosphoric acid or phosphorous acid and polypeptides are used, the latter are split into amino acid mixtures.

Because of its numerous amino groups, in process variant (8) the azulmic acid bonds about 0.3 to 0.4 mol of acid, for example nitric acid, phosphoric acid or phosphorous acid. The nitric acid salts or phosphoric acid salts of the aminoacids or of the oligopeptides, or the other low-molecular degradation products of the naturally occurring substances employed are frequently fixed by the azulmic acid matrix in a large amount, even when they are water-soluble.

Excess acid, for example phosphoric acid, can be precipitated on the azulmic acid matrix as calcium phosphate by adding calcium hydroxide. If hydrolyzed sugars and oligosaccharides are present in this case, they are fixed on the azulmic acid in the form of their calcium complexes, which are usually sparingly soluble. The products obtained by this process can be stored for a relatively long period without unpleasant odors being formed. This in contrast to the case when naturally occurring substances such as oligopeptides, peptide/sugar mixtures and the like are degraded by biological processes initiated microbially.

Isolation of the process products is carried out by customary methods, in general by filtration.

In process variant (9), azulmic acids which are partially or completely stabilized with carbonyl compounds and optionally contain additives are reacted, in an aqueous medium, optionally in the presence of additives and if desired and/or necessary in the presence of catalysts, and/or chain stoppers, with aminoplast-forming agents and carbonyl compounds or freshly prepared, optionally chemically modified, condensation products thereof.

The azulmic acids, partially or completely stabilized with carbonyl compounds and optionally containing additives, required as starting materials in process variant (9) have not hitherto been disclosed in the literature. However, they can be prepared in a simple manner. Thus, these products are obtained, for example, by a process in which modified azulmic acids such as are described as starting substances in the case of process variant (1) are reacted with carbonyl compounds, optionally in the presence of additives, in an aqueous medium at temperatures between 20° C. and 150° C., preferably between 50° C. and 120° C. Preferred carbonyl compounds include aldehydes, such as formaldehyde, acetaldehyde, crotonaldehyde, isobutyraldehyde, glyoxal, acrolein, hydroxyacetaldehyde, hydroxypivalaldehyde, glyceraldehyde, furfurol, chloral or chloral hydrate, hydroxymethylfurfurol, glucose, methylglyoxal and salicylaldehyde, and, as a reagent which splits off formaldehyde, hexamethylenetetramine, paraformaldehyde or trioxane. Additives which can be used are all those substances which have already been mentioned as additives in the case of the description of process variant (1).

By azulmic acids which are partially stabilized with carbonyl compounds is meant those azulmic acids in which only a small proportion of the available reactive groups of the azulmic acid employed has reacted with carbonyl compounds. Analogously to this, by azulmic acids which are completely stabilized with carbonyl compounds is meant those azulmic acids in which the available reactive groups of the azulmic acid have reacted as far as possible with carbonyl compounds.

In general, in the preparation of azulmic acids which are partially or completely stabilized with carbonyl compounds and optionally contain additives a procedure is followed in which 0.05 to 6 mols, preferably 0.2 to 3 mols, of carbonyl compound, a catalytic amount, or even a larger amount, of acid or base (about 1 mol of acid or base per 100 parts by weight of azulmic acid) are employed per mol (relative to the molecular unit

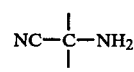

with the equivalent weight 54) of modified azulmic acid optionally containing additives, and an amount of additives such that their proportion in the end product is between 1 and 95 percent by weight is optionally employed. Working up is effected by customary methods. In general, a procedure is followed in which the reaction mixture is filtered, after the reaction has ended, and the solid product obtained is appropriately washed and dried.

In this connection, it should be pointed out that very small amounts of carbonyl compounds (0.05 to 0.2 mol) are frequently sufficient to obtain substances which have a high stability towards splitting off of hydrogen cyanide under the influence of heat and under hydrolyzing conditions.

Additives, aminoplast-forming agents, carbonyl compounds, freshly prepared low-molecular weight (optionally chemically modified) condensation products of aminoplast-forming agents and carbonyl compounds, condensation catalysts and chain stoppers which can be used in process variant (9) are all those substances which have already been mentioned in this connection in the case of process variant (1).

Process variant (9) is carried out in an aqueous medium, water preferably being used as the reaction medium. However, it is also possible to replace some of the water by other diluents, such as an alcohol, methanol and ethanol.

The reaction temperatures can be varied within a substantial range in carrying out process variant (9). In general, the reaction is carried out at temperatures between 0° C. and 200° C., preferably between 10° C. and 150° C.

In general, the reaction in process variant (9) is carried out under normal pressure. However, it is also possible to carry out the reaction under increased or reduced pressure.

In carrying out process variant (9), 0.1 to 5 mols of aminoplast-forming agent and carbonyl compound or low-molecular, optionally chemically modified, condensation products thereof are employed per mol (relative to the molecular unit

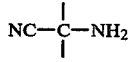

with the equivalent weight 54) of azulmic acid which is partially or completely stabilized with carbonyl compounds and optionally contains additives. Additives can be added to the reaction mixture in an amount such that their proportion in the end product is between 1 and 95% by weight, preferably between 5 and 90% by weight. In addition, condensation catalysts and chain stoppers are appropriately added in the case of the reaction of the azulmic acid with condensation partners. Catalysts are appropriately employed in amounts of 0.05 to 10% by weight, preferably of 0.1 to 5% by weight, relative to the total amount of all the components participating in the polycondensation reaction. Chain stoppers can be used in amounts of 0.5 to 60% by weight, relative to the total amount of aminoplast-forming agents and carbonyl compounds.

In general, carrying out of process variant (9) in practice is effected by a procedure in which modified azulmic acid optionally containing additives is first subjected to a partial or complete condensation reaction with carbonyl compounds in an aqueous medium, in the presence of a catalytic amount, or even a larger amount, of an acid or base (about 1 mol of acid or base per 100 parts by weight of azulmic acid), optionally in the presence of additives. Aminoplast-forming agents and carbonyl compounds or freshly prepared aqueous solutions of aminoplast condensates which are still soluble (for example, polyalkylol compounds or polymethylol compounds) are then added to the reaction mixture, if appropriate without prior isolation of the resulting azulmic acids which are partially or completely stabilized with carbonyl compounds. Additives, modifying reagents, catalysts and chain stoppers are added, if appropriate, and the condensation reaction is carried out. Mixtures of different carbonyl compounds and/or aminoplast-forming agents can, of course, also function as condensation partners. Working up is effected by customary methods. In general, a procedure is followed in which the reaction mixture is filtered, after the reaction has ended, and the solid product thereby obtained is washed and dried.

A preferred embodiment of process variant (9) is carried out by first reacting the azulmic acid employed with an aldehyde, preferably with formaldehyde or glyoxal, to an extent such that from 0.1 to 0.4 NH$_2$ group equivalents per 100 parts by weight of azulmic acid has been condensed with the aldehyde, and then carrying out the co-condensation reaction according to the invention.

In process variant (10), hydrocyanic acid polymers which have been subjected to pretreatment with heat are reacted, in an aqueous medium, optionally in the presence of additives and if desired and/or necessary in the presence of catalysts, and/or chain stoppers, with aminoplast-forming agents and carbonyl compounds or freshly prepared, optionally chemically modified, condensation products thereof.

By hydrocyanic acid polymers which have been pretreated with heat and are required as starting materials for process variant (10) is meant those hydrogen cyanide polymers which have been heated to 200° C. to 550° C. after polymerization has been effected. During this procedure, hydrogen cyanide, ammonia, carbon dioxide and water are split off from the azulmic acid and a black residue remains which has a lower nitrogen content than azulmic acid which has not been pretreated with heat. This type of hydrocyanic acid polymer which has been pretreated with heat is already known (see Angew. Chem. 72, 380 (1960)).

Furthermore, additives, aminoplast-forming agents, carbonyl compounds, freshly prepared low-molecular, optionally chemically modified, condensation products of aminoplast-forming agents and carbonyl compounds, condensation catalysts and chain stoppers which can be used in process variant (10) include all those substances which have already been mentioned in the case of process variant (1).

Process variant (10) is carried out in an aqueous medium, preferably in water. However, it is also possible to replace some of the water by other diluents, such as an alcohol, methanol and ethanol.

The reaction temperatures can be varied within a substantial range in the case of process variant (10). In general, the reaction is carried out at temperatures between 0° C. and 200° C., preferably between 10° C. and 150° C.

In general, the reaction in process variant (10) is carried out under normal pressure. However, it is also possible to carry out the reaction under increased or reduced pressure.

In carrying out process variant (10), 0.1 to 5 mols of aminoplast-forming agent and carbonyl compound or low-molecular, optionally chemically modified, condensation products thereof are employed per mol (relative to the molecular unit

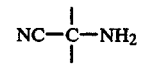

with the equivalent weight 54) of hydrocyanic acid polymer which has been pretreated with heat. Additives can be added to the reaction mixture in an amount such that their proportion in the end product is between 1 and 95% by weight, preferably between 5 and 90% by weight. In addition, condensation catalysts and chain stoppers are appropriately added in the case of the reaction of azulmic acid with the condensation partners. Catalysts are appropriately employed here in amounts of 0.05 to 10% by weight, preferably of 0.1 to 5% by weight, relative to the total amount of all the components participating in the polycondensation reaction. Chain stoppers can be used in amounts of 0.5 to 60% by weight, relative to the total amount of aminoplast-forming agents and carbonyl compounds.

In general, the process variant (10) is effected by a procedure in which aminoplast-forming agents and carbonyl compounds or freshly prepared aqueous solutions of aminoplast-forming agents and carbonyl compounds (=solution of partially alkylolated or partially methylolated products) or an aqueous solution of aminoplast condensates which are still soluble (for example, polyalkylol compounds or polymethylol compounds) are added to hydrocyanic acid polymers, in an aqueous medium, which have been pretreated with heat, if appropriate in a fluidized bed. Additives, modifying reagents, catalysts and chain stoppers are added if appropriate, and the condensation reaction is carried out. Mixtures of different carbonyl compounds and/or aminoplast-forming agents can, of course, also function as condensation partners. Working up is effected by customary methods. In general, a procedure is followed in which the reaction mixture is filtered, after the reaction has ended, and the solid product thereby obtained is washed and dried.

In process variant (11), azulmic acids which are chemically modified on the surface and optionally contain additives are reacted, in an aqueous medium, optionally in the presence of additives and if desired and/or necessary in the presence of catalysts, and/or chain stoppers, with aminoplast-forming agents and carbonyl compounds or freshly prepared, optionally chemically modified, condensation products thereof.

The substances required for process variant (11) include those azulmic acids, the surface of which has been chemically modified by topochemical after-treatment reactions. Substances of this type have not hitherto been disclosed in the literature. However, they can be prepared in a simple manner by a process in which azulmic acids which optionally contain additives, contain structural defects and have been pretreated with heat or azulmic acids which are almost free from structural defects are treated with the most diverse reagents or subjected to the most diverse reactions, if appropriate in the presence of diluents, for example anhydrous organic solvents, at temperatures between 0° C. and 150° C., preferably between 10° C. and 120° C. Preferred after-treatment reagents or after-treatment reactions are all those reagents or reactions which have already been mentioned as preferred after-treatment reagents or after-treatment reactions in connection with the description of the products according to the invention.

Additives, aminoplast-forming agents, carbonyl compounds, freshly prepared low-molecular, optionally chemically modified, condensation products of aminoplast-forming agents and carbonyl compounds, condensation catalysts and chain stoppers which can be used in process variant (11) include all those substances which have already been mentioned in this connection relative to process variant (1).

Process variant (11) is carried out in an aqueous medium, preferably in water. However, it is also possible to replace some of the water by other diluents, such as an alcohol, methanol and ethanol.

The reaction temperatures can be varied within a substantial range in the case of process variant (11). In general, the reaction is carried out at temperatures between 0° C. and 200° C., preferably between 10° C. and 150° C.

In general, the reaction in process variant (11) is carried out under normal pressure. However, it is also possible to carry out the reaction under increased or reduced pressure.

In carrying out process variant (11), 0.1 to 5 mols of aminoplast-forming agent and carbonyl compound or low-molecular weight, optionally chemically modified, condensation products thereof are employed per mol (relative to the molecular unit

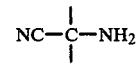

with the equivalent weight 54) of azulmic acid which is chemically modified on the surface and optionally contains additives. Additives can be added to the reaction mixture in an amount such that their proportion in the end product is between 1 and 95 percent by weight, preferably between 5 and 90 percent by weight. In addition, condensation catalysts and chain stoppers are appropriately added in the case of the reaction of azulmic acid with the condensation partners. Catalysts are appropriately employed in amounts of 0.05 to 10% by weight, preferably of 0.1 to 5% by weight, relative to the total amount of all the components participating in the polycondensation reaction. Chain stoppers can be used in amounts of 0.5 to 60% by weight, relative to the total amount of aminoplast-forming agents and carbonyl compounds.

In general, process variant (11) is effected by a procedure in which aminoplast-forming agents and carbonyl compounds or a freshly prepared aqueous solution of aminoplast-forming agents and carbonyl compound (=solution of partially alkylolated or partially methylolated products) or an aqueous solution of aminoplast condensates which are still soluble (for example, polyalkylol compounds or polymethylol compounds) are first added to azulmic acids, in an aqueous medium, which optionally contain additives and are chemically modified on the surface. Additives, modifying reagents, catalysts and chain stoppers are added, if appropriate, and the condensation reaction is carried out. Mixtures of different carbonyl compounds and/or aminoplast-forming agents can, of course, also function as condensation partners. Working up is effected by customary methods. In general, a procedure is followed in which the reaction mixture is filtered, after the reaction has ended, and the solid product obtained is appropriately washed and dried.

If free amino groups are still present in the products prepared by process variants (1) to (11), these products can be converted into the corresponding acid addition salts by treatment with inorganic or organic acids. In this case, a procedure is followed in which the products are stirred with the particular acid in an aqueous medium, optionally at elevated temperature. The reaction products are isolated by filtration.

If free carboxyl groups are still present in the products prepared by process variants (1) to (11), these products can be converted into the corresponding salts by treatment with bases. In this case, a procedure is followed in which the products are stirred with the particular base in an aqueous medium, optionally at elevated temperature. The reaction products are isolated by filtration.

The products which can be prepared by process variants (1) to (11) can be chemically surface modified by treating them with the most diverse reagents or subjecting them to the most diverse reactions, if appropriate, in the presence of diluents, for example anhydrous organic solvents, at temperatures between 0° C. and 150° C., preferably between 10° C. and 120° C.

Preferred processes for chemical modification of the surface of the co-condensates according to the invention which can be prepared by process variants (1) to (11) are those described on page 34 through page 36, line 24.

The products according to the invention which are chemically modified on the surface can contain up to 0.06 mol, preferably 0.01 to 0.05 mol, of the group introduced by treatment of the surface per mol of azulmic acid.

The most diverse copolymerizations or polymerizations of vinyl monomers can also be carried out in these after-treatment reactions, the azulmic acid products being coated or microencapsulated by the polymers formed. In this case, the "coating materials" can, of course, also be employed in a large excess.

If desired, the number of structural defects in the azulmic acids which are employed as starting substances in the processes according to the invention can be increased before or during the reaction. Furthermore, if desired, the number of structural defects in the products prepared by process variants (1) to (11) can also be increased after the co-condensation reaction has ended. All those processes which have already been listed in connection with the description of the preparation of the modified azulmic acids, that is to say azulmic acids containing structural defects, are suitable for this purpose. If the production of structural defects is to be carried out after the co-condensation reaction has taken place, a procedure is followed in which the reaction products are stirred, in an aqueous medium and optionally at elevated temperatures, with the reagents employed for the production of structural defects. The products are isolated by filtration.

The production of structural defects by metal salts may be mentioned in particular. If the metal salts are already added during the condensation reaction, the products according to the invention can be complexed and provided with a greater or lesser number of structural defects, depending on the co-condensation time, in essentially one operation.

Sparingly soluble, calcium complexes of 3 mols of calcium hydroxide and sucrose or glucose, as well as soluble complexes of isomeric trioses, tetroses, pentoses and hexoses, and calcium hydroxide complexes of formose sugar mixtures based on formaldehyde are also preferably suitable for the production of structural defects.

A further preferred method for the production of structural defects consists of a procedure in which, in carrying out process variant (3), about 60 to 180 parts by weight of urea, melamine or dicyandiamide, per 100 parts by weight of crude azulmic acid, are initially introduced in an aqueous solution. Azulmic acid is dispersed therein at 100° C. Sparingly soluble melamine phosphates or urea oxalates are produced by adding phosphoric acid or oxalic acid. The production of structural defects is interrupted after about 4 hours and the co-condensation reaction is then carried out, preferably with formaldehyde, glyoxal, acrolein, isobutyraldehyde, crotonaldehyde, hydroxy ethylfurfurol or the like. In this procedure, products are obtained which can be used as high-quality reactive fillers and high-quality flame-proofing agents for polyurethane foams.

A further preferred method for the production of structural defects consists in maintaining oxidative conditions. This can be effected by adding small amounts of substances having an oxidizing action, such as hydrogen superoxide, perpropionic acid, hypochlorite solution, bleaching powder or potassium permanganate.

A further preferred method for the production of structural defects consists of a procedure in which the azulmic acids employed are first treated with fly ashes, types of ash of various origin or carbonrich combustion residues and the co-condensation reaction according to the invention is then carried out. Furthermore, other sparingly soluble or insoluble carriers and naturally occurring substances can also be used for the production of structural defects.

A further preferred method for the production of structural defects during the co-condensation reaction or after the co-condensation reaction has taken place consists of a procedure in which 100 to 500 parts by weight of approximately 30% strength aqueous sodium silicate solutions or potassium silicate solutions are added per 100 parts by weight of azulmic acid. It is generally appropriate, as a rule, to carry out the condensation reaction with the carbonyl compound and aminoplast-forming agent or with low-molecular freshly prepared condensation products thereof at 40° C. to 100° C., or to subsequently react the co-condensates with the above-mentioned amounts of alkali metal silicates. Modified azulmic acids which are charged with potassium ions or sodium ions and have saponifiable nitrile groups which act as latent acids (catalysts) and precipitate silicic acids are formed here in a topochemical reaction. The silicic acids thus precipitated are absorbed, in fine distribution, onto the reaction products. Any excess sodium silicate or potassium silicate present can be precipitated by simply gassing the particular dispersions with carbon dioxide, or can be precipitated out in a particularly advantageous manner by adding phosphoric acid or calcium chloride mixed with potassium phosphates or sodium phosphates or calcium silicates. The products thus formed are interesting as fillers which contain reactive groups.

A further preferred method for the production of structural defects before, during or after the co-condensation reaction consists of a procedure in which a large excess of amines containing other functional groups is used. Particularly suitable amines include ethanolamine, diethanolamine, N-methylethanolamine, triethanolamine, and propanolamines; polyamines, such as diethylenetriamine, triethylenetetramine, tetramethylenediamine and isophoronediamine; oleylamine and fatty amines; and amino acids, such as, for example, glycine, alanine, asparagine and $\epsilon$-aminocaproic acid. The products formed in this case have a particularly high swellability. If fatty amines are employed for the production of structural defects, products with strongly hydrophobic properties are formed.

Finally, a further preferred method for the production of structural defects in the products according to the invention consists of a procedure in which the reactions according to the invention are carried out in the presence of sodium hydroxide, potassium hydroxide, calcium hydroxide, sodium sulfite, sodium thiosulfate, rongalite, sodium sulfide, ammonium polysulfides, diethyl phosphite, dimethyl phosphite or hydroxymethylphosphonic acid.

In the preparation of the substances according to the invention by process variants (1) to (11), it is also possible to follow a procedure in which, after the co-condensation reaction, substantially any desired amounts of polymethyleneureas, polyalkylideneureas and sparingly soluble or insoluble compounds (i.e. highly cross-linked aminoplast condensates), which, as a result of their insolubility, do not form covalent linkages with the azulmic acid in the process products, are produced in the form of their water-insoluble dispersions. Mixtures of this type (in which the proportion of aminoplast condensates not covalently bonded can have virtually any desired value) are exceptionally interesting flame-proofing agents for foamed plastics, especially for polyurethane foams, and especially in the case where products are charged with polymethyleneureas, polymethylenethioureas, cross-linked polymethylenemelamine powders, urea/hydrazodicarboxamide/formaldehyde condensates and dicyandiamide and oxamide condensates.

Moreover, other sparingly soluble or insoluble fillers, flame-proofing agents, pigments, dyestuffs and the like can also be precipitated on the products according to the invention. Thus, for example, metal salts present in excess, or added later, can be converted into sparingly soluble metal hydroxides or metal oxides by adding bases. Furthermore, in many cases it is possible to precipitate metal salts in the form of sparingly soluble metal phosphates, metal sulfates, metal carbonates or metal silicates by adding appropriate acids. Salts of tungsten, vanadium and molybdenum can be precipitated in the form of hetero-polyacids. Polysilicic acids can be produced on the products according to the invention by adding sodium waterglass solutions or potassium waterglass solutions and gassing the mixture with carbon dioxide. Sulfur can also be precipitated on the insoluble co-condensates by adding sodium polysulfides or ammonium polysulfides and rendering the mixture strongly acid.

Subsequent treatment of the co-condensates according to the invention with sparingly soluble melamine phosphate, sparingly soluble urea oxalate or sparingly soluble ammonium magnesium phosphate is also of interest. The addition of hydrated aluminas, aluminum oxides, titanium dioxide and calcium carbonate, of quartz flour and the addition of linear or cross-linked polymethyleneureas, of powdered melamine/formaldehyde condensates, urea/dicyandiamide condensates, melamine/urea/formaldehyde condensates, urea/hydrazodicarboxamide condensates and high-molecular polyammonium polyphosphates having the structure

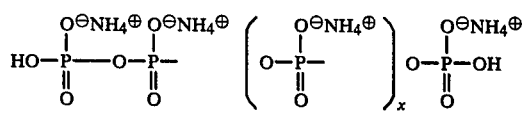

wherein $x = 10-200$, is also of significance. The products thereby formed are outstandingly suitable as flame-proofing agents for plastics, in particular for polyurethane plastics.

Further preferred additives in the case of the co-condensates according to the invention are also sugars, such as cane sugar and other sugars containing no free aldehyde groups, or formose sugar mixtures prepared from formaldehyde. These most diverse types of sugars can be fixed in the channels and pores of the solid azulmic acid matrices. Moreover, the various sugars can also be absorbed onto the azulmic acids in the form of their calcium complexes, which in most cases are sparingly soluble.

It is also possible to gas the products according to the invention simultaneously with ammonia and carbon dioxide after their preparation. Ammonia and carbon dioxide thereby penetrate into the azulmic acid matrix to a considerable extent as small molecules. In the case of gassing with ammonia in a fluidized bed, for example, the unstable ammonium carbaminates, ammonium bicarbonates and, if ammonia and carbon dioxide are introduced in the absence of water, ammonium carbamate of the formula

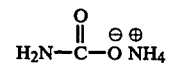

are obtained and fixed in the channels of the azulmic acid co-condensates. In this form, the ammonium carbamate has a reduced tendency to decompose at room temperature.

It is frequently advantageous to treat or gas the co-condensates according to the invention, after their preparation, with ammonia or primary or secondary amines or to rinse them with aqueous ammonia/hydrazine solutions, hydrazine hydrate, methylhydrazine or aqueous cyanide solutions in order quantitatively to remove traces of formaldehyde or other aldehydes or ketones. In the case of the action of ammonia, for example, small amounts of formaldehyde still contained in the products condensed with formaldehyde are converted into hexamethylenetetramine or hexahydrotriazines. An after-treatment with 25% strength aqueous ammonia solution is frequently advisable. All these purification operations can be carried out industrially, for example by gassing in a fluidized bed, or coupled with the spray-drying of the products.

If the products according to the invention still contain residues of catalyst after their preparation, it is frequently advisable to wash out the latter, or to deactivate them chemically by reaction with suitable reagents. If acids or bases have been used as catalysts, it is advisable to neutralize these by adding bases or acids respectively.

The products according to the invention are not only very resistant towards the splitting off of hydrogen cyanide, but also have a considerably higher swellability than the previously known azulmic acids, which are almost free from structural defects. In contrast to the previously known azulmic acids, they therefore readily undergo very diverse chemical reactions and can thus be used in many ways.

Thus, the products according to the invention are outstandingly suitable as complex-forming agents for an exceptionally large number of metal salts, especially heavy metal salts, and other metal compounds. The fixing of ions (such as borate ions, iron ions, mercury ions, lead ions, cadmium ions, vanadate ions, tungstate ions, molybdate ions or anions of corresponding heteropolyacids, and of pyrophosphates and higher-molecular, sparingly soluble, commercially available polyphosphates which are derived from polyphosphoric acids of the formula

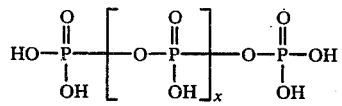

and have molecular weights between 6,000 and 40,000), onto the anchor groups of the stabilized azulmic acids may be mentioned as an example. The products concerned can be used as insoluble catalysts and as flame-proofing agents. The bonding of undesired heavy metal salts, such as mercury salts, in soil is also of importance.

Depending on their particle size, the substances according to the invention have a specific surface area of about 1.03 m² per gram. They thus have a somewhat higher specific surface area than humic acid, the specific surface area of which is about 0.79 m² per gram. Products according to the invention with even greater specific surface areas can be prepared by a procedure in which, in a first stage, hydrogen cyanide is polymerized on carriers, in particular fineparticled polymethyleneurea or starch powders, or in the presence of emulsifiers. Then, in a second stage, co-condensation reactions according to the invention are carried out on the products, mixed with these carriers or emulsifiers. The products formed exhibit good adsorption properties with respect to basic, acid or neutral substances. They are particular suitable for taking up potassium ions, sulfate ions, chloride ions and sulfur dioxide. They can also be employed to prevent contamination, for example by heavy metal salts, in soil. Furthermore, in many cases they can also be used to compensate overdoses of plant protection agents.

Those substances according to the invention which contain from 2 to 30 percent by weight of one or more compounds of potassium, sodium, lithium, manganese, lead, mercury, cobalt, tin, copper, zinc, iron(II), iron(III), bismuth, nickel or magnesium can be employed as completely insoluble catalysts in isocyanate chemistry. A particular advantage of these heterogeneous catalyses is that the dimerization, polymerization or carbodiimide formation can be stopped by simple filtration of the mixtures, and the solutions of the polymers possessing isocyanate groups in monomeric polyisocyanates do not have to be deactivated. The products formed, i.e. modified isocyanates, have an outstanding stability on storage.

Products according to the invention can furthermore be employed for the preparation of dispersions in polyhydroxy compounds which can be foamed with isocyanates. Possible polyhydroxy compounds include polyethers, polycarbonates, polyesters, polythioethers or polyacetals which have molecular weights of from 62 to about 10,000 and contain hydroxyl groups. Dispersions of this type can also be used in polyisocyanates, which are of interest industrially and are preferably liquid at room temperature, for the preparation of polyurethane foams. Possible polyisocyanates include aliphatic, cycloaliphatic, araliphatic and aromatic polyisocyanates. Polyphenylpolymethylene-polyisocyanates, such as can be prepared by condensation of aniline and formaldehyde and subsequent phosgenation of the product, and mixtures thereof with toluylene-2,3- and/or -2,6-diisocyanate, optionally mixed with 4,4'-diphenylmethanediisocyanate and its isomers, are preferably used. In addition, solutions of so-called "modified polyisocyanates", i.e. polyisocyanates which contain biuret groups, allophanate groups, urethane groups, carbodiimide groups, uretoneimine groups or isocyanurate groups and which are dissolved in the above-mentioned monomeric polyisocyanates can also preferably be used. In this case, solutions of "modified polyisocyanates" containing 5–70% by weight, preferably 10–50% by weight, of "modified polyisocyanate" are particularly preferred.

The use of the products according to the invention is, of course, not restricted to the preparation of dispersions for the production of polyurethane foams. Rather, the azulmic acid co-condensate dispersions obtainable according to the invention can also completely or partly replace polyhydroxy compounds, which are in themselves known, for the preparation of polyurethane elastomers, polyurethane lacquers or polyurethane leather-dressing agents or in other fields of use for polyurethanes.

Products according to the invention can also be used as multi-component fillers with reactive groups in plastics of the most diverse nature. It is possible, for example, to prepare from the substances according to the invention and polycarbodiimide powders, products in which the products according to the invention are coated, microencapsulated and essentially enclosed by polycarbodiimides.

The co-condensates according to the invention are also reactive fillers of particularly high quality for the preparation of polyurethane starting materials in the production of polyurethane plastics, in particular polyurethane foams, by the isocyanate polyaddition process. In the case of the production of foam, the co-condensates according to the invention are employed as a mixture with the polyhydroxy compounds known from polyurethane foam chemistry. The products present in the dispersions cause, in particular, a considerable increase in the flame-proof character and resistance to solvents of foams produced therefrom.

For the production of polyurethane foams using the above-mentioned dispersions, the procedure followed is advantageously according to the so-called one-shot process. Mechanical devices which are known from the literature are also advantageously used (see German Patent Specification 881,881).

It is, of course, also possible to co-use other customary fillers, flame-proofing agents and additives of the most diverse nature in the production of foams using the co-condensates according to the invention as fillers. Other substances which can preferably be used include water-soluble or water-dispersible inorganic salts, double salts or complex compounds, for example ammonium sulfate, spent liquors from the preparation of caprolactam which contain ammonium sulate, calcium sulfate $(NH_4)_2SO_4.H_2O.Ca(H_2PO_4)_2$, ammonium phosphate, $CaNaPO_4.Ca_2SiO_4$, $5\ CaO.P_2O_5$, $SiO_2$, $Ca_4P_2O_9$, $(CaMg)O.Al_2O_3.4\ SiO_2$, $Al_2O_3.2\ SiO_2.\ 2\ H_2O$, $KCl.MgSO_4.3\ H_2O$, $K_2SO_4.MgSO_4.6\ H_2O$, $Si_2O_6AlK$, sodium nitrate, ammonium nitrate, secondary sodium ammonium phosphate and similar substances.

The use of the stabilized azulmic acid cocondensates according to the invention as reactive fillers in the production of polyurethane plastics permits the production of polyurethanes which are distinguished by a number of remarkable advantages which are illustrated in more detail below.

Thus, it is possible to produce foams which have a greatly increased flame-proof character and, compared with customary foams, exhibit a reduced burned gas density and substantially no spreading of flames.

The co-condensates according to the invention can be employed for the production of elastomers by the casting process, whereby increased flame-proof character and resistance to hydrolysis results in the polyaddition products.

Microporous coatings or films and lacquers and coatings with increased flame-proof character and increased resistance to hydrolysis can be prepared by the diisocyanate polyaddition process.

The substances according to the invention can be dispersed, in particular, in solutions of elastomers in dimethylformamide or in so-called soft-solvents systems, i.e. solutions of elastomers of a high viscosity of over 3,000 cP (20° C.), and particularly readily in solutions of over 5,000 cP, without any tendency towards sedimentation. The solutions can then be cast to give films containing filler.

Those substances according to the invention which have a high ionic constituent and thus have a polyelectrolyte character can be used as ion exchangers or also as catalysts and catalyst supports.

Numerous substances according to the invention can be used as flame-proofing agents or anti-ageing agents for preventing oxidative degradation in polyurethane plastics, vinyl polymers, polyamide plastics, rubbers and epoxide resins. Those substances according to the invention which contain phosphoric acid, phosphorous acid, polymethyleneureas, polymethylenemelamines, calcium phosphates, calcium carbonate, titanium dioxide, hydrated aluminas, aluminum phosphates, aluminum silicates, hydrated aluminum oxide, waterglass, melamine phosphate, barium phosphates, ammonium magnesium phosphates and/or urea oxalate are particularly suitable for this purpose.

Moreover, adducts of azulmic acids, stabilized according to the invention, with such compounds as, for example, phospholine oxide-phosphonic acids of the formulae

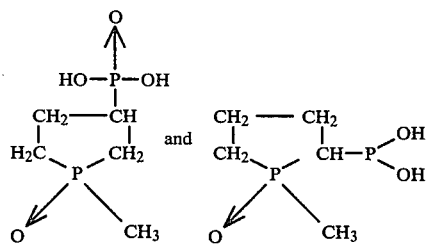

are suitable as catalysts for the heterogeneous catalysis of the reaction of isocyanates and polyisocyanates to give polycarbodiimides and their further adducts with isocyanates (e.g. uretoneimine-polyisocyanates).

Substances according to the invention can furthermore be employed as supports for numerous catalysts, mixed catalysts being formed which can be used in many ways. Thus, for example, azulmic acids stabilized with carbonyl compounds and aminoplast-forming agents, in particular with formaldehyde and urea, and containing calcium hydroxide, lead acetate, lead hydroxide or bismuth hydroxide, have a high activity hitherto unknown for the synthesis of formose sugar mixtures. These mixed catalysts make it possible to convert formalin solutions of high strength into sugar mixtures. Very high yields are achieved and Cannizarro reactions are essentially avoided.

Those azulmic acids which have been partially condensed (only about every fourth amino group, in statistical distribution) with carbonyl compounds, in particular formaldehyde, and aminoplast-forming agents and which contain 10 to 90% by weight, preferably 40 to 60% by weight, of calcium hydroxide are particularly suitable for the synthesis of formose. Substances of this type cause glycolaldehyde ($C_2$-aldehyde), glyceraldehyde ($C_3$-aldehyde) and further $C_4$-$C_7$-hydroxyaldehydes or hydroxyketones (which can react with remaining amino groups in the azulmic acids by condensation reactions and can likewise lead to partial stabilization of the substances according to the invention) to be formed very rapidly in situ from monomeric formaldehyde. Because of the tackiness of the higher-molecular caramellized sugars obtained, these products can be spray-dried completely free from formaldehyde. They are brown-black, humus-like substances with a friable structure, which are of interest both as agents for improving soil and as plant nutrients. The sugar mixtures absorbed onto the matrix in this procedure can be complexed with relatively large amounts of calcium hydroxide or magnesium hydroxide, sugar complexes being formed such as are known, for example, with sucrose, 3 mols of calcium oxide being bonded per mol of sucrose. In the case of azulmic acid co-condensates containing formoses and calcium hydroxide, the low solubility of complexes of this type advantageously impedes the rapid washing out of the sugars when the substances are applied in the agricultural sector.

Furthermore, substances according to the invention can be employed in a diverse manner as agrochemicals, such as agents for improving soil, or fertilizers.

The preparation of the substances according to the invention and their properties are illustrated in the examples which follow.

EXAMPLES

EXAMPLE 1

Comparison experiment: Polymerization of monomeric hydrocyanic acid in the presence of potassium cyanate (see Angew. Chem. 72, (1960), page 380, Example 4).

200 parts by weight of a 30% strength aqueous hydrocyanic acid solution were warmed to 40° to 50° C. in the presence of 1.08 parts by weight of potassium cyanate for 5 hours. The product formed was filtered off, washed successively with distilled water and ethanol and then dried at 80° C. Azulmic acid was obtained in the form of a black powder in a yield of 95% of theory.

Elementary analysis:
41.4% C; 4.0% H; 43.2% N; 11.4% O

On the basis of the oxygen values given, this azulmic acid, the formula of which was approximately characterized by the formula (I) (for m=4), given near the beginning of this text, had the empirical formula $C_{24}H_{28}O_5N_{22}$ (see Angew. Chem. 72 (1960), page 383).

Small amounts of monomeric hydrocyanic acid were continuously split off from this polymer even after careful drying for a long time at room temperature or at 80° C. Subsequent intensive washing and renewed drying, even under a high vacuum, did not stop the splitting back into hydrocyanic acid.

The determination of hydrogen cyanide was carried out by customary methods.

When 2,000 g of the azulmic acid which had been prepared by the method indicated above were stored at 50° C. in a container with a volume of air of 12 liters, after 2 hours, a hydrogen cyanide concentration of 0.066 g of hydrogen cyanide per 12 liters of air was measured. A hydrogen cyanide MWC value (MWC=maximum workplace concentration) of 4,583 ppm was calculated from this, that is to say an MWC value which was 416 times greater than the legally imposed MWC value of 11 ppm. An azulmic acid of this type was accordingly completely unsuitable for use in practice.

10 parts by weight of the azulmic acid prepared by the process above were treated with 100 parts by weight of distilled water at 100° C. for 3 hours. The concentration of cyanide ions in the filtrate was then determined. A concentration of cyanide ions was found which corresponded to a hydrocyanic acid content of from 26 to over 28 mg per liter of water. Such concentrations of cyanide ions were enough to cause destruction and deactivation of important bacteria, and their enzyme systems, occurring in soil.

EXAMPLE 2

Comparison experiment: Polymerization of monomeric hydrocyanic acid by the "running in" process in the presence of ammonia (see German Patent Specification No. 949,600).

A mixture of 5,600 g of water, 1,400 g of hydrocyanic acid and 88 g of ammonia was polymerized exactly according to Example 1 of German Patent Specification No. 949,600. After a polymerization time of about five hours at 50° C. and after discontinuing the cooling, the internal temperature rose to 90° C., remained at this level for about one hour and then fell. The azulmic acid formed was isolated, washed with water and dried at 80° C. Yield: 98% of theory. Stability to heat:

Storage of 2,000 g of the azulmic acid at 50° C. for two hours (see Example 1) gave an MWC value of over 5,000 ppm. Stability to hydrolysis:

Treatment of 10 parts by weight of the azulmic acid with 100 parts by weight of distilled water at 100° C. for three hours (see Example 1) gave a hydrocyanic acid concentration of 30 to 36 mg per liter of water.

EXAMPLE 3

Comparison experiment: Treatment of azulmic acid according to Example 1 with ketones in the absence of water.

In each case, 108 g of the azulmic acid prepared according to Example 1 [disregarding the end groups, this amount corresponded on average to 2 base mols of polymerized aminocyanocarbene units having the structure

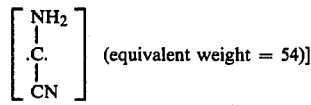

(equivalent weight=54)]
where treated with 4 mols of one of the anhydrous ketones mentioned below and with 4 mols of xylene, which acted as an entraining agent for water, in each case for 30 hours at 120° C.: (a) cyclohexanone, (b) methyl ethyl ketone, (c) diethyl ketone and (d) methyl isobutyl ketone.

Besides small amounts of hydrocyanic acid being split off, with the formation of cyanohydrins (about 0.5 percent by weight), in all cases no formation of polyketimine, associated with the splitting off of water, took place between the ketones and the amino groups of the azulmic acid. Small amounts of hydrocyanic acid were trapped as cyanohydrins. After the treatment had ended, in each case about 107 g of azulmic acid were isolated, which, according to elementary analysis, was of virtually unchanged composition. These azulmic acid products treated with ketones were not stabilized but, as before, small amounts of hydrocyanic acid were split off at room temperature and also at 50° C. Even boiling the azulmic acid with acetone for several hours with continuous removal of the acetone did not lead to polyketimines or to substituted cross-linked condensation products containing animal groups.

EXAMPLE 4

Comparison experiment: Treatment of azulmic acid according to Example 1 with various, very reactive reagents in the absence of water.

In each case, 100 g of the azulmic acid prepared by the method described in Example 1 were treated for six hours at temperatures between 135° C. and 150° C. with: (a) 2 mols of hexamethylene-diisocyanate, (b) 2 mols of toluylene-diisocyanate, consisting of 80% by weight of 2,4-toluylene-diisocyanate and 20% by weight of 2,6-toluylene-diisocyanate, (c) 6 mols of urea (employed as a urea melt and a supplier of isocyanic acid), (d) 6 mols of acetic anhydride in the presence of 3 g of sodium acetate as an acylation catalyst, (e) 3 mols of dimethyl sulfate, (f) 4 mols of ε-caprolactam, (g) 4 mols of ε-caprolactone, (h) 4 mols of phosgene in 500 ml of o-dichlorobenzene as a dispersing agent for azulmic acid, (i) 5 mols of glycol carbonate, (j) 0.4 mol of styrene and 0.1 mol of acrylonitrile in 700 g of xylene as a dispersing agent for azulmic acid, in the presence of azoisobutyric acid nitrile as a catalyst, the vinyl monomer mixture being added dropwise at 120° C. to the azulmic acid, dispersed in xylene, from a dropping funnel cooled to 12° C., and (k) 4 mols of Cl-CH$_2$-Si(-OC$_2$H$_5$)$_3$ in 600 g of xylene as a dispersing agent for azulmic acid.

After the reaction had ended, the solid product was in each case filtered off, washed carefully with water and dried. Elementary analyses of the isolated products showed that the values for C, H, N, O, Cl or S or Si differed only slightly from those in the azulmic acids employed. From these values, it was calculated that in almost all cases not more than 0.01 to 0.03 mol of the reactants could have reacted with the amino groups of the azulmic acids.

Only in the case of reaction (j) were 138 g of an azulmic acid copolymer mixture obtained in which, in addition to 100 g of azulmic acid, essentially 38 g of styrene/acrylonitrile copolymers were present. It was not possible to determine analytically any grafted proportion of azulmic acid present.

The azulmic acids "surface-treated" according to reactions (a) to (k) were not stabilized, but split off hydrocyanic acid on storage at room temperature.

EXAMPLE 5

A freshly prepared solution of 1 mol of dimethylolurea in 300 g of water was added to a mixture of 100 g of azulmic acid prepared according to Example 1, 600 g of water and 0.5 g of potassium carbonate in one step. The co-condensation reaction was carried out at 100° C. for two hours, while stirring. The mixture was then cooled, while stirring intensively, and 10 ml of 80% strength phosphoric acid was added. The condensation reaction was brought to completion at room temperature and the mixture was then worked up by filtering off the solid product and washing successively with water and 5% strength aqueous ammonia solution. After drying at 60° C. in vacuo, 180 g of a formaldehyde-free co-condensate which had a nitrogen content of 39.9% and phosphorous content of 1.5% were obtained.

The product had an extremely high resistance to heat. Not even traces of hydrogen cyanide were split off either at room temperature or at 50° C. It was also not possible to detect monomeric hydrocyanic acid in the mother liquor of the reaction solution.

EXAMPLE 6

The procedure followed was as indicated in Example 5, but 1 mol of monomethylolurea was used as the compound capable of aminoplast formation. After working up and drying, 168 g of a solid product with a nitrogen content of 37.8% and a phosphorous content of 2.1% were isolated. Value for the splitting off of hydrogen cyanide at 100° C.=virtually 0 ppm.

EXAMPLE 7

In each case, 100 g of the product prepared according to Example 5 or 6 were stirred at room temperature for two hours with an excess of (a) phosphoric acid or (b) nitric acid. The mixture was then worked up by filtering off and drying the solid product obtained in each case. In this manner, a phosphoric acid addition salt or nitric acid addition salt of the azulmic acid employed, which was stabilized with an aminoplast-forming agent, was obtained. In other words, a compound in which the particular acid was bonded to the polymeric matrix via the amino groups (=anchor groups) still free in the stabilized azulmic acids was obtained.

Specifically, the following compounds were obtained: (a) the adduct of 100 g of the product according to Example 5 and 0.12 mol of phosphoric acid, (b) the adduct of 100 g of the product according to Example 5 and 0.39 mol of nitric acid, (c) the adduct of 100 g of the product according to Example 6 and 0.12 mol of phosphoric acid and (d) the adduct of the product according to Example 6 and 0.39 mol of nitric acid.

EXAMPLE 8

In each case, 100 g of the azulmic acid prepared according to Example 1 were employed, in accordance with the method described in Example 5, with the following compounds capable of aminoplast formation: (a) 1 mol of monomethylolthiourea, (b) 0.5 mol of dimethylol-ethyleneurea or (c) 0.5 mol of trimethylolmelamine.

After working up and drying, (a) 179 g of solid product, (b) 163 g of solid product or (c) 184 g of solid product were obtained.

The resulting co-condensates (a), (b) and (c) were very resistant towards splitting off of hydrogen cyanide. No hydrocyanic acid was split off even when the co-condensates were heated to 140° C.

EXAMPLE 9

(a) 1,000 g of distilled water and 98 g (1 mol) of phosphoric acid were added to 108 g (2 base mols) of an azulmic acid prepared according to Example 2, after prior drying of the acid, at 80° C. in a closed stirred apparatus and the mixture was heated to 100° C. The reaction mixture was kept at this temperature for 16 hours. During this time, in which heterogeneous hydrolysis and partial decyclization took place in the azulmic acid, a stream of nitrogen, serving as a propellant gas, was passed through the reaction mixture at a rate of about 50 ml per minute. The stream of nitrogen issuing from the mixture was passed through a subsequent wash bottle which was charged with 200 ml of 1 N aqueous sodium hydroxide solution in order to bond the carbon dioxide contained in the stream of nitrogen. The amount of carbon dioxide evolved from the azulmic acid was determined titrimetrically at intervals of 1 to 3 hours. In parallel determinations, the proportion of ammonia bonded by phosphoric acid in the filtered mother liquors of the mixture was liberated by adding aqueous sodium hydroxide solution and determined titrimetrically. After a reaction time of 16 hours, the total amount of ammonia which was formed by hydrolytic production of $F_1$ structural defects of the formula

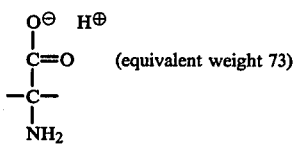

(equivalent weight 73)

was 6.4 g (ca. 0.38 mol). The total amount of carbon dioxide which was formed by decarboxylation of $F_1$ structural defects to give $F_2$ structural defects of the formula

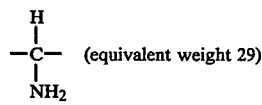

(equivalent weight 29)

was 4.3 g (ca. 0.1 mol) (determined titrimetrically by the barium carbonate method). A molar $NH_3/CO_2$ quotient of about 3.8 was calculated from these figures. This numerical value indicated that of about 4 carboxyl groups ($F_1$ structural defects) produced by decyclization and saponification of nitrile groups of the azulmic acid, about one was decarboxylated and thus led to an $F_2$ structural defect.

The mixture was worked up by a procedure in which the solid reaction product was filtered off, washed and dried. 109 g of a (modified) azulmic acid containing $F_1$ structural defects and $F_2$ structural defects were obtained.

On the basis of the fact that the $F_2$ structural defects had formed from the $F_1$ structural defects, the content of $F_1$ structural defects was calculated as follows: 0.38 mol–0.1 mol=0.28 mol. If this was related to an amount weighed out of 100 g, it could be calculated that 100 parts by weight of the product contained about 18.6 percent by weight of $F_1$ structural defects.

The number of mols of carbon dioxide found indicated that the amount weighed out contained 0.1 mol of $F_2$ structural defects. If this were related to an amount weighed out of 100 g, it was calculated that 100 parts by weight of the product contained about 2.67 percent by weight of $F_2$ structural defects.

The sum of $F_1$ structural defects and $F_2$ structural defects was 21.3 percent by weight.

As the elementary analysis showed, the modified azulmic acid contained about 9.8 percent by weight of phosphoric acid. This phosphoric acid was bonded to the polymer matrix via the free amino groups (anchor groups) of the modified azulmic acid.

(b) A freshly prepared solution of 1 mol of monomethylurea in 300 g of water was added in one operation to a mixture of 100 g of the modified azulmic acid prepared by the method described under (a), 400 g of water and 0.5 g of potassium carbonate, and the co-condensation reaction was carried out at 100° C. for two hours, while stirring. The mixture was then cooled, while stirring intensively, and 10 ml of 80% strength phosphoric acid were added. The condensation reaction was brought to completion at room temperature and the mixture was then worked up by filtering off the solid product and washing this successively with water and 5% strength aqueous ammonia solution. After drying at 60° C. in vacuo, 169 g of a co-condensate which had a nitrogen content of 38.4% and a phosphorous content of 2.5% were obtained.

The process product was extremely stable towards the splitting off of hydrogen cyanide under the influence of heat and under hydrolysis conditions. The value for the splitting off of hydrogen cyanide was virtually 0 ppm, even when it was measured under very unfavorable conditions (small volume of air).

EXAMPLE 10

(a) 4 liters of 20% strength aqueous hydrocyanic acid, 200 ml of approximately 25% strength aqueous ammonia solution and 40 g of sodium cyanate were stirred together. This reaction mixture was heated to 90° C. in the course of two hours. Thereafter, the mixture was stirred at 90° C. for a further 30 minutes, using a very effective reflux condenser and utilizing the hydrocyanic acid reflux. 500 ml of water and a small amount of hydrocyanic acid were then distilled off and 500 ml of water were again added. The mixture was then stirred at 100° C. for five hours. The black product thereby obtained, which could be easily filtered, was filtered off, washed successively with about 4 liters of water and with methanol and dried under reduced pressure. Yield: 845 g of azulmic acid containing $F_1$ structural defects and $F_2$ structural defects.

Content of structural defects: about 11 percent by weight.

Elementary analysis: 38.2% C; 4.9% H; 38.8% N; 18.9% O

As can be seen from these values, the product had a higher oxygen content and a lower nitrogen content than the azulmic acid prepared according to Example 1. This indicates that the product contained a large proportion of structural defects ($F_1$ and $F_2$).

(b) 100 g of the modified azulmic acid prepared by the method described under (a) were subjected to a condensation reaction with 1 mol of monomethylurea by the method indicated in Example 5. After working up and drying, 167 g of a solid product which was very stable towards splitting back into hydrocyanic acid were obtained.

In carrying out the reaction described under (b) and in carrying out analogous reactions (for example the reaction of in each case 100 g of azulmic acid containing structural defects with 0.4 mol of trimethylolmelamine or 0.4 mol of hexamethylolmelamine) it was established that the content of $F_1$ and $F_2$ structural defects in the azulmic acid increases in the course of the co-condensation reaction. The production of structural defects and stabilizing aminoplast co-condensation reactions can thus be carried out side by side. However, it is also possible to carry out the production of structural defects before the stabilizing or after the co-condensation reaction.

EXAMPLE 11

(a) A mixture of 200 g of an azulmic acid with a relatively low content of structural defects (composition: 40.6% C; 4.1% H; 42.4%; 12.8% O) and 800 g of a 25% strength aqueous ammonia solution was stirred at 25°–31° C. for eight hours. The black powder was then filtered off, washed with 5 liters of water and dried at room temperature in a vacuum drying cabinet. Yield: 215 g of a modified azulmic acid which contained about 6–7 percent by weight of ammonia bonded to $F_1$ structural defects. Modified $F_1$ structural defects of this type can be illustrated, by means of their formula, as follows:

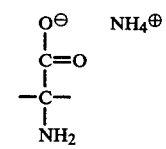

Elementary analysis: 37.6% C; 4.8% H; 38.5% N; 19.4% O

If the product was not dried at room temperature but at higher temperatures, ammonia was readily split off.

(b) 100 g of the ammonia-containing modified azulmic acid prepared according to 11(a) were subjected to a co-condensation reaction with 1 mol of monomethylolurea by the method indicated in Example 5. Any traces of formaldehyde still present in the product obtained were bonded as soluble hexamethylenetetramine by treating the product with 25% strength aqueous ammonia solution. At the same time, a further 1–3% by weight of $F_1$ structural defects of the formula

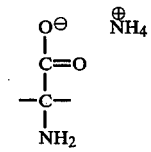

were introduced by this measure.

After working up and careful drying, a solid product which did not tend to split off hydrogen cyanide at temperatures of up to 60° C. was obtained.

A stream of nitrogen was passed over some of this process product at 50° C. for four hours at a flow rate of 100 ml of nitrogen per minute. No hydrogen cyanide could be detected analytically in the gas collected (hydrogen cyanide concentration=0 ppm).

Ammonia was readily split off from the process product both under hydrolysis conditions and under the influence of heat. Thus, at 50° C., a proportion of ammonia of 1.43 percent by weight was already liberated in the course of one hour.

If the product, which smelled slightly of ammonia, was gassed in the moist state with carbon dioxide, a virtually odorless powder was obtained. Residual traces of ammonia were converted into ammonium carbonate by this procedure.

EXAMPLE 12

(a) A mixture of 108 g of a modified azulmic acid freshly prepared according to German Patent No. 949,600 and 1,000 ml of a 1 N aqueous potassium hydroxide solution were warmed to 100° C. for 44 hours. The azulmic acid employed was thereby completely dissolved a few minutes after the start of the reaction.

The progress of the saponification reaction was monitored by measuring the amounts of ammonia and carbon dioxide evolved. The amount of ammonia liberated was 12.2 g after 8 hours, 15 g after 22 hours and 17 g (=1 mol) after 44 hours.

In a parallel experiment carried out under exactly the same conditions, it was found that by acidifying the reaction mixture with 2 mols of aqueous hydrochloric acid, about 21.9 g (=0.5 mol) of carbon dioxide were bonded in the solution as potassium carbonate.

The mixture was worked up by a procedure in which the brown-black aqueous reaction solution was concentrated under 14 mm Hg. Methanol was added three times, in an amount of 1 liter each time, to the brown-black dispersion thereby formed and each time the mixture was concentrated by distilling off the methanol and the water still present. The crystals which remained were then boiled up briefly once again with 800 ml of methanol and filtered off. 113 g of a water-soluble product with a humus-like color were obtained.

Elementary analysis: 31.5% C; 3.9% H; 26.8% N; 21.0% O; 16.1% K

The amounts measured of ammonia and carbon dioxide liberated gave a molar $NH_3/CO_2$ quotient of 2.

The difference between the numbers of mols of ammonia and carbon dioxide determined was about 0.5. This factor indicated that about half of all the $F_1$ structural defects had been converted into $F_2$ structural defects.

On the basis of these figures, it was calculated that 100 parts by weight of the process product contained about 55 percent by weight of potassium salt $F_1$ structural defects of the formula

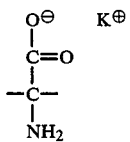

and about 14.5 percent by weight of $F_2$ structural defects. In this method for producing structural defects, in each case one potassium salt $F_1$ structural defect of the above formula was accordingly formed per 2 cyclic units of the azulmic acid. In the ideal case, a product of this type can be illustrated by the formula which follows:

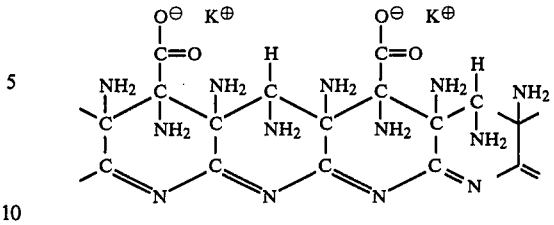

(b) 100 g of the azulmic acid potassium salt prepared according to 12(a) were subjected to a co-condensation reaction with 1.4 mols of monomethylolurea by the method indicated in Example 5. The product was not subsequently isolated by filtration, but was put into a metal dish and freed from the water it contained at 60° C. in a vacuum drying cabinet. In this manner, 200 g of a friable co-condensate were obtained, which was treated with ammonia gas to remove traces of formaldehyde.

According to elementary analysis, the product contained 29.4% of nitrogen and 7.9% of potassium.

(c) In an analogous manner, co-condensates were prepared from in each case 100 g of azulmic acid salts prepared according to 12(a) by reaction with monomethylolurea. Azulmic acid lithium salt co-condensate: Yield: 195 g. Azulmic acid sodium salt co-condensate: Yield: 198 g.

The products thus prepared had polyelectrolyte character. In particular, the azulmic acid potassium salt co-condensate was suitable as a fertilizer, and in particular for supplying plants with nitrogen and potassium.

EXAMPLE 13

Solutions were first freshly prepared, by mixing in each case 1 mol of urea in 200 ml of water with in each case 1 mol of one of the aldehydes listed below, at a pH value of 6.2 to 6.5 and at a temperature of 40° C.: (a) glyoxal, (b) acetaldehyde, (c) propionaldehyde, (d) isobutyraldehyde, (e) hydroxypivalaldehyde, (f) acrolein, (g) salicylaldehyde, (h) furfurol and (i) $\omega$-hydroxymethylfurfurol.

The solutions thereby formed, in which low-molecular oligocondensates which contained a large number of N-alkylol groups or which were free from N-alkylol groups were present, were then reacted, by the method indicated in Example 5, with in each case 100 g of azulmic acid prepared according to Example 1, but the condensation reaction was carried out at 45° C. and not at 100° C. After working up and drying, products which were stable towards splitting back into hydrocyanic acid were obtained. Specifically, the following amounts of products were isolated: (a) 173 g, (b) 143 g, (c) 148 g, (d) 151 g, (e) 177 g, (f) 174 g, (g) 183 g, (h) 192 g and (i) 205 g. When the products were stored at temperatures between 20° C. and 40° C. over a relatively long period, it was established that the process products listed under (a) to (i) were completely stable towards splitting off of hydrocyanic acid. Value for the splitting off of hydrocyanic acid: 0 ppm.

EXAMPLE 14

N-polymethylol compounds were first prepared from a co-condensate of 2 mols of urea and 1 mol of crotonaldehyde (=white powder) [which was very sparingly soluble in neutral water and had been prepared in water with catalytic amounts of phosphoric acid and had predominantly the structure

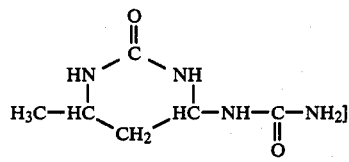

and formaldehyde by heating 0.5 mol of the above compound to 50°-60° C. in 250 g of 30% strength formalin solution in the presence of 0.5 g of potassium carbonate for 30 minutes. The substance thereby dissolved with the formation of trimethylol and tetramethylol compounds which were in equilibrium with free formaldehyde. A condensation reaction was then carried out, by the method indicated in Example 5, with 100 g of azulmic acid prepared according to Example 1. After working up and drying, 190 g of a co-condensate which was completely stable towards splitting back into hydrocyanic acid at temperatures of up to 100° C. were obtained.

According to elementary analysis, the product contained 34.8% of nitrogen and 1.4% of phosphorous.

EXAMPLE 15

(a) 2.7 liters of a 19.2% strength by weight aqueous hydrocyanic acid solution were first stirred with 500 g of a substance of the formula

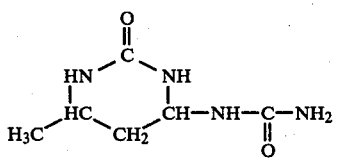

prepared from 2 mols of urea and 1 mol of crotonaldehyde by a condensation reaction, to form a dispersion. 135 g of a 24% strength aqueous ammonia solution which contained 27 g of sodium cyanate in the dissolved form were then added, while stirring intensively. The dispersion formed was warmed slowly to 90° C. in the course of 3 hours, polymerization starting rapidly at 40°-50° C. with evolution of heat. After stirring the mixture at 90° C. for a further three hours, the very fine-particled dispersion, which appeared thixotropic, was filtered off cold and the solid was washed with one liter of cold water and dried at 40° C. in a vacuum drying cabinet for 30 hours.

1,093 g of a solid product with a nitrogen content of 36.7% and a water content of 10.2% by weight were isolated.

The product contained about 484 g of azulmic acid and about 500 g of the above-mentioned condensation product of 2 mols of urea and 1 mol of crotonaldehyde. The azulmic acid present in the process product contained about 3.5% by weight of $F_1$ structural defects having the structure

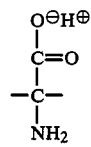

and about 0.55% by weight of $F_2$ structural defects having the structure

The mixture contained about 49% by weight of azulmic acids, relative to the dry substance. In this reaction, the monomeric hydrocyanic acid had been polymerized in a yield of 93% in the presence of the carrier substance completely without interference.

(b) In each case, 100 g of the product prepared according to 15(a), which contained about 10% by weight of water and, per 100 g of dry substance, about 0.295 mol of the urea/crotonaldehyde condensation product of the formula

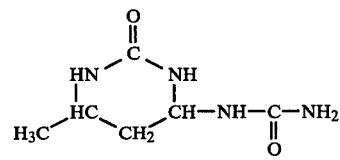

were subjected to a condensation reaction at pH=8.5 in the presence of 0.3 g of potassium carbonate and 600 g of water at 25°-30° C. for 4 hours with: (a) 0.295 mol of formaldehyde (=29.5 g of 30% strength formalin solution), (b) 0.590 mol of formaldehyde (=59.0 g of 30% strength formalin solution), (c) 0.885 mol of formaldehyde (=88.5 g of 30% strength formalin solution) and (d) 1.18 mols of formaldehyde (=118 g of 30% strength formalin solution).

When the reaction had ended, the solid product was in each case filtered off, washed successively with water and dilute aqueous ammonia and dried. In each case, a formaldehyde-free co-condensate which was stable towards splitting back into hydrocyanic acid was obtained.

At temperatures of up to 80° C., no monomeric hydrocyanic acid was split off from the product which was obtained in reaction (a). Less hydrocyanic acid was split off from the product which was obtained in reaction (d) than from polyacrylonitrile powder, even at a temperature of 180° C.

(c) Hydrocyanic acid was polymerized by the method indicated under 15(a), in each case in the presence of one of the following substances or substance mixtures: polymethyleneurea, urea/isobutyraldehyde (1:1 condensate), urea/isobutyraldehyde (1:1 condensate in a 1:1 mixture with ground basic slag), urea/isobutyraldehyde (1:1 condensate in a 1:1 mixture with humic substances), urea/isobutyraldehyde (1:1 condensate in a 1:1 mixture with ammonified lignin), superphosphate, phosphorite, double superphosphate, basic slag, Rhenania phosphate or ammonia magnesium phosphate.

The products formed were then subjected to a condensation reaction according to 15(b) with in each case 1 mol of methylolurea at a pH value of 6 and at a temperature of 100° C.

Products which were suitable as fertilizers with a long-term action were obtained.

EXAMPLE 16

In each case, 100 g of an azulmic acid with a content of $F_1$ structural defects

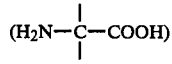

of about 3% by weight and a content of $F_2$ structural defects

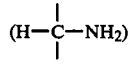

of about 0.5% by weight were dispersed in 500 g of water, while stirring intensively. The solution was heated to 100° C. and in each case one of the following freshly prepared solutions was added: (a) 1 mol of urea, 100 g of water and 100 g of 30% strength formalin solution (1 mol of formaldehyde), (b) 1 mol of dicyandiamide and 300 g of 30% strength formalin solution (3 mols of formaldehyde), (c) 1 mol of urea, 1 mol of isobutyraldehyde and 200 g of water, (d) 1 mol of urea, 1 mol of crotonaldehyde and 200 g of water, (e) 1 mol of melamine, 300 g of 30% strength formalin solution (3 mols of formaldehyde), 200 g of water and 0.4 g of potassium carbonate (a hot (95° C.) solution of trimethylolmelamine was formed), (f) 1 mol of dicyandiamide and 400 g of 30% strength formalin solution (4 mols of formaldehyde) and (g) 1 mol of $\epsilon$-caprolactam and 400 g of 30% strength formalin solution (4 mols of formaldehyde).

The condensation reaction was carried out at 100° C. while continuously monitoring the pH value. The pH value was kept between 8 and 9 by adding aqueous potassium hydroxide solution. The co-condensation reaction was then continued at 50°-70° C., water being removed by distillation, until the co-condensates had a sludge-like consistency. The concentrated dispersions thereby obtained were put into metal dishes and were dried in vacuo at 60° C. to give products which crumbled readily and the products were freed from residual formaldehyde by gassing with ammonia.

In each case, process products which exhibited no tendency to split off hydrogen cyanide at temperatures of up to 150° C. were obtained.

In the above reactions of azulmic acid in an alkaline medium, not only did a co-condensation reaction take place, but at the same time the content of structural defects in the azulmic acid was also increased.

By the method indicated above, structural defects could be produced in the azulmic acid and condensation reactions of the azulmic acid containing structural defects with urea and acetaldehyde or hydroxyacetaldehyde, hydroxypivalaldehyde, glyoxal, hydroxymethylfurfurol, furfurol or acrolein, if appropriate in the presence of formaldehyde, could simultaneously be carried out, in an alkaline medium, aldol condensation reactions proceeding with the above-mentioned aldehydes and formaldehydes so that hydroxyaldehydes were included in the co-condensation reaction.

When 100 g of gelatine were additionally employed as proteins in co-condensation reactions of this type, oligopeptides and aminoacids which could participate in the co-condensation reaction via their amino bonds and peptide bonds were formed by degradation of the protein parallel with the co-condensation reaction and production of structural defects.

When a co-condensation reaction of this type was carried out in the acid range in the presence of naturally occurring substances, such as cellulose powder, or proteins, such as gelatine, it being sufficient to add, for example, 100 g of azulmic acid, 100 g of cellulose powder and 100 g of gelatine in 1,000 g of water, and 100 g of 85% strength phosphoric acid for the hydrolysis, per 100 g of methylolurea, azulmic acid co-condensates were obtained which contained oligosaccharides or oligopeptides and aminoacids which, together with the azulmic acid co-condensates, bonded 0.2 to 0.4 mol of phosphoric acid.

EXAMPLE 17

100 g of azulmic acid, stabilized with monomethylolurea according to Example 6, were stirred with 0.5 mol of cadmium(II) chloride and 600 ml of distilled water at room temperature for 6 hours. Thereafter, the solid product was filtered off, washed thoroughly with water and dried at 100° C. A black, finely powdered product with a cadmium content of 8.1 percent by weight was isolated. The product was azulmic acid, stabilized with monomethylolurea, which contained cadmium(II) chloride bonded as a complex. The azulmic acid complex salt was completely stable towards the splitting off of hydrogen cyanide.

The complex salts listed in Table 1 below were also obtained by the method described in Example 17, by reacting in each case 100 g of azulmic acid, stabilized with monomethylolurea according to Example 6, with in each case 0.5 mol of chloride or nitrate of the corresponding metal.

TABLE 1

| Example No. | Metal salt | Metal content of the azulmic acid complex |
| --- | --- | --- |
| 18 | $CoCl_2$ | 3.4% by weight |
| 19 | $MnCl_2$ | 2.1% by weight |
| 20 | $SnCl_2$ | 14.3% by weight |
| 21 | $Pb(NO_3)_2$ | 14.5% by weight |
| 22 | $Cu(NO_3)_2$ | 6.4% by weight |
| 23 | $Hg(NO_3)_2$ | 14.3% by weight |
| 24 | $ZnCl_2$ | 6.3% by weight |
| 25 | $FeCl_2$ | 3.4% by weight |
| 26 | $Bi(NO_3)_3$ | 14.5% by weight |
| 27 | $AgNO_3$ | 12.3% by weight |

EXAMPLE 28

100 g of an azulmic acid-copper nitrate complex with a copper content of 35.6% by weight were subjected to a condensation reaction with 1.38 mols of monomethylolurea by the method indicated in Example 5. After working up and drying, 198 g of a solid product which was stable towards the splitting off of hydrogen cyanide and had a copper content of 17% by weight were isolated.

The mother liquor contained virtually no metal salt.

EXAMPLE 29

The following mixtures were reacted by the method indicated in Example 28: (a) 100 g of an azulmic acid tin(II) chloride complex with a tin content of 40.8% by weight and 1.38 mols of monomethylolurea and (b) 100 g of an azulmic acid-zinc(II) chloride complex with a zinc content of 20.6% by weight and 1.38 mols of monomethylolurea.

After working up and drying the following products were isolated: (a) 200 g of a solid product with a tin content of 19.9% by weight and (b) 197 g of a solid product with a zinc content of 9.8% by weight.

The mother liquors contained virtually no metal salt.

The azulmic acid metal salt complexes required as starting materials were prepared by stirring azulmic acid with the particular metal salt in an aqueous medium at room temperature.

EXAMPLE 30

(a) 350 g of approximately 25 percent strength aqueous ammonia solution (=87.5 g (about 5.15 mols) of ammonia) which contained 70 g (1.1 mols) of sodium cyanate were added to 7 liters of 20% strength aqueous hydrocyanic acid (=1,400 g (52 mols) of hydrogen cyanide), while stirring intensively. This mixture was warmed to 40° C. Thereafter, the temperature rose to 70° C. because of the heat of polymerization liberated. The mixture was heated to 90° C. for a further four hours and was then worked up by filtering off the brown-black polymer obtained, which did not form colloidal solutions in water, washing the product successively with water and ethanol and then drying it at 50°–80° C. under reduced pressure.

Yield: 94% theory

Elementary analysis: 40.6% C; 4.1% H; 42.4% N; 12.8% O (b) In each case, 1 mol of the metal salts mentioned below and a solution of 1.3 mols of monomethylolurea in 200 ml of water were added to in each case 100 g of the azulmic acid, prepared according to 30(a), in 600 ml of water and the mixture was subjected to a co-condensation reaction at 90° C. in the presence of 200 ml of 85% strength phosphoric acid for 10 hours: (a) FeSO$_4$, (b) CuSO$_4$, (c) ZnCl$_2$, (d) NiCl$_2$, (e) CoCl$_2$, (f) MnSO$_4$ and (g) Pb(OCOCH$_3$)$_2$.

Thereafter, the mixture was worked up by filtering off the solid product obtained in each case and washing it with water and drying it at 80° C. under a pressure of 14 mm Hg.

The isolated products had the following content of metal and nitrogen: (a) 5.5% by weight of Fe, 35.7% by weight of N; (b) 11.3% by weight of Cu, 30.1% by weight of N; (c) 16.8% by weight of Zn, 28.5% by weight of N; (d) 14.3% by weight of Ni, 29.1% by weight of N; (e) 8.9% by weight of Co, 32.6% by weight of N; (f) 7.9% by weight of Mn, 30.8% by weight of N and (g) 26.4% by weight of Pb, 28.5% by weight of N.

When stored in containers containing a large amount of air for a long period, all the products proved stable towards the splitting off of hydrogen cyanide (value of the splitting off of hydrogen cyanide: 0 ppm).

Analytically, it was established that the product formed in the case of reaction (a) had a content of F$_1$ structural defects of 18.22% by weight and a content of F$_2$ structural defects of 2–2.5% by weight. The product obtainable by reaction (b) had 19.6% by weight of F$_1$ structural defects and 2–2.5% by weight of F$_2$ structural defects. The product obtainable by reaction (c) had 21% by weight of F$_1$ structural defects and 2–2.5% by weight of F$_2$ structural defects.

The production of structural defects, complexing and co-condensation reaction had thus proceeded simultaneously in the above reactions.

It was not absolutely necessary for the azulmic acid prepared before hand to be employed in the dry state in the reaction described under (b). Rather, it was possible to use this azulmic acid in the moist form. Furthermore, this azulmic acid could also be reacted further in the same reaction vessel, without prior isolation, after first removing unreacted hydrocyanic acid and ammonia by distillation.

EXAMPLE 31

In each case, 100 g of the azulmic acid prepared according to Example 30 (a) were dispersed in 200 ml of dimethylformamide and subjected to a co-condensation reaction with (a) 1 mol of bismethoxymethyl-urea of the formula

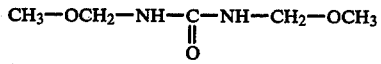

(50% strength solution in dimethylformamide), (b) 1 mol of bismethoxymethyl-ethyleneurea of the formula

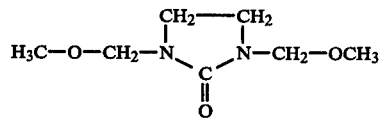

(50% strength solution in dimethylformamide) and (c) 0.5 mol of hexamethylolmelamine ether (50% strength solution in dimethylformamide). For this co-condensation reaction, the particular dispersion was heated to 100° C., 100 ml of water were added as a carrier and swelling agent to the intensively stirred mixture and 15 ml of 85% strength phosphoric acid were added dropwise in the course of half an hour. Dimethylformamide and methanol formed by the condensation reaction were then distilled off at about 156° C. under normal pressure. As soon as the reaction mixtures had assumed a sludge-like consistency, they were concentrated to dryness in vacuo. The products which thereby remained were freed from traces of dimethylformamide still present by washing with water. Co-condensates were obtained in the following yields: (a) 189 g, (b) 205 g and (c) 210 g.

When stored in closed vessels for a long period, the products proved to be stable towards the splitting off of hydrocyanic acid (value for the splitting off of hydrogen cyanide: 0 ppm).

EXAMPLE 32

1 mol of urea was dissolved in a dispersion of 100 g of the azulmic acid prepared according to Example 30(a) and 0.5 mol of sucrose in 500 g of water. After adding 15 g of a mixture of 7 g of 85% strength aqueous phosphoric acid and 8 g of concentrated sulfuric acid, the mixture was then stirred at 100° C. for 20 minutes, whereupon degradation products of sugar were formed, which underwent co-condensation reactions with the urea and the azulmic acid so that products of a humus-like character were formed. For working up, the reaction mixture was concentrated until it had a sludge-like consistency, the product was poured onto a metal sheet and 185 g of a friable, brown-black co-condensate with a caramel-like odor were obtained. The product exhibited no tendency to split off hydrogen cyanide at 40° C.

EXAMPLE 33

(a) Preparation of a catalyst for the formose sugar mixture synthesis:

A solution of 222 g (2 mols) of calcium chloride in 300 ml of water was added to a dispersion of 200 g of the co-condensate, prepared according to Example 6, of azulmic acid and monomethylolurea in 900 g of water, while stirring intensively. 2 mols of calcium hydroxide, which was absorbed onto the azulmic acid/aminoplast co-condensate in a particularly finely divided form, was then produced by adding 160 g of sodium hydroxide in 200 g of water in the course of one hour, while stirring intensively. The dispersion formed was filtered off and the solid was freed from sodium chloride still contained therein by washing with water.

Yield: 430 g (according to a dry weight determination on a parallel sample)

(b) Formose sugar mixture synthesis:

The entire product prepared according to Example 33(a) was suspended in 700 ml of water under nitrogen in a carbon dioxide-free atmosphere to give a sludge which could still be stirred, the mixture was heated to 78° C. and 1,200 g of a 30% strength formalin solution were rapidly and continuously added dropwise in the course of four hours. A significant exothermic reaction started after 100 g of the formalin solution had been added. Care was taken, by cooling, that the temperature of the reaction mixture did not exceed 80° C. The mixture was then heated to 85° C. for a further two hours and unreacted formaldehyde was removed by distillation under normal pressure. By titration of filtered batches it was established that about 93% of the available formaldehyde had been converted into a formose sugar mixture in the reaction. For working up, the reaction mixture was concentrated until it had a sludge-like consistency and the product was then poured onto a metal sheet and dried in a vacuum drying cabinet. A composition which could crumble easily and had a caramel-like odor was obtained. In the isolated mixture, the calcium hydroxide was largely complexed with the sugar mixture formed.

Yield: 902 g, residual moisture content: about 10% by weight.

EXAMPLE 34

In each case, 100 g of the co-condensate, prepared according to Example 6, of azulmic acid and monomethylolurea were dispersed in 400 g of water, and (a) 1 mol of phosphoric acid in 500 g of water or (b) 1 mol of nitric acid in 500 g of water were added, by dropwise addition of the acid, in the course of half an hour, while stirring intensively. The mixture was subsequently stirred at room temperature for four hours and the solid product was filtered off, rinsed with water and dried under gentle conditions at 40° C. in vacuo. The content of acid bonded in the process products was determined by titration of the mother liquors and by elementary analysis. (a) 0.11 mol of phosphoric acid were bonded to the basic groups of the co-condensate. (b) 0.48 mol of nitric acid were bonded to the basic groups of the co-condensate.

Since in the preparation of such co-condensates containing nitrate ions a proportion of the nitrate ions fixed dissociate off on washing out the products with a large amount of water in order to remove traces of nitric acid, it was appropriate to wash out small proportions of the nitric acid which was not bonded ionically only with a little water and then to gas the moist powders with gaseous ammonia in order to convert into ammonium nitrate the traces of nitric acid which had not been washed out.

EXAMPLE 35

900 g of water and 155 g of 30% strength formalin solution were added, at room temperature, to 216 g of an azulmic acid, which contained about 19 g of amino groups per 100 g of azulmic acid, while stirring intensively. A black dispersion was formed. As could be determined from a filtered sample, the formaldehyde concentration of the total mixture was 4.4% by weight at the start. The decrease in formaldehyde, which was followed continuously by filtration, indicated the partial reaction of the amino groups in the insoluble azulmic acid, which proceeded rapidly. The formaldehyde value of a filtered sample had fallen from 4.4% by weight to 2.69% by weight after 0.5 hour. The thoroughly stirred dispersion was heated to 98°–100° C., and a further decrease in the formaldehyde value in the dispersed mixture down to 1.9% by weight was found after 45 minutes. The formaldehyde concentration fell to a value of 0.68% by weight in the course of a further three hours. Calculation showed that about 1.26 mols of formaldehyde had undergone condensation reactions with amino groups of the azulmic acid during the partial condensation of the azulmic acid used. The total formaldehyde consumption was 37.8 g, which meant that of about 41 g of amino groups in 216 g of the azulmic acid employed (=2.5 amino group equivalents) about 1.26 equivalents (ca. 20.1 g) had reacted with formaldehyde. A further 1.24 amino group equivalents (ca. 19.8 g) were thus available in the partially stabilized azulmic acid for the co-condensation reaction with aminoplast monomers.

In each case, 210 g of this azulmic acid prestabilized with formaldehyde and still containing about 1.24 amino group equivalents were reacted with the substances or mixtures mentioned below, at room temperature in the presence of 8–10 g of 85% strength aqueous phosphoric acid for four hours, while stirring intensively: (a) 1.24 mols of monomethylolurea, (b) 0.31 mol of tetramethylolhydrazodicarboxamide, (c) 0.31 mol of tetramethylolacetylenediurein of the formula

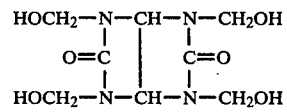

(d) 1.24 mols of urea and 1.24 mols of isobutyraldehyde,
(e) 1.24 mols of urea and 1.24 mols of crotonaldehyde or
(f) 1.24 mols of diaminomaleic acid dinitrile having the structure

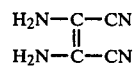

and 2.4 mols of formaldehyde.

Co-condensates which could be easily filtered and were largely stable towards splitting back into hydrocyanic acid at temperatures of up to 160° C. were obtained. In the case of products (a) to (d), a value for the splitting off of hydrocyanic acid of 0 ppm was measured at temperatures of up to 160° C.

The product which was obtained in reaction (d) tended to split off only isobutyraldehyde, while crotonaldehyde was split off from the product obtained in reaction (e).

Yields after washing the co-condensates and after drying the products at 60° C. in vacuo: (a) 301 g, (b) 282 g, (c) 270 g, (d) 275 g, (e) 280 g and (f) 305 g.

EXAMPLE 36

216 g of an azulmic acid which contained about 19 g of amino groups per 100 g of azulmic acid were treated with 77 g of a 30% strength formalin solution (0.77 mol of formaldehyde) at 100° C. for two hours, while stirring intensively, by the method described in Example 35. Following the reaction titrimetrically showed that at this point in time about 0.54 mol of formaldehyde had reacted with the azulmic acid. As was furthermore determined analytically, about 6.3% by weight of $F_1$ structural defects and 0.58% by weight of $F_2$ structural defects had been introduced at the same time as the primary pre-stabilization of the azulmic acid.

The reaction mixture was then cooled to 40° C. The pH value was adjusted to about 3 by adding 18 g of 85% strength aqueous phosphoric acid. 60 g of urea were dissolved in the intensively stirred dispersion. 72 g (1 mol) of isobutyraldehyde were added in one operation and the condensation reaction was carried out at 35° to 40° C. for six hours. For working up, the solid product was filtered off, washed and dried. 298 g of a product were obtained in which, according to analytical determination, about 27.5% by weight of units of the formula

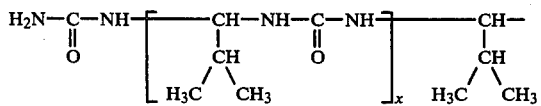

wherein

X is unknown, were fused onto the azulmic acid.

The product contained 37.5% of nitrogen and 2.9% of phosphorous.

The proportions of alkylolated, soluble isobutyraldehyde oligocondensates of urea which remained in the mother liquors could be used again for the stabilizing co-condensation reaction with further azulmic acids.

EXAMPLE 37

216 g of an azulmic acid which contained about 19 g of amino groups per 100 g of azulmic acid were treated with 200 g of 30% strength formalin solution (=2 mols of formaldehyde) at 100° C. for three hours, while stirring intensively, by the method described in Example 35. Following the formaldehyde concentration titrimetrically showed that about 1.5 mols of formaldehyde had thereby been consumed by condensation reactions. The thoroughly stirred dispersion was cooled to room temperature and divided into two halves, which were utilized for the following reactions:

(a) 240 g (4 mols) of urea and 140 g (2 mols) of crotonaldehyde were dissolved in one-half of the dispersion, the mixture was stirred at 50° C. for 1.5 hours, 32 ml of 85% strength aqueous phosphoric acid were added in one operation, the condensation reaction was carried out at temperatures between 45° and 50° C. for four hours and the product was filtered off hot. After washing and drying, 380 g of an azulmic acid co-condensate in which about 43% by weight of crotonaldehyde/urea condensates were bonded were obtained.

Elementary analysis: 44.1% C; 5.3% H; 28.5% N; 18.8% O; 3.6% P (b) 120 g (2 mols) of urea and 2 mols of isobutyraldehyde were dissolved in the other half of the dispersion, the mixture was stirred at 50° C. for 1.5 hours, 32 ml of 85% strength aqueous phosphoric acid were added in one operation. The condensation reaction was carried out at temperatures between 45° and 50° C. for four hours and the product was filtered off hot. After washing and drying at 40° C. in vacuo, 381 g of an azulmic acid co-condensate in which about 46.5% by weight of isobutyraldehyde/urea condensates were bonded were obtained.

Elementary analysis: 38.5% C; 5.5% H; 31.7% N; 19.7% O; 2.6% P

EXAMPLE 38

108 g of an azulmic acid which had a relatively low content of structural defects, 800 g of water and 280 g of hexamethylenetetramine were stirred at 100° C. for 18 hours. About 11.5 g of ammonia and about 2 g of carbon dioxide were thereby split off. The mixture was allowed to cool, the brown-black dispersion was filtered and the solid was rinsed several times with water and dried at 40° C. in vacuo. 160 g of a co-condensate with a nitrogen content of 39.9% were obtained.

EXAMPLE 39

In each case, a freshly prepared solution of 1 mol of monomethylolurea in 200 g of water was added to a mixture of 100 g of the azulmic acid prepared according to Example 1, 700 g of water and 0.5 g of potassium carbonate in one operation and a co-condensation reaction was carried out at 100° C. for two hours, while stirring, in the presence of: (a) 1,693 g of a linear propylene glycol polyether which had terminal, largely secondary hydroxyl groups, an average weight of 2,000 and a hydroxyl group content of 1.7%, OH number 56, (b) 1,693 g of a trifunctional polyether of trimethylolpropane, propylene oxide and ethylene oxide, the propylene oxide/ethylene oxide ratio being 87:13 and the polyether, with primary hydroxyl groups, having an OH number of 35, (c) 1.693 g of a trifunctional polyether of trimethylolpropane, propylene oxide and ethylene oxide, the propylene oxide/ethylene oxide ratio being about 87:13 and the polyether having primary hydroxyl groups and an OH number of 28, (d) 1,693 g of a polyether of trimethylolpropane and propylene oxide, with an OH number of 375, (e) 1,693 g of a polyether of trimethylolpropane and propylene oxide, with an OH number of 550, (f) 1,693 g of a polyether of trimethylolpropane and propylene oxide, with an OH number of 650, (g) 1,693 g of a polyether of sucrose, trimethylolpropane (8:2) and propylene oxide, with an OH number of 370, (h) 1,693 g of a polyether of trimethylolpropane and propylene oxide, with an OH number of 902, (i) 1,000 g of glycerol, (j) 880 g of oleyl alcohol or (k) 1,000 g of castor oil.

The mixture was then in each case cooled, while stirring intensively, and 10 ml of 80% strength phosphoric acid were added. The condensation reaction was in each case brought to completion at room temperature and the mixture was then worked up by removing the water contained therein by distillation. In each case, dispersions or coating pastes, which were usually redispersible and were completely stable towards splitting back into hydrocyanic acid, of azulmic acid co-condensates in polyhydroxy compounds were obtained. The dispersions or coating pastes obtained could be converted into optionally cellular plastics with any desired polyisocyanates.

EXAMPLE 40

100 g of the azulmic acid prepared according to Example 10(a) and 1 mol of benzoquinone were mixed with 500 g of a trifunctional polyether of trimethylolpropane, propylene oxide and ethylene oxide, the propylene oxide/ethylene oxide ratio being 87:13 and the polyether having primary hydroxyl groups and an OH number of 35, and the mixture was gassed with a stream of ammonia at 80° C. The formation of graphitelike dispersions thereby started immediately, while the unreacted p-benzoquinone was dissolved in the polyether. After one hour, the p-benzoquinone had reacted virtually quantitatively to form polycondensates. Small amounts of water were removed under a waterpump vacuum in the course of half an hour and black, redispersible dispersions of co-condensates were obtained, which could be converted into very flame-resistant, cellular plastics with any desired polyisocyanates.

EXAMPLE 41

100 g of the azulmic acid/monomethylolurea co-condensate prepared according to Example 6 were dispersed in 600 g of water and 150 g of calcium chloride and an excess of aqueous sodium hydroxide solution were added successively. 100 g of calcium hydroxide were thereby formed, and precipitated on the azulmic acid/monomethylolurea condensate. The corresponding sparingly soluble phosphate was then produced on the azulmic acid/monomethylolurea condensate by adding an equivalent amount of phosphoric acid.

In an analogous manner, those azulmic acid/monomethylolurea condensates on which barium hydroxide, magnesium hydroxide, lead hydroxides, iron (III) hydroxides or aluminum hydroxides had first been precipitated and on which the corresponding sparingly soluble phosphates then had been produced by adding phosphoric acid, were prepared.

Those products in which, in particular, ammonium magnesium phosphates were contained on the matrix could be used as reactive combination fillers with flameproofing properties for polyurethane foams.

EXAMPLE 42

In each case, 100 g of the azulmic acid/monomethylolurea condensate prepared according to Example 6 were heated to 150° C., in a highly dried state (12 mm Hg, 100° C.) (a) in 4 mols of hexamethylene-diisocyanate, (b) in 6 mols of acetic anhydride, using 0.4 g of sodium acetate as a catalyst, (c) in 4 mols of dimethyl sulfate, (d) in 6 mols of a urea melt (agent which supplies isocyanic acid, 138° C.), (e) in 5 mols of an ε-caprolactam melt, (f) in 5 mols of γ-caprolactone, (g) in 5 mols of a glycol carbonate melt, (h) in 3 mols of $Cl-CH_2-Si(OC_2H_5)_3$, dissolved in 400 g of o-dichlorobenzene, (i) with 4 mols of phosgene in 400 g of o-dichlorobenzene, (j) with 100 g of styrene, dissolved in 400 g of o-dichlorobenzene and 2 g of the free radical-forming agent azoisobutyric acid dinitrile, (k) with 100 g of methacrylic acid methyl ester, dissolved in 400 g of o-dichlorobenzene and 2 g of azoisobutyric acid dinitrile, (1) with 100 g of vinyl acetate, dissolved in 400 g of dichlorobenzene and 2 g of azoisobutyric acid dinitrile, and (m) 50 g of styrene and 50 g of methacrylic acid β-hydroxypropyl ester, dissolved in 400 ml of dichlorobenzene and 2 g of azoisobutyric acid dinitrile. The mixture was kept at this temperature for six hours.

For working up, the solid product was in each case filtered off, extracted twice with boiling ethanol and dried.

Only minimal increases in weight were recorded in the case of the products obtained in reactions (a) to (i). From this it could be concluded that not more than about 0.1 to 0.03 equivalent of amino groups or NH groups in the co-condensates employed had reacted with the acylating or alkylating reagents, in the form of modification of the surface of the co-condensates.

Only the products obtained in the case of reactions (j) to (m) had a considerably higher weight than the co-condensates employed. In this case also, the co-condensates had not reacted considerably. Products were obtained, however, in which the co-condensates employed were coated with the appropriate vinyl polymers.

The yields in the case of reactions (j) to (m) were: (j) 45 g, (k) 132 g, (L) 138 g and (m) 144 g.

EXAMPLE 43

100 g of the dispersion prepared according to Example 39(b), 2.7 g of water, 1.0 g of a commercially available polyether-polysiloxane stabilizer, 0.2 g of triethylene-diamine and 0.2 g of a tin(II) salt of 2-ethylcaproic acid were mixed with one another. 36.3 g of toluylene-diisocyanate (80% of 2,4-isomer and 20% of the 2,6-isomer) were added to this mixture and thorough mixing was effected with a high-speed stirrer. After a start time of 10 seconds, foaming began, and a black soft, elastic polyurethane foam which had open pores and a density of about 40 kg/m³ was formed. The rate at which a strip of dimensions 10 cm×1 cm×0.5 cm burned down after being ignited was reduced considerably. The foam had become self-extinguishing.

EXAMPLE 44

(a) 100 g of the azulmic acic prepared according to Example 1 and 1 mol of monomethylolurea were subjected to a condensation reaction in the presence of 1,693 g of a highly branched polyester of phthalic anhydride and trimethylolpropane with a hydroxyl group content of about 8.5% by the method indicated in Example 39. A fine-particled dispersion was obtained.

(b) 100 g of the fine-particled dispersion prepared according to Example 44(a) were dispersed in 100 g of ethyl acetate, the dispersion was mixed with 128 g of a 75% strength by weight solution of triisocyanato-hexyl-biuret (16.4% of isocyanate groups) and the mixture was poured onto substrates, 0.5 g of tin(II) octoate being added. After 48 hours, black films were obtained which, after being ignited, extinguished themselves immediately, whereas comparable films of the aminoplast-free polyhydroxy compound exhibited a rapid spreading of flames.

EXAMPLE 45

(a) 100 g of the azulmic acid prepared according to Example 1 and 1 mol of monomethylolurea were subjected to a condensation reaction in the presence of 1,693 g of a polyester of adipic acid and ethylene glycol (OH number 56) by the method indicated in Example 39. An azulmic acid/monomethylolurea condensate dispersion was obtained.

(b) 220 g of the dispersion prepared according to Example 45(a) were dehydrated at 130° C. for 20 minutes under a waterpump vacuum. The temperature of the dispersion was then allowed to fall to 115° C., 44.4 g (0.2 mol) of 1-isocyanato-3,3,5-trimethyl-5-isocyanato-methylcyclohexane were added and the reaction was carried out in the course of 30 minutes to give the α,ω-diisocyanato prepolymer. Thereafter, the temperature of the isocyanate prepolymer was allowed to fall to 100° C., the dispersion was diluted with 200 g of toluene and cooled to 45° C., and a solution of 16.4 g of amino-3,3,5-trimethyl-5-aminomethylcyclohexane in 422 g of toluene and 522 g of isopropanol was added dropwise to this mixture of the isocyanate prepolymer in the course of 20 minutes, while stirring intensively. When the addition was complete, the mixture was subsequently stirred at room temperature for a further 10 minutes. The resulting elastomer dispersion solution had a viscosity of 1,800 cP at 25° C. The product was poured onto glass substrates and the solvent was allowed to evaporate. Highly elastic films of high strength were thereby obtained which, because of the pigment-like black filler constituent, had an increased flame-resistance, and which exhibited microporosity, which resulted from the pigment-like co-condensates which acted as drying agents and absorbed water during the film formation, the resulting coagulation of the polymer leading to microporosity.

EXAMPLE 46

(a) 100 g of the azulmic acid prepared according to Example 1 and 1 mol of monomethylolurea were subjected to a condensation reaction in the presence of 1,693 g of a linear propylene glycol polyether which had terminal, largely secondary hydroxyl groups, an average molecular weight of 2,000 and a hydroxyl group content of 1.7% (OH number 56) by the method indicated in Example 39(a). An azulmic acid/monomethylolurea co-condensate dispersion was obtained.

(b) 200 g of the dispersion prepared according to Example 46(a) were dehydrated at 130° C. for 30 minutes under a waterpump vacuum. The temperature of the dispersion was then allowed to fall to 100° C., 80 g of finely powdered 4,4-diisocyanato-diphenylmethane were then added in one operation and the mixture was kept at 120° C. for 12 minutes. Thereafter, 18 g of 1,4-butanediol were introduced into the isocyanate prepolymer melt as a chain-lengthening agent. The mixture was then poured rapidly into a metal mold and warmed to 100° C. in a heating cabinet. The highly elastic polyaddition product could already be released from the mold after 20 minutes. If the product was subsequently heated at 110° C. for 24 hours, a black test sheet was obtained which was highly elastic and resistant to tearing and, compared with an elastomer sheet without a co-condensate according to the invention, had the following advantageous properties:

(a) the rate at which a 0.4 mm film burned down was reduced by 50%; and (b) the resistance towards hydrolysis was improved.

We claim:

1. A method of synthesizing a formose sugar mixture from an aqueous formalin solution of high strength using a catalyst, characterized in that the catalyst is an azulmic acid product comprising azulmic acid, stabilized by reaction with an aminoplast-forming agent and a carbonyl compound or, optionally a chemically modified, condensation product thereof, containing from 0.5 to 55% by weight of ionic groups of the general formula

in which

R represents hydrogen, ammonium, one equivalent of a protonated or quaternized organic nitrogen base or of a sulfonium cation or one equivalent of a metal cation, and containing from 0.5 to 15 percent by weight of groups formed by decarboxylation reactions, of the formula

which azulmic acid product also contains calcium hydroxide, calcium carbonate, lead hydroxide, lead oxide, aluminum hydroxide, magnesium hydroxide, zinc hydroxide, tin hydroxide or a mixture of any of these.

* * * * *